(12) United States Patent
Jessen et al.

(10) Patent No.: US 9,186,665 B2
(45) Date of Patent: Nov. 17, 2015

(54) SYSTEM FOR ION EXCHANGE RESIN REGENERATION AND REGENERANT RECOVERY

(71) Applicant: RAYNE DEALERSHIP CORPORATION, San Diego, CA (US)

(72) Inventors: H. Martin Jessen, Fountain Hills, AZ (US); Eric John Dole, Goodyear, AZ (US); David Morgan, Scottsdale, AZ (US)

(73) Assignee: RAYNE DEALERSHIP CORPORATION, San Diego, CA (US)

( * ) Notice: Subject to any disclaimer, the term of this patent is extended or adjusted under 35 U.S.C. 154(b) by 103 days.

(21) Appl. No.: 14/046,958

(22) Filed: Oct. 5, 2013

(65) Prior Publication Data
US 2014/0196753 A1     Jul. 17, 2014

Related U.S. Application Data

(60) Division of application No. 12/889,350, filed on Sep. 23, 2010, now Pat. No. 8,585,906, which is a continuation-in-part of application No. 11/778,265, filed on Jul. 16, 2007, now Pat. No. 8,017,001.

(60) Provisional application No. 60/807,369, filed on Jul. 14, 2006, provisional application No. 61/305,945, filed on Feb. 18, 2010.

(51) Int. Cl.
*B01J 49/00*     (2006.01)
*C02F 1/52*      (2006.01)
(Continued)

(52) U.S. Cl.
CPC .......... *B01J 49/0008* (2013.01); *B01J 49/0069* (2013.01); *C02F 1/5245* (2013.01);
(Continued)

(58) Field of Classification Search
None
See application file for complete search history.

(56) References Cited

U.S. PATENT DOCUMENTS

| 3,186,940 | A | 6/1965 | Vajna |
| 3,202,322 | A | 8/1965 | Cleary et al. |

(Continued)

FOREIGN PATENT DOCUMENTS

| WO | WO9729137 | 8/1997 |
| WO | WO9806483 | 2/1998 |

(Continued)

OTHER PUBLICATIONS

Walker, Harold "Water Resources Research Grant Proposal: Enhanced Removal of DBP Precursors During Precipitative Softening Through Co-Adsorption Process", Ohio State University, Columbus, OH.

(Continued)

*Primary Examiner* — Chester Barry
(74) *Attorney, Agent, or Firm* — Ashok K. Janah; Janah & Associates, PC

(57) ABSTRACT

An apparatus and method for regenerating spent ion exchange resin and recovering regenerant fluid is described. A regeneration system has a regeneration vat, a regeneration solution tank, a regenerant recovery tank, a chemical dispenser, a solids separator, a pH adjuster and a pump. The regeneration vat holds the spent resin and is connected to the regeneration solution tank to allow transfer of regenerant solution into the regeneration vat. Spent regenerant fluid travels to the regenerant recovery tank, where it is treated with chemicals provided from the chemical dispenser. The solids separator receives the treated regenerant liquid and separates precipitate flocs from the treated regenerant liquid. The concentration of chloride ions in the separated regenerant solution can be adjusted by the pH adjuster to form fresh regenerant solution. The pump pumps the fresh regenerant solution to the regenerant solution tank to regenerate additional spent cation exchange resin.

20 Claims, 20 Drawing Sheets

(51) Int. Cl.

| | |
|---|---|
| C02F 1/00 | (2006.01) |
| C02F 1/56 | (2006.01) |
| C02F 1/66 | (2006.01) |
| C02F 5/10 | (2006.01) |
| C02F 9/00 | (2006.01) |
| C02F 103/42 | (2006.01) |

(52) U.S. Cl.
CPC ...... *C02F 1/001* (2013.01); *C02F 1/56* (2013.01); *C02F 1/66* (2013.01); *C02F 5/10* (2013.01); *C02F 9/00* (2013.01); *C02F 2103/42* (2013.01); *C02F 2201/008* (2013.01); *C02F 2209/03* (2013.01); *C02F 2209/055* (2013.01); *C02F 2209/06* (2013.01); *C02F 2301/046* (2013.01); *C02F 2303/16* (2013.01); *Y02W 10/37* (2015.05)

(56) References Cited

U.S. PATENT DOCUMENTS

| | | | |
|---|---|---|---|
| 3,214,369 | A | 10/1965 | Felix |
| 3,650,405 | A | 3/1972 | Morrison |
| 3,666,663 | A | 5/1972 | Walker |
| 3,833,122 | A | 9/1974 | Cook |
| 3,899,421 | A | 8/1975 | Keilin et al. |
| 4,105,560 | A | 8/1978 | Fismer |
| 4,145,281 | A | 3/1979 | Weishaar et al. |
| 4,207,397 | A | 6/1980 | Davis et al. |
| 4,387,026 | A | 6/1983 | Wollacott |
| 4,676,908 | A | 6/1987 | Ciepiela et al. |
| 4,773,996 | A | 9/1988 | Endo et al. |
| 4,839,057 | A | 6/1989 | White |
| 5,021,156 | A | 6/1991 | Sloan |
| 5,254,257 | A | 10/1993 | Brigano et al. |
| 5,683,587 | A | 11/1997 | Ferrara et al. |
| 5,699,272 | A | 12/1997 | Zabinski |
| 5,716,519 | A | 2/1998 | Schleife et al. |
| 5,833,841 | A | 11/1998 | Koslowsky |
| 5,863,438 | A | 1/1999 | Katzakian, Jr. et al. |
| 5,925,255 | A | 7/1999 | Mukhopadhyay |
| 6,039,886 | A | 3/2000 | Henkin et al. |
| 6,059,974 | A | 5/2000 | Sheurman, III |
| 6,074,551 | A | 6/2000 | Jones et al. |
| 6,258,265 | B1 | 7/2001 | Jones |
| 6,258,280 | B1 | 7/2001 | Petrich |
| 6,267,891 | B1 | 7/2001 | Tonelli et al. |
| 6,267,893 | B1 | 7/2001 | Luxemburg |
| 6,296,761 | B1 | 10/2001 | Scheuerman, III |
| 6,305,835 | B1 | 10/2001 | Farrar et al. |
| 6,331,261 | B1 | 12/2001 | Waatti et al. |
| 6,398,965 | B1 | 6/2002 | Arba et al. |
| 6,461,514 | B1 | 10/2002 | Al-Samadi |
| 6,537,456 | B2 | 3/2003 | Mukhopadhyay |
| 6,620,317 | B2 | 9/2003 | Aliviti |
| 6,790,362 | B2 | 9/2004 | Fitzgerald et al. |
| 6,852,218 | B2 | 2/2005 | Vila Corts |
| 7,157,005 | B2 | 1/2007 | Jacob, IV et al. |
| 7,374,694 | B2 | 5/2008 | Gaudinot et al. |
| 7,387,722 | B1 | 6/2008 | Varner et al. |
| 7,504,036 | B2 | 3/2009 | Gottlieb et al. |
| 7,520,993 | B1 | 4/2009 | Laraway et al. |
| 7,537,691 | B2 | 5/2009 | Reid |
| 7,556,738 | B2 | 7/2009 | Premathilake et al. |
| 7,563,351 | B2 | 7/2009 | Wilkins et al. |
| 7,718,069 | B2 | 5/2010 | Laraway et al. |
| 7,736,497 | B2 | 6/2010 | Fout et al. |
| 7,771,599 | B1 | 8/2010 | Choi et al. |
| 7,790,653 | B2 | 9/2010 | Webb et al. |
| 7,846,340 | B2 | 12/2010 | Freydina et al. |
| 7,901,571 | B2 | 3/2011 | Woods et al. |
| 2002/0125191 | A1 | 9/2002 | Mukhopadhyay |
| 2002/0153319 | A1 | 10/2002 | Mukhopadhyay |
| 2005/0000902 | A1 | 1/2005 | Newenhizen et al. |
| 2005/0103631 | A1 | 5/2005 | Freydina et al. |
| 2005/0103644 | A1 | 5/2005 | Wilkins et al. |
| 2006/0037913 | A1 | 2/2006 | Gottlieb et al. |
| 2006/0231491 | A1 | 10/2006 | Mukhopadhyay |
| 2006/0266710 | A1 | 11/2006 | Premathilake et al. |
| 2007/0095759 | A1 | 5/2007 | Bridle |
| 2007/0108056 | A1 | 5/2007 | Nyberg et al. |
| 2008/0067131 | A1 | 3/2008 | Morgan |
| 2008/0169241 | A1 | 7/2008 | Gottlieb et al. |
| 2009/0145850 | A1 | 6/2009 | Gottlieb et al. |
| 2009/0173692 | A1 | 7/2009 | Laraway et al. |
| 2009/0236235 | A1 | 9/2009 | Wilkins et al. |
| 2010/0193444 | A1 | 8/2010 | Boodoo |
| 2011/0005749 | A1 | 1/2011 | Curole |
| 2011/0077144 | A1 | 3/2011 | Jessen et al. |

FOREIGN PATENT DOCUMENTS

| | | |
|---|---|---|
| WO | WO9857892 | 12/1998 |
| WO | WO9950184 | 10/1999 |
| WO | WO0003791 | 1/2000 |
| WO | WO0141927 | 6/2001 |
| WO | WO0200551 | 1/2002 |
| WO | WO0248047 | 6/2002 |
| WO | WO03070361 | 8/2003 |
| WO | WO03101894 | 12/2003 |
| WO | WO2004103545 | 12/2004 |
| WO | WO2005005323 | 1/2005 |
| WO | WO2005049505 | 6/2005 |
| WO | WO2005049506 | 6/2005 |
| WO | WO2006022863 | 3/2006 |
| WO | WO2006079417 | 8/2006 |
| WO | WO2007016461 | 2/2007 |
| WO | WO2007032860 | 3/2007 |
| WO | WO2007044609 | 4/2007 |
| WO | WO2007051167 | 5/2007 |
| WO | WO2007130053 | 11/2007 |
| WO | WO2008048656 | 4/2008 |
| WO | WO2008137785 | 11/2008 |
| WO | WO2009012378 | 1/2009 |
| WO | WO2009039655 | 4/2009 |
| WO | WO2009051612 | 4/2009 |
| WO | WO2009073064 | 6/2009 |
| WO | WO2010078551 | 7/2010 |
| WO | WO2010090897 | 8/2010 |
| WO | WO2010122508 | 10/2010 |
| WO | WO2010122509 | 10/2010 |
| WO | WO2010124354 | 11/2010 |

OTHER PUBLICATIONS

Schutte & Koerting, "Liquid Handling Dry Solids Eductors", Bensalem, PA.

American Water Works Association Staff, "Basic Science Concepts and Application", 3e (2003), pp. 430-485.

Beard, Betty, "Tempe co. cleans pools, no drainage", The Arizona Republic, Jul. 13, 2007.

Mustafa, Bob, "Lime-Soda Softening Process Modifications for Enhanced NOM Removal", Journal of Environmental Engineering, vol. 132, No. 2, Feb. 2006, pp. 158-165.

Jones, Christopher, "Reduced Lime Feeds: Effects on Operational Costs and Water Quality", Des Moines Water Works, Des Moines, IA.

Francis, Harry, "Chemical Treatment of Water Using Lime", e-lime cement gypsum.

Notice of Allowance, U.S. Appl. No. 11/778,265, dated Apr. 12, 2011.

Final Office Action, U.S. Appl. No. 11/778,265, dated Dec. 2, 2010.

Office Action, U.S. Appl. No. 11/778,265, dated Mar. 9, 2010.

Notice of Allowance, U.S. Appl. No. 12/889,350, dated Jul. 17, 2013.

Advisory Action, U.S. Appl. No. 13/211,286, dated Mar. 20, 2014.

Advisory Action, U.S. Appl. No. 13/211,286, dated Nov. 7, 2012.

Final Office Action, U.S. Appl. No. 13/211,286, dated Aug. 24, 2012.

Final Office Action, U.S. Appl. No. 13/211,286, dated Oct. 31, 2013.

Non-Final Action, U.S. Appl. No. 13/211,286, dated Dec. 31, 2014.

Non-Final Office Action, U.S. Appl. No. 13/211,286, dated Mar. 22, 2012.

Non-Final Office Action, U.S. Appl. No. 13/211,286, dated May 22, 2013.

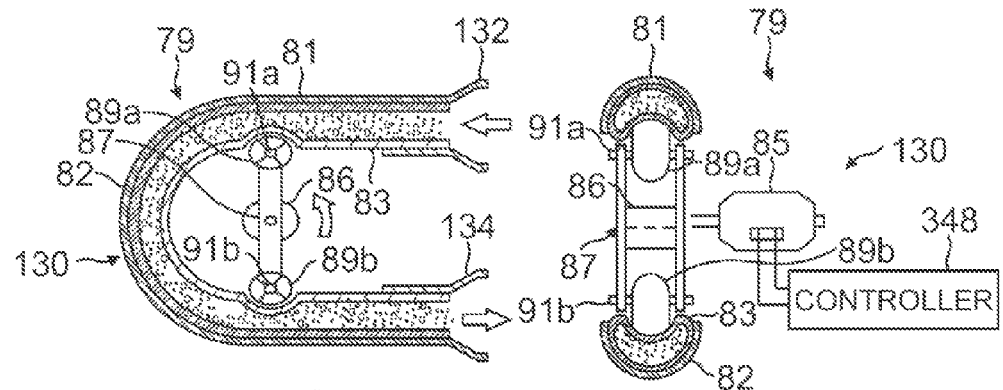
FIG. 6A
FIG. 6C
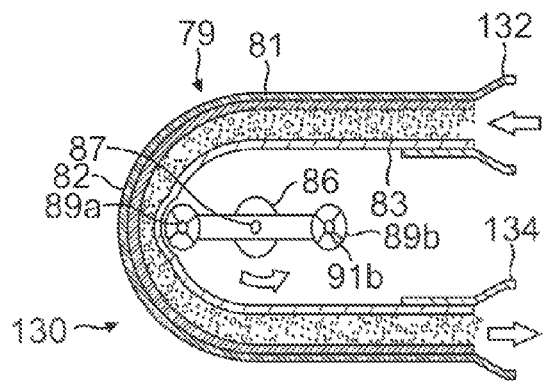
FIG. 6B
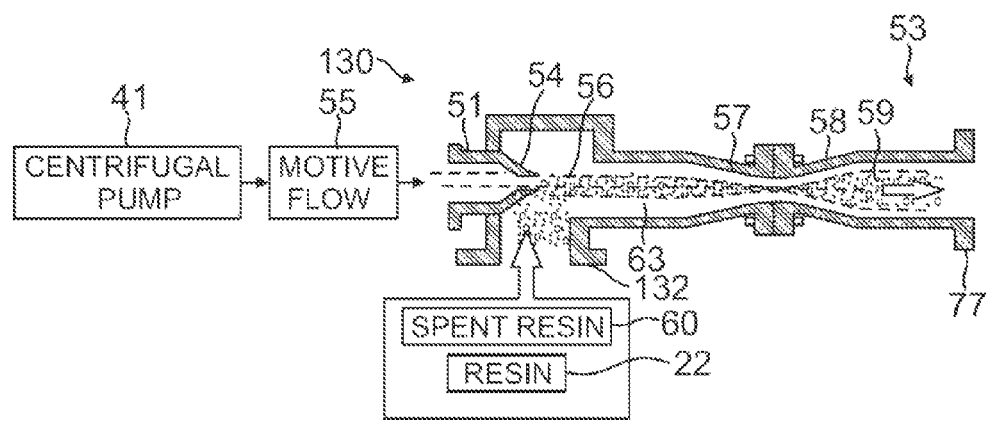
FIG. 7

SYSTEM FOR ION EXCHANGE RESIN REGENERATION AND REGENERANT RECOVERY

CROSS-REFERENCE

The present application is a divisional application and claims priority to U.S. patent application Ser. No. 12/889,350, filed Sep. 23, 2010, now U.S. Pat. No. 8,585,906; which is a continuation-in-part of U.S. patent application Ser. No. 11/778,265, filed Jul. 16, 2007, now U.S. Pat. No. 8,017,001; which claims priority to U.S. Provisional Application No. 60/807,369, filed Jul. 14, 2006. U.S. patent application Ser. No. 12/889,350 also claims priority to U.S. Provisional Application No. 61/305,945, filed Feb. 18, 2010. All four patent applications are being incorporated by reference herein and in their entireties.

BACKGROUND

Embodiments of the present invention relate to the regeneration of ion exchange resin with a regenerant solution and recovery of the spent regenerant solution.

Ion exchange resins are used to treat fluids that include gases and liquids to remove ions, contaminants, and dissolved solids. The resins can be used in many different types of separation, purification, and decontamination processes including water treatment, treatment of toxic liquids or gases, or other applications. The ion exchange resins can be in the form of organic polymer beads, membranes, or other structures, and can include (i) cation exchange resins which have functional groups that are strong or weak acid groups, and (ii) anion exchange resins which have functional groups which are strong or weak base groups. In a typical ion exchange resin system, the fluid to be treated is passed across or through the ion exchange resin. For example, well or tap water can be treated with an ion exchange resin to remove divalent or contaminant ions to provide softened or purified water. The ion exchange resin removes certain ions from the water and exchanges them for other ions in a reversible chemical reaction. For example, multivalent and divalent ions such as, for example, $Ca^{+2}$, $Mg^{+2}$, and $SO_4^{-2}$ ions, can be removed from the fluid being treated and exchanged for $Na^+$ ions in the resin.

Besides water treatment, ion exchange resins can have many other applications. For example, in one application, ion exchange resins are used to remove poisonous metal (e.g., copper) and heavy metal (e.g., lead or cadmium) ions from a solution, and replace them with more innocuous ions, such as sodium and potassium. Ion exchange resins can also be used to remove organic contaminants from water; for example, using an activated charcoal filter to remove the chlorine mixed with anionic resin to remove organic contaminates. Still other ion exchange resins remove organic ions, such as MIEX (magnetic ion exchange) resins. Still other applications of ion exchange resin systems include the treatment of: salt water pre-treatment in desalination processes; industrial waste liquids and gases to remove hazardous ions and compounds; waste from nuclear power plants to remove radioactive or other toxic materials; fluids to recover valuable metals; industrial drying of gases; food industry applications such as wine-making and sugar manufacture; medical applications that include the development and preparation of drugs and antibiotics, such as streptomycin and quinine; treatments for ulcers, TB, kidneys, and other organs; and the prevention of coagulation of blood and dextrose. Ion exchange processes can be used to separate and purify metals, including separating uranium from plutonium and other actinides, such as thorium, lanthanum, neodymium, ytterbium, samarium, and lutetium, from each other and the other lanthanides. Ion exchange resins can also be used to catalyze organic reactions, such as in self-condensation reactions. Ion exchange resins are also used in the manufacture of fruit juices (e.g., orange juice) where they are used to remove bitter-tasting components and so improve the flavor. In the processing of sugar, ion exchange resins are used to convert one type of sugar into another type of sugar and to decolorize and purify sugar syrups. Ion exchange resins are also used in the manufacturing of pharmaceuticals, not only for catalyzing certain reactions but also for isolating and purifying pharmaceutical active ingredients.

In any of these applications, after a number of treatment cycles, the used ion exchange resin becomes spent or exhausted and needs to be regenerated to remove the ions which have exchanged into, and accumulated in, the spent resin. Ion exchange resins contain a finite number of ion exchange sites, and the exchange capacity of the resins eventually becomes spent as the resins become saturated with ions extracted from a fluid. An ion exchange resin can also lose its efficiency from plugging up with solids, such as sand or other particles, which are present in the liquid being treated.

To regenerate the spent ion exchange resin, the spent resin is treated with a resin regenerant solution containing ions that exchange with the accumulated ions in the resin to recharge the resin. The composition of the regenerant solution depends on the chemical composition of the ion exchange resin and type of ions accumulated in the resin. For example, spent cation exchange resin can be treated by soaking the resin in a regenerant solution comprising sodium chloride or potassium dissolved in water to remove accumulated divalent ions and solids. The sodium or potassium ions replace divalent ions such as calcium and magnesium which are trapped in the ion exchange resin with sodium ions. Ion exchange resins can also be regenerated with solutions comprising other forms of chloride ions, such as hydrochloric acid. Oftentimes, after regeneration, the ion exchange resin can be rinsed with fresh water or other liquids to displace residual regenerant solution. The regenerant solution and rinse liquid both contain dissolved divalent ions which contaminate the regenerant solution and prevent its reuse. Similarly, spent anion exchange resins can also be treated with other types of regenerant solutions and/or rinse liquids which also accumulate in the spent resins.

The disposal of spent regenerant solutions and rinse liquids into municipal wastewater systems creates environmental problems and increases regeneration process costs. Municipal wastewater plants often cannot remove all of the mineral hardness compounds, such as sodium chloride, from the incoming water stream, and thus, these compounds are passed out with the processed water into the environment to contaminate rivers, lakes and seas, or even ground water and surrounding land, with undesirable metallic ions. Also, the higher concentrations of total dissolved salts in processed water, such as chloride, sodium and boron ions in particular, limit reuse of such water in farming and agricultural applications. The contribution to municipal sewage of salt water discharge from household ion exchange systems has reached such major proportions that regulations are being promulgated on the reduction of salt use in the regeneration of ion exchange resins and prohibiting the discharge of brines to municipal sewage systems. For example, the discharge of salt solutions from ion exchange processes used in food, tanning and textile industries, and hospitals through municipal wastewater systems can exceed thousands of tons of salt per year. Also, disposal of spent regenerant solutions into the wastewater systems creates a need for additional chemicals and fresh water to form new regenerant solution, further increasing the costs associated with regenerating exchange resins.

For reasons including these and other deficiencies, and despite the development of various ion exchange regeneration systems, apparatus, and methods, further improvements in the treatment of spent regenerant solution and other waste liquids generated in the process of regenerating ion exchange resins are continuously being sought.

SUMMARY

A regenerant recovery method is capable of recovering a spent regenerant solution, by treating the spent regenerant solution with a regenerant treatment composition to form treated regenerant liquid comprising precipitated flocs; separating the treated regenerant liquid to separate the precipitated flocs from the supernatant; and transferring the supernatant to a regenerant recovery tank.

In one exemplary method, fresh regenerant solution is passed across spent ion exchange resin, which can be any type of resin including cation exchange resin or anion exchange resin, for sufficient time to regenerate the spent ion exchange resin and form fresh ion exchange resin and spent regenerant solution. A regenerant treatment composition is added to the spent regenerant solution to form a treated regenerant liquid. Precipitated compounds are separated from the treated regenerant liquid to form a separated or filtered regenerant solution. The precipitated compounds can be separated out using, for example, a filter press or centrifuge. The pH of the treated or separated regenerant liquid can also be adjusted to allow recovery and recycling of the regenerant solution.

Instead of only treating spent regenerant solution, a regenerant waste liquid can be formed by collecting spent regenerant solution, spent backwash water which is used to backwash spent resin prior to regeneration, and/or spent rinse water which is used to rinse spent resin after regeneration. The regenerant waste liquid can be treated by adding the regenerant treatment composition to the regenerant waste liquid to form treated regenerant liquid and the precipitated compounds can be separated from the supernatant.

In still another version, a method of regenerating spent cation exchange resin comprises preparing a fresh regenerant solution comprising sodium ions and chloride ions, and passing the regenerant solution across spent cation exchange resin to regenerate the spent cation exchange resin, thereby forming fresh cation exchange resin and spent regenerant solution. For example, the fresh regenerant solution can be a solution of sodium chloride. A regenerant treatment composition is dispensed into the spent regenerant solution, the regenerant treatment composition comprising at least one hydroxide component and at least one carbonate component, thereby forming treated regenerant liquid and precipitate flocs or flakes. The precipitate flocs are separated from the treated regenerant liquid to form a separated regenerant solution. The concentration of the chloride ions in the separated regenerant solution is adjusted to form fresh regenerant solution which can be used to regenerate additional spent cation exchange resin.

As one example, a suitable regenerant treatment composition can include calcium hydroxide, sodium hydroxide, and sodium carbonate. The calcium and sodium hydroxide can be added in an amount sufficient to precipitate at least about 90% of the magnesium ions in the spent regenerant solution to form a first precipitate compound comprising magnesium hydroxide; and the sodium carbonate can be added in an amount sufficient to precipitate at least about 90% of the calcium ions in the spent regenerant solution to form a second precipitate compound comprising calcium carbonate.

Yet another process for regenerating spent ion exchange resin comprises providing a source of spent ion exchange resin in the form of a liquid-resin mixture; pumping the liquid-resin mixture to a regeneration vat with a non-abrasive resin transfer pump having pumping components that do not abrade the spent ion exchange resin in the liquid-resin mixture; and pumping a regenerant solution through the spent resin in the regeneration vat to regenerate the spent ion exchange resin to form fresh ion exchange resin. In one version, the non-abrasive resin transfer pump comprises a peristaltic pump.

In another version, a resin pumping process for transferring resin while minimizing damage to the resin, comprises providing a flexible tube having a suction port and output port; connecting the suction port of the flexible tube to the liquid-resin mixture; connecting the output port of the flexible tube to the regeneration vat; and squeezing the flexible tube in a direction from the suction port to the output port to pump the liquid-resin mixture in the flexible tube to the regeneration vat.

In yet another version, the resin pumping process comprises providing a flow of pressurized water; constricting a flow of pressurized liquid to form a liquid jet stream; drawing resin through a suction port adjacent to the jet stream of water; and expanding the jet stream of water to have a second velocity and second pressure, the second velocity being lower than the first velocity and the second pressure being lower than the first pressure to pump the spent resin to the regeneration vat. Still a further version comprises passing the flow of pressurized fluid through the throat of a converging-diverging nozzle and passing the fluid jet stream through a divergent nozzle outlet.

In the resin pumping processes, a liquid-resin mixture can also be pumped be made by adding a liquid to the spent or regenerated resin in a liquid to resin volume ratio of from about 0.2:1 to about 4:1. Still further, the liquid-resin mixture can be pumped out from a spent resin sump to a resin regeneration vat, from a resin regeneration vat to a regenerated resin storage tank or sump, or even to fill portable ion exchange tanks.

A resin regeneration system comprises a regeneration vat for holding spent cation exchange resin and a regenerant solution tank for holding fresh regenerant solution. The regenerant solution tank is connected to the regeneration vat to allow transfer of the regenerant solution into the regeneration vat to regenerate the spent cation exchange resin to form fresh cation exchange resin and spent regenerant solution. A regenerant recovery tank comprises (i) a fluid inlet to receive the spent regenerant solution, and (ii) a fluid outlet to release treated regenerant liquid. A chemical dispenser is provided to dispense a regenerant treatment composition into the spent regenerant solution in the regenerant recovery tank to form treated regenerant liquid and precipitate flocs. A solids separator is provided to receive the treated regenerant liquid and separate the precipitate flocs from the treated regenerant liquid to form a separated regenerant solution. A pH adjuster is provided to adjust the concentration of chloride ions in the separated regenerant solution to form fresh regenerant solution. A pump is provided to pump the fresh regenerant solution to the regenerant solution tank to regenerate additional spent cation exchange resin.

In one version, the chemical dispenser comprises (i) a hopper comprising an inlet to receive a regenerant treatment composition, and an outlet to dispense the regenerant treatment composition; and (ii) a liquid channel to pass a flowing stream of spent regenerant solution past the outlet of the hopper to receive, and disperse therein, the dispensed regenerant treatment composition passed to the flowing stream.

In one version, the regenerant recovery tank comprises (i) a fluid inlet to receive the flowing stream of spent regenerant solution; (ii) a circulation mixer to mix the spent regenerant solution and dispersed regenerant treatment composition to form treated regenerant liquid and precipitated compounds; and (iii) an outlet to release treated regenerant liquid.

A solids separator to separate the precipitate flocs or precipitated compounds from the treated regenerant liquid to form separated regenerant liquid. In one version, the solids separator comprises (i) an inlet to receive treated regenerant liquid; (ii) a pump to pump the treated regenerant liquid to the inlet; (iii) a filter connected to the inlet to receive the treated regenerant liquid, the filter capable of separating precipitate flocs from a supernatant; and (iv) an outlet to output the supernatant comprising filtered regenerant solution.

The solids separator can be a centrifuge or filter press. For example, one version of a centrifuge comprises a bucket to hold a treated regenerant liquid, the bucket having a cylindrical wall with an inner circumference. A rotatable shaft is mounted in the bucket, the rotatable shaft comprising a hollow tube having (i) an inlet to receive the treated regenerant liquid, (ii) a plurality of openings extending along a length of the hollow tube, and (iii) an outlet to output the centrifuged solution. A plurality of blades extend radially outward from the rotatable shaft. A first magnetic levitation system is provided to magnetically levitate the rotatable shaft and a second magnetic levitation system is provided to magnetically levitate the bucket. A motor is provided to rotate the rotatable shaft causing the blades to rotate and generate a centrifugal force in the solution in the bucket.

In one version, the first magnetic levitation system of the centrifuge comprises first and second magnets, the first magnet having a first magnetic pole that faces away from the shaft to hover above a second magnetic pole of the second magnet. In another version, the second magnetic levitation system comprises (i) a cylinder having first and second ends, the first end attached to the cylindrical wall of the bucket; (ii) an annular magnet attached to the second end of the cylinder, the annular magnet having a lower face and an upper face; and (iii) a basal magnet having an upward face that faces the lower face of the annular magnet, wherein the upward face has a polarity opposite to the polarity of the lower face.

In still another aspect, a distillation apparatus comprises a heat source to heat spent rinse water for distillation to form distilled water. In one version, the distillation apparatus can include a thermal distiller comprising a condenser housing and heat exchanger. The condenser housing comprises a condenser hood, gutter well, condensed water tray, and cooling water tray. The condenser hood can have a sloped wall connected to a sidewall. In one version, the thermal distiller is connected to an exhaust gas output from an engine to capture the heat from the exhaust gases of the engine. A gas transfer pipe is connected to an exhaust pipe of the engine to direct exhaust gas to an inlet manifold of the heat exchanger. The inlet manifold feeds a plurality of heat exchanger pipes in a heat exchanger tray, and the pipes terminate in an outlet manifold. In operation, spent rinse water is delivered to the heat exchanger tray and the gutter well. The gas transfer pipe feeds exhaust gas into pipes of the heat exchanger causing the spent rinse water in the heat exchanger tray to evaporate, rise-up, and then condense on the internal condensing surfaces of the sloped wall and sidewall of condenser hood. The gutter well cascades water over the external surfaces of the condenser hood to cool off the condensing surface. The evaporated water that condenses on the condenser hood comprises cleaned distilled water and is collected in the condensed water tray. Spent rinse water used to cool the condensing surfaces is collected in the cooling water tray.

DRAWINGS

These features, aspects, and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

FIGS. 6A to 6C are schematic cross-sectional diagrams of the side (6A and 6B) and front (6C) of an exemplary embodiment of a non-abrasive resin transfer pump that is a peristaltic pump, showing rotation of the spin rollers;

FIG. 7 is a schematic diagram of a resin transfer pump comprising a differential pressure, venturi-type, injector pump;

DESCRIPTION

Figure 1:
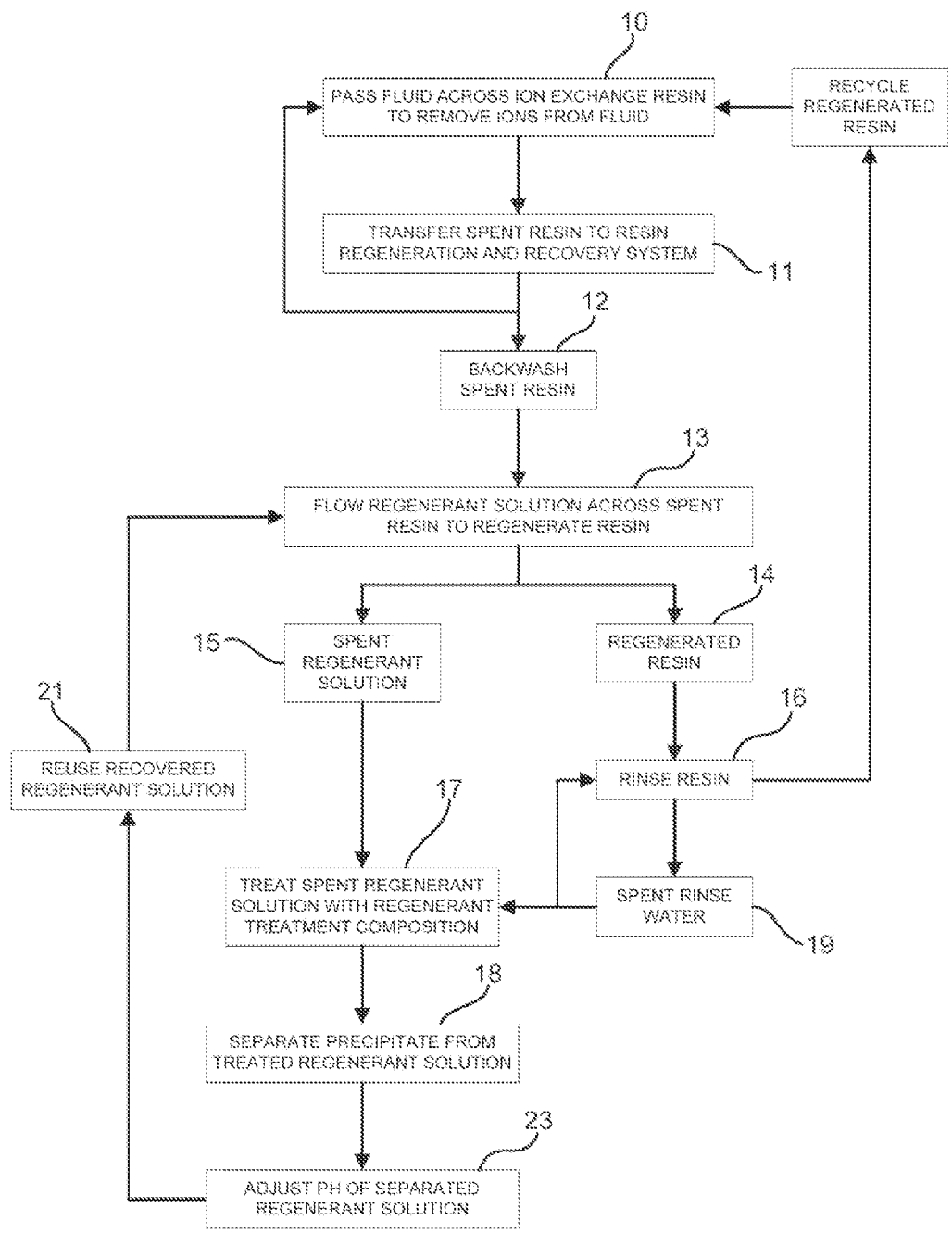
FIG. 1 is a flowchart of an exemplary embodiment of (i) an ion exchange process to remove ions and solids from a fluid using an ion exchange resin, (ii) regeneration of the spent resin with a regenerant solution, and (iii) recovery and recycling of the spent regenerant solution.

An exemplary embodiment of a process for removing ions from a fluid using an ion exchange resin, regenerating the spent resin with a regenerant solution, and recovering and recycling the spent regenerant solution, is illustrated in the flowchart of FIG. 1. While an exemplary embodiments of ion exchange apparatus, regeneration and recovery systems and processes are illustrated herein, it should be understood that the present apparatus and process can be adapted for other apparatus and applications as would be apparent to those of ordinary skill in the art, and that all such apparatus and applications are included in the scope of the present invention.

Figure 2:
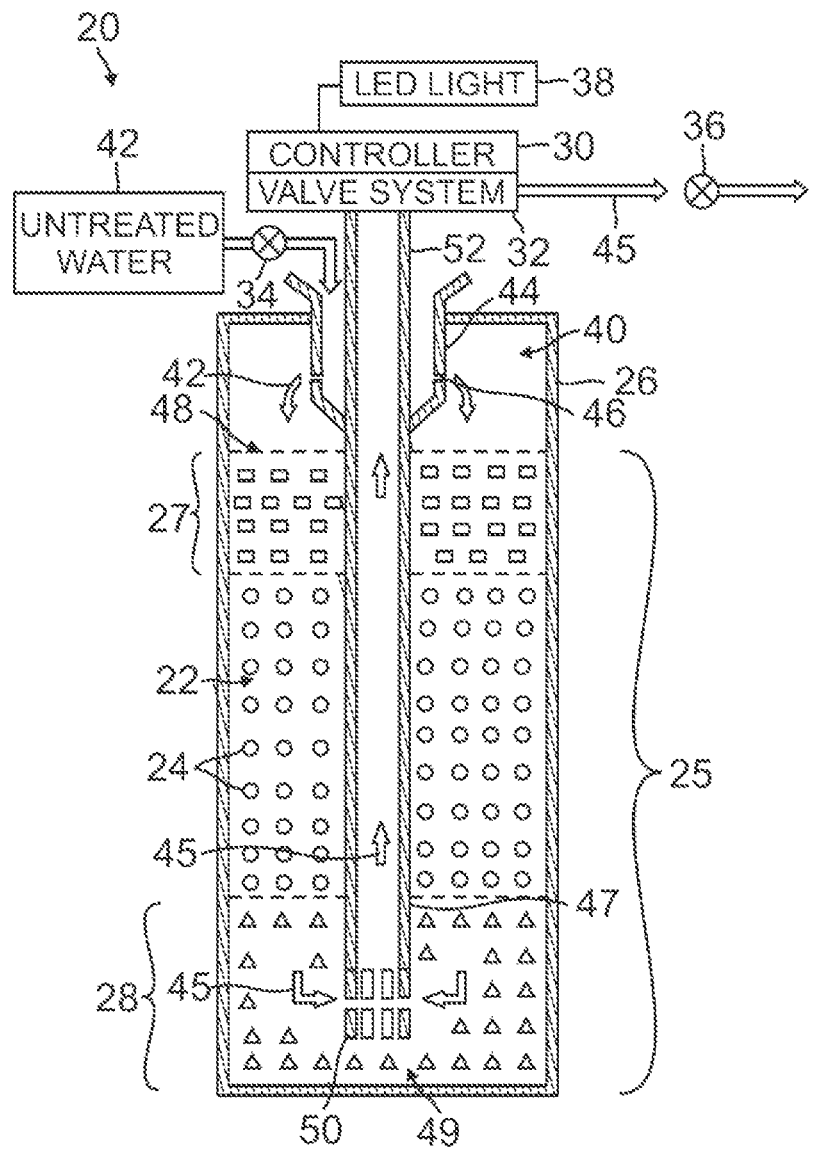
FIG. 2 is a schematic diagram of an exemplary embodiment of an ion exchange apparatus comprising a column containing ion exchange resin through which a liquid is passed to treat the liquid.

In an ion exchange process, fluid is passed across ion exchange resin to remove ions from the fluid by exchanging the ions in the fluid with other ions in the ion exchange resin until the resin is spent, as shown in step 10 of FIG. 1. An exemplary ion exchange apparatus 20 to treat a fluid, such as a liquid (e.g., water) containing ions by passing the fluid across ion exchange resin 22 to treat the liquid is shown in FIG. 2. The ion exchange resin 22 removes some charged ions from the liquid by exchanging them for an equivalent amount of other charged ions in a reversible chemical reaction. The ion exchange resins 22 can be in the form of resin beads 24, which partially fill a column 25 in a cylindrical tank 26. The column 25 can include other purification and conditioning materials such as an activated carbon layer 27 to remove organic contaminants from water, such as organic molecules, which are often responsible for taste, odor, color problems, chlorine, and other ions and molecules. A permeation layer 28, such as a layer of gravel (as shown) or a wedge-shaped wire structure (not shown), at the bottom of the column 25 has perforations that are sized to allow treated liquid 45 to leave the vessel while retaining the resin 22 and resin fines in the tank 26. Resin fines are caused by wear and tear attributed by normal service life and regeneration and enhance the ion exchange process. The permeation layer 28 can be made, for example, from aluminum oxide or garnet beads. A suitable wedge-shape wire structure can be made from, for example, a polymer such as polyvinyl chloride; a metal such as stainless steel; or combinations of the same, which does not degrade or leach chemicals into the treated water solution. A sieve 50 can be provided to retain the permeation layer 28 while allowing treated water to exit the permeation layer 28.

The tank 26 also has a top portion 40 with a liquid distributor inlet 44 that is shaped and configured with holes 46 to distribute untreated liquid 42 across the top cross-sectional area 48 of the tank 26. The distributed untreated liquid 42 is filtered and treated as it flows through the column 25, under gravity or pressure from the top portion 40 to the bottom portion 49 of the tank 26 to form treated liquid 45 at the bottom portion 49. The treated liquid 45 passes through the permeation layer 28 and sieve 50 and into an outlet tube 47 which extends from the bottom portion 49 to, and out of, the top portion 40 of the tank 26 to exit the tank 26.

The ion exchange resin 22 can also have forms other than the resin beads 24, such as ion exchange membranes, mesh, or other structures. The ion exchange resins 22 can also have different compositions depending on the ion exchange application for which the resins are being used. In one version, the ion exchange resins 22 comprise an insoluble polymer matrix with attached functional groups containing mobile ions that are exchanged with ions from the liquid being treated. The ion exchange resins 22 can include, for example, strong or weak acid functional groups to form cation exchange resins, or weak or strong base functional groups to form anion exchange resins. Suitable strong acid cation exchange resins typically comprise sulfonated copolymerized styrene-divinylbenzene products which are crosslinked to varying degrees and are often used in water conditioning, demineralization of sugar and corn syrups, chromatographic separations, and metal recovery. Suitable weak acid cation exchange resins can have functional groups comprising phenolic, phosphorous or carboxylic entities, or combinations of these or other groups, and such resins are used for water conditioning, chromatographic separation, and metal recovery. Strong base anion exchange resins can comprise quaternary ammonium groups in a polystyrene divinylbenzene matrix, and are principally used in water conditioning. Weak base anion exchange resins contain primary, secondary or tertiary amine groups, and mixtures thereof; they are available in a variety of types, including condensation products of amines with formaldehyde, alkyl dihalide, and chloromethylated styrene-divinylbenzene, and are often used to demineralize corn syrups and corn sugar.

In one exemplary embodiment, an ion exchange resin 22 for treating water to soften the water by removing divalent ions such as calcium, magnesium, barium, strontium and other such ions, comprises a cation exchange resin such as IONAC cationic resin, for example, the IONIC C249™, fabricated by Sybron Chemicals Inc. Birmingham, New Jersey. For example, well or tap water can be treated to remove divalent ions such as $Ca^{+2}$, $Mg^{+2}$, and $SO_4^{-2}$ ions from the water, and later exchange the remove ions for $Na^+$ ions from the fresh resin 22 to give better quality water.

Optionally, the apparatus 20 can also include an ion exchange controller 30 which controls a valve system 32 connected to the liquid distributor inlet 44 and the top of the outlet tube 52 to control the flow of untreated liquid 42 and treated liquid 45 in and out of the apparatus 20. The controller 30 comprises programmable electronics and hardware to send signals to control the valve system 32. For example, the controller 30 can open an inlet valve 34 to allow untreated liquid 42 to filtered liquid into the column 25 of the tank 26 until the tank 26 is full of water, and at that time, shut the inlet valve 34. As another example, the controller 30 can also open an outlet valve 36 to release treated liquid 45 as needed. The controller 30 can also operate the valve system 32 to pass a regenerant solution through the ion exchange resin 22 when the resin become spent or trigger an LED light 38 or other alarm system that indicates when the resin is spent. The controller 30 can operate the LED light 38 trigger in relation to the number of gallons of untreated liquid 42 that is passed through the column 25, the number of water treatment cycles, or simply a clock (not shown) that counts the operational time since the last replacement of the resin 22. After a number of liquid treatment cycles, the resin 22 become spent and saturated with ions extracted from the liquid and also lose their exchange efficiency from plugging up by solids. When the controller 30 signals that the resin 22 has become, or is estimated to become, spent resin, the controller 30 signals the same for an operator to remove the tank 26 and replaces the spent resin tank with a new tank containing fresh resin 22.

Resin Regeneration and Recovery System I

Spent resin 60 extracted from a single or a plurality of ion exchange apparatus 20 is regenerated by passing regenerant solution 186 across the spent resin 60 in a resin regeneration and recovery system 80. First, the spent resin 60 is transferred out of the tanks 26 of a number of different ion exchange apparatus 20 (such as small household ion exchange apparatus or large-scale ion exchange apparatus, such as those used in hotels, restaurants, and hospitals), and into a resin regeneration and recovery system 80, as shown in step 11 of FIG. 1.

Figure 3A:
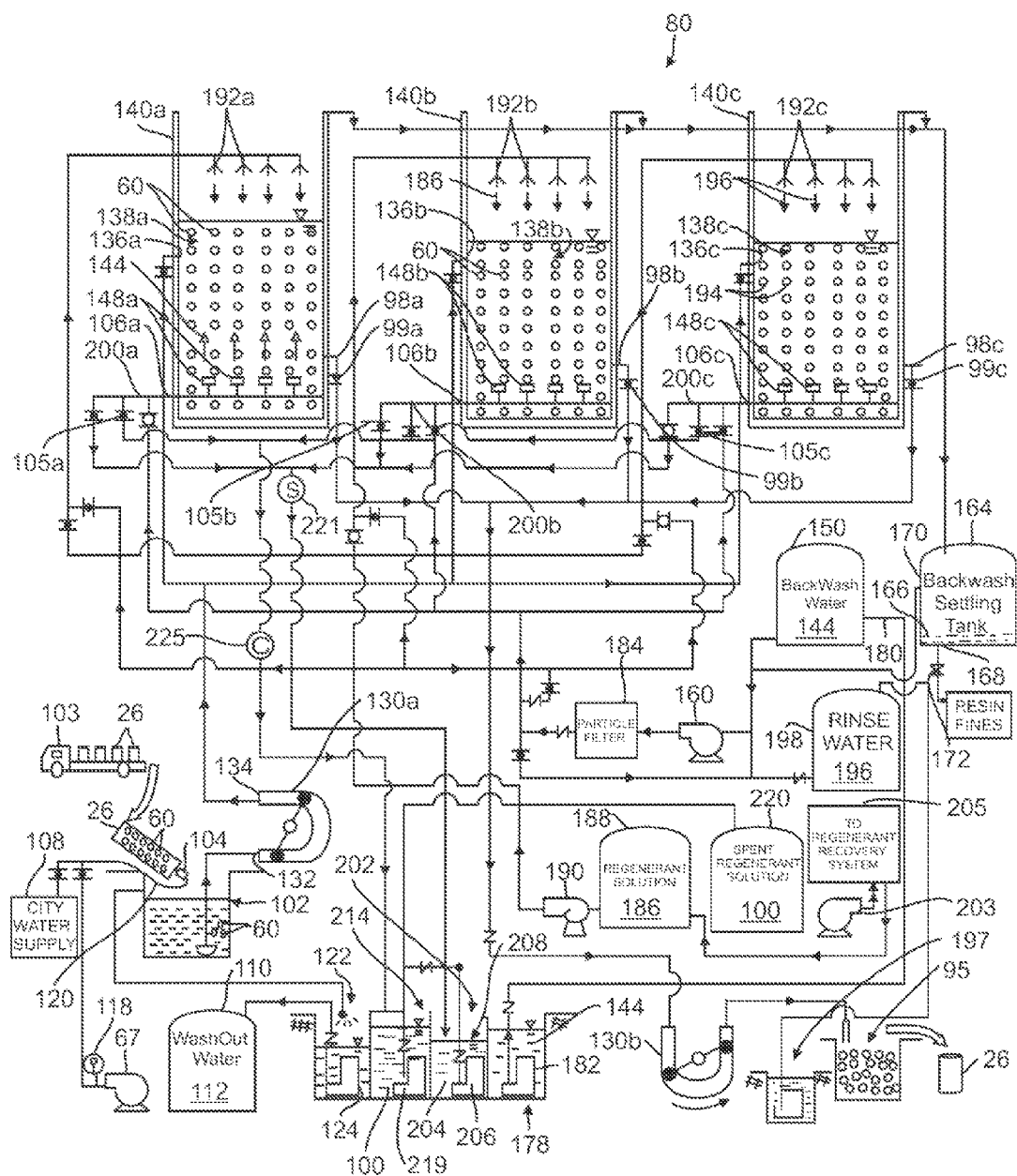
FIG. 3A is a schematic diagram of a portion of an exemplary embodiment of a resin regeneration and recovery system for regenerating spent resin with a regenerant solution.
Figure 3B:
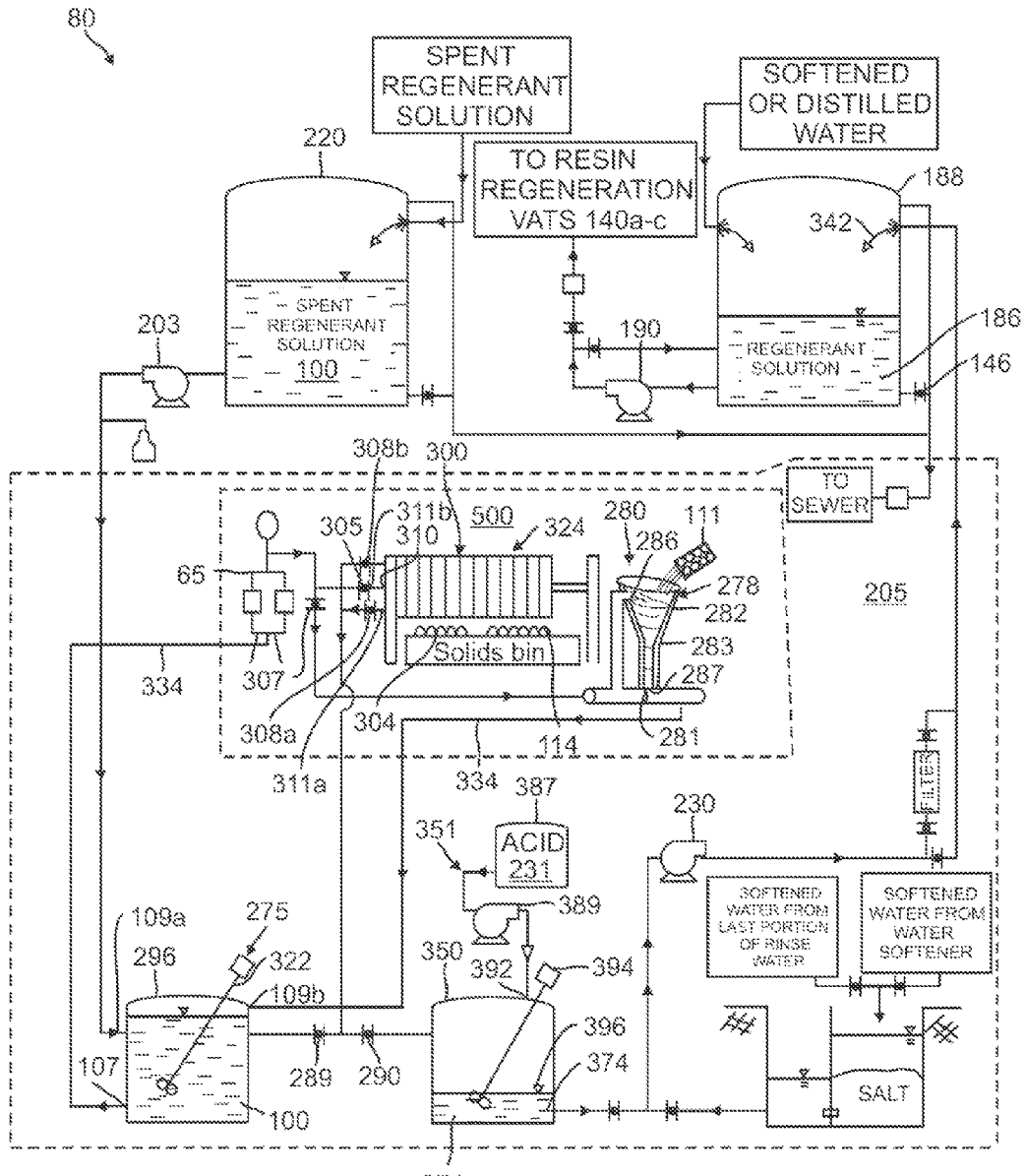
FIG. 3B is a schematic diagram of another portion of the resin regeneration and recovery system of FIG. 3A.

An exemplary embodiment of a resin regeneration and recovery system 80 to process spent resin 60 comprising spent cation exchange resin beads 24, is illustrated in FIGS. 3A and 3B. Individual tanks 26 of ion exchange apparatus 20 are removed from small or large scale water purification sites after the resin is exhausted, and each tank 26 of spent resin 60 is exchanged with a fresh resin tank. The spent resin tanks 26 are transported to the regeneration facility by a truck 103. Each individual tank 26 of spent resin 60 is off-loaded from the truck 103, positioned around the resin holding pit 102, and tipped upside-down to allow the spent resin 60 to evacuate out of the tank 26. The resin holding pit 102 can be a sub-grade pit or below ground level relative to the street level.

A water jet nozzle 104 made of flexible copper tubing, is used to flush out the spent resin 60 from the tanks 26. The water jet nozzle 104 is connected to a city water supply 108 or other source of pressurized water, such as a washout water tank 110 which holds recycled washout water 112 retrieved from washing out the tanks 26. The washout or pressurized city water is pumped to the water jet nozzle 104 by a washout pump 124 (which can be a centrifugal pump) in a water recycling loop. A pressure gauge 118 on the pump 67 continuously monitors and sets the pressure of the washout water 112 sent to the water jet nozzle 104. Excess washout water 112 recovered from the resin holding pit 102 via the resin holding pit outlet 120 is first passed to a washout water sump 122 where it is held until the water needed in the washout water tank 110, at which time, it is pumped to the tank 110 with a submersible washout water pump 124 in the sump 122.

The spent resin 60 suspended in water is transferred to one or more regeneration vats 140a-c with a non-abrasive resin transfer pump 130a. In the resin regeneration and recovery system 80, the spent resin 60 is transferred from the resin holding pit 102 to other vats and/or tanks using non-abrasive resin transfer pump 130a. A non-abrasive resin transfer pump 130b can also be used to transfer the regenerated resin generated from the present resin regeneration process. Advantageously, the non-abrasive resin transfer pumps 130a, b have moving pumping components that can pump resin without excessively abrading, deforming, or re-shaping the resin. Suitable versions of non-abrasive resin transfer pumps 130a, b and the resin-liquid mixture made for transferring resin are described below.

In the spent resin transfer process, a suction port 132 of the non-abrasive resin transfer pump 130a is fluidly connected through a flexible hose or pipe to the spent resin 60 in the resin holding pit 102 and an output port 134 of the pump 130a is connected to a vat resin inlet 136a-c of the regeneration vats 140a-c to transfer the spent resin 60 to the regeneration vats 140a-c. The vat resin inlets 136a-c are located in upper vat regions 138a-c of the vats 140a-c so that the spent resin 60 can flow into the vats 140a-c without draining any residual resin or water remaining in the vats. Also, the downward resin flow limits further damage to the spent resin 60 in the transfer process. In one version, the vat resin inlets 136a-c are located in the top 30% volume as measured from the top of the vats 140a-c.

In the embodiment illustrated, three regeneration vats 140a-c are shown; however, there may be only one vat or more than three vats depending on the volume of spent resin 60 to be regenerated. While a first vat 140a is filled with a first volume of spent resin 60 and then treated, a second vat 140b can be filled with a second volume of additional spent resin 60, and so on. The desired volume of resin is transferred into any one of the vats 140a-c, and the volume of resin transferred can be verified by an operator viewing through a sight glass window (not shown) on the side of the vats 140a-c. The regeneration vats 140a-c can be cylindrical tanks of steel plastic, or fiberglass, and they can be pressurized or open to the atmosphere. Alternatively, the regeneration vats 140a-c can be partially or entirely made from translucent polypropylene so that an operator can physically see the level of resin through the vat walls and turn off the resin transfer pump 130 when a vat is filled.

After the desired volume of spent resin 60 is loaded into any one or all of the regeneration vats 140a-c, the spent resin 60 is backwashed, as by step 12 of FIG. 1, by flowing backwash water 144 upward through the volume of spent resin 60, for example, as shown in the vat 140a, to remove suspended solids and particulates that would otherwise interfere with the efficiency of the resin regeneration process. Referring to FIG. 3A, the regeneration vat 140a is illustrated as being filled with spent resin 60 which is being backwashed with backwash water 144; however, the backwash process can be performed in any of the vats 140a-c. The backwash water 144 flows into the vat 140a through a set of backwash nozzles 148a-c located at the bottom of the vat 140a. For example, the backwash nozzles 148a-c can be a series of linear apertures at the bottom of the vats 140a-c which are sized and configured to promote even flow dispersion through the resin bed. The linear apertures can be elongated rectangles with square or arcuate corners. The linear apertures can also be covered with a screen having holes smaller than that of the smallest resin beads to allow the filtered backwash water 144 from the backwash recovery system to be introduced into the vats 140a-c without resin beads 24 flowing back into the linear apertures to escape the vat during the down flow of liquids in the vat.

A backwash supply tank 150 holds backwash water 144 which is cleaned prior to use for backwashing resin to avoid coating the spent resin 60 with resin fines 166 or other colloidal or suspended particulates. A backwash recovery pump 160 delivers backwash water 144 from the backwash supply tank 150 to any of the vats 140a-c at a flow rate and duration sufficiently low to prevent over-liquidization of the volume of spent resin 60 in the vats 140a-c. Typically, a resin bed expansion from about 50% to about 75%, which correlates to from about 5-gpm/ft$^2$ to about 6.5-gpm/ft$^2$ hydraulic loading rate, is used to effectively remove the solids accumulated on the spent resin 60. The regeneration vats 140a-c are sized wide enough in diameter to ensure proper hydraulic loading rates (gpm/ft$^2$), and tall enough to allow ample headspace for expansion of the bed of spent resin 60. If sized properly, only the resin fines 166, which are produced from normal wear and tear over the resin life, are lifted from the resin bed and escape from the upper vat region 138a-c of the regeneration vats 140a-c. In one version, the backwash recovery pump 160 has a variable frequency drive that receives a signal from a flow meter to speed up or down to maintain a pre-set flow rate that correlates to the previously mentioned hydraulic loading rates, depending on the hydraulic losses through the filter and different flow paths to the vats 140*a-c*.

After backwashing the spent resin 60, the backwash water 144 is sent to a backwash settling tank 164 to capture resin fines 166 that escaped the regeneration vat 140 during the backwash process. The resin fines 166 are retained for mixing with the regenerated resin 194 as they have high softening capacity due to the high surface area to volume ratio. The resin fines 166 accumulate at the bottom of the backwash settling tank 164 and are extracted from there via the backwash settling tank outlet 168. The backwash settling tank 164 can be a cylindrical tank with a conical bottom (not shown) to facilitate collection of the resin fines 166 from the bottom of the tank by gravity. The resin fines 166 can also be collected by suction with a non-abrasive resin transfer pump 130. The backwash settling tank 164 can also be made of a translucent material to allow the level of the resin fines 166 to be easily determined so that the resin fines can be removed from the bottom of the backwash settling tank 164 before they accumulate to reach the level of the backwash settling tank intake 170, which is typically a few feet from the bottom of the backwash settling tank 164. The resin fines 166 are reintroduced to the regeneration vats 140*a-c* after backwashing of the spent resin 60 in the vats 140*a-c* is completed and before the resin regeneration process is started to allow the resin fines 166 to be thoroughly remixed with the remaining spent resin 60. If the resin fines 166 are not dispersed thoroughly with the other spent resin 60, it is possible that an individual tank 26 of resin at a customer site will have too many resin fines 166 which can cause excessive headloss and pressure problems for the ion exchange apparatus 20 operating with the regenerated resins 194.

The supernatant of the backwash settling tank 164 is pumped through a backwash particle filter 184 via the backwash pump 160, either before a backwashing process is conducted or at the time the backwashing process is conducted. After filtering through the backwash particle filter 184, the cleaned backwash water 144 is transferred to the backwash supply tank 150. Periodically, either softened city water can be added to the backwash supply tank 150 to augment the water lost in backwashing, or excess backwash water 144 can be sent to a backwash water sump 178 using a backwash supply tank outlet 180 or sent back to the tank 150 when the backwash water level is low using backwash sump pump 182, which can be a submersible pump.

The backwash water 144 is cleaned before or after the backwashing process by filtering the backwash water 144 through a backwash particle filter 184 which uses a fine cloth or other structure to filter out particles. A suitable backwash particle filter 184 is a diatomaceous earth filter, cartridge filter, bag filter, microfiltration or nanofiltration membrane. In one version, the diatomaceous earth filter comprises a plurality of cartridge filters arranged in a revolver configuration, each of which is coated with the diatomaceous earth material which is a naturally occurring, soft, siliceous sedimentary rock powder having a particle size of from about 1 micron to about 1 mm, or even from about 10 to about 500 microns. The cartridge filter acts as an underlying drain to support the filter media. A suitable cartridge filter comprises a mesh size of from about 0.1 to about 100 microns, or even less than 10 microns, or even about 5 microns. When a diatomaceous earth filter is used, the media of the cartridge filter is backwashed when the pressure differential across the filter reaches 10 psi. Additional diatomaceous earth material is needed to recoat the filter bag after every backwash cycle per manufacturer suggestions. A suitable diatomaceous earth filter comprises a QUAD DE 100 filter fabricated by Pentair, Inc. Minneapolis, Minn. Alternatively, if a microfiltration membrane is used, the membrane is cleaned when the trans-membrane pressure exceeds the manufacturer recommendations by back-flushing the membrane with water in a pulsed flow, followed by air scouring.

After the spent resin 60 is backwashed in the regeneration vats 140*a-c* to remove particulates and solids, the spent resin 60 can be treated with regenerant solution 186, as in step 13 of FIG. 1. Initially, a first batch of fresh regenerant solution 186 is made and stored in a regenerant solution tank 188, which also serves as the tank for receiving recovered regenerant solution 186. The composition of the regenerant solution 186 depends on the composition of the spent resin 60 and the type of ions accumulated in the spent resin 60. In the example provided above, the cation exchange resins 22 accumulate divalent ions, such as calcium, magnesium and other ions, when used to treat hard water to obtain soft water. Such spent resin 60 can be regenerated using a regenerant solution 186 comprising a solution of sodium ions and chloride ions, e.g., obtained from brine which is sodium chloride dissolved in water. The water can be ordinary tap water, or can be purified water, such as distilled water. In one version, the brine solution contains sodium chloride dissolved in water in a weight percent concentration of from about 5 wt % to about 26 wt %, or even from about 10 wt % to about 15 wt %. In an exemplary version, a regenerant solution 186 comprising a salt concentration of 13% by weight, and made by dissolving 1797 pounds of sodium chloride in 1508 gallons of water, can be used to regenerate 120 cubic feet of spent resin 60 at a dosage of 15 pounds of salt per cubic foot of spent resin. The regenerant solution 186 comprising a brine solution of sodium chloride dissolved in water is useful for treating cationic exchange resins such as, for example, IONAC C-249 manufactured by SYBRON Chemicals. IONAC C-249 is an ion exchange resin 22 in the form of beads comprising crosslinked, polystyrene sulfonate cationic ion exchange resin and having bead sizes ranging from about 0.4 mm to about 1.2 mm.

Alternative types of regenerant solution 186 can be used depending on the composition of the ion exchange resin 22 being regenerated and the ions which need to be replaced from the ion exchange resin 22. For example, a regenerant solution 186 useful for regenerating an anion resin can include sodium or calcium hydroxide dissolved in water in sufficiently high concentration to regenerate the ion exchange capacity of the anion exchange resin. As another example, anion exchange resins, particularly weak base anion resins, can be used for some industrial water treatment processes, for example, to remove nitrates from water. Anion exchange resins are also be used to deionize water, such as in semiconductor manufacturing processes, which use a hydroxide presaturant ion and generate a brine solution that has a relatively high concentration of chloride ions. Chloride ions, as well as other common anions such as sulfate, carbonate, bicarbonate, nitrate, nitrite, and fluoride ions, can precipitate at low concentrations by treatment with a regenerant solution 186 comprising a heavy metal ion (e.g., lead, copper, barium). In these applications, the regenerant treatment composition 111 can include soluble ions of a heavy metal, which when mixed with the regenerant solution can precipitate the compounds containing the chloride, sulfate, carbonate, bicarbonate, nitrate, nitrite, and fluoride ions.

The regenerant solution 186 from a regenerant solution tank 188 is pumped using a regenerant solution pump 190 and dispersed in the regeneration vats 140*a-c* in a continuous flow via the overhead vat inlets 192*a-c* to provide flow dispersion across the surfaces of the spent resin 60. In FIG. 3A, the regeneration vat 140b is shown for illustration as containing spent resin 60 being treated with regenerant solution 186 to regenerate the spent resin 60; however, the regeneration process can be performed in any of the vats 140a-c.

Regenerant solution 186 is flowed through the spent resin 60 for sufficient time to regenerate the spent resin 60 to form regenerated resin 194, as in step 14, and spent regenerant solution as in step 15, of FIG. 1. The regenerated resin 194 has substantially the same ion concentrations as the fresh ion exchange resin 22, for example, an ion concentration difference of ±5% wt %. In one version, the regenerant solution 186 is passed through the vats 140a-c until the spent resin 60 is exposed to a total volume of regenerant solution in a volumetric ratio of spent resin to regenerant solution of from about 0.5:1 to about 2:1, or even 1:1. For example, a 1 liter volume of spent resin 60 comprising cation exchange resins can be exposed to a total volume of regenerant solution 186 of also about 1 liter. In one example, the regenerant solution 186 having the concentrations described above is passed through the regeneration vats 140a-c in a continuous flow for at least about 5 minutes or even from about 10 minutes to about 30 minutes, to regenerate the spent resin 60 to form regenerated resin 194. The regeneration process can be terminated after a fixed time, or using salometer readings in the regenerant vat drain line 200a-c which indicate that the spent regenerant solution 100 being released from the regeneration vats 140a-c no longer changes in salinity or other levels. At this time the remaining regenerant solution 186 passing through any of the vats 140a-c can be diverted directly to the regenerant solution tank 188 as this solution does not need to be recovered.

After the resin regeneration process, the regenerated resin 194 is rinsed as shown in step 16 of FIG. 1. The first two-thirds of the rinse volume (as shown in step 19 of FIG. 1) is diverted to the regenerant recovery system 205 for treatment as it has high salinity and hardness. In the rinsing step, which is shown for illustration as being performed in regeneration vat 140c in FIG. 3A but which can be performed in any of the vats 140a-c, rinse water 196 is pumped from a rinse water tank 198 through the regenerated resin 194 in any of regeneration vats 140a-c to rinse out regenerant solution 186 left on the regenerated resin 194. The rinse procedure is stopped after the proper volume of soft, non-saline rinse water 196 is passed through the regenerated resin 194, which can be determined when a conductivity meter 225 or salometer, which is mounted on the regeneration vat drain lines 200a-c and measures the spent rinse water 204 as it passes through the regeneration vat drain lines 200a-c, give readings that are substantially the same as (e.g., ±5%) the readings on fresh rinse water 196. In one version, about 50 to 100 gallons of rinse water 196 are used to remove most of the regenerant solution 186 and associated compounds (e.g., salt) from the regenerated resin 194. This amount of spent rinse water 204 can be diverted to the regenerant solution tank 188 as it has a large concentration of regenerant compound. After this time, another 300 to 600 gallons of water is used to further clean the regenerated resins 194, and this volume is sent to a salt water sump 197 (or a regenerant waste liquid sump 214, for possible recovery as regenerant solution 186. Thereafter, any additional rinse water 196 passing through the resin in the vats 140a-c, which is clean by now, is passed to the spent rinse water sump 202 for reuse rinsing additional regenerated resin 194 after suitable treatment. The spent rinse water 204 drained into the spent rinse water sump 202 is pumped by a submersible pump 206 to the regenerant recovery system 205, thermal distiller 420, or sewer system. The submersible pump 206 in the spent rinse water sump 202 is turned on when a float switch 208 indicates a high water level and continues to pump until the level in the sump 202 becomes a low water level.

After the regeneration process, the regenerated resin 194 is transferred to a regenerated resin tank 95 via vat resin outlets 98a-c of the regeneration vats 140a-c, respectively, each of which can also have vat resin valves 99a-c that open when the resin has completed regeneration and rinsing. The regenerated resin 194 is pumped out of the regeneration vats 140a-c using the resin transfer pump 130b with the appropriate plumbing lines. The regenerated resin 194 is reused in ion exchange apparatus 20 by refilling the tanks 26 of the ion exchange apparatus with the regenerated resin 194.

The resin regeneration and recovery system 80 treats spent regenerant solution 100, as shown in step 17 of FIG. 1, in a multi-step process to recover and recycle the regenerant solution 186. The regeneration process creates spent regenerant solution 100 comprising brine and the divalent ions removed from the spent resins 60. In conventional processes, the spent regenerant solution 100 was typically flushed out into the municipal water or sewage systems. Consequently, a large volume of spent regenerant solution 100 containing undesirable compounds was passed to the drainage system. This creates an environmental problem, generates a lot of wastewater, and is costly because a large volume of water is used to create new regenerant solution 186 as well as large amounts of sodium chloride or other compounds, all of which are wasted with each regeneration treatment cycle. In contrast, the recovered, purified regenerant solution 186 can be reused, by itself or with additional water or chemical compounds, to treat additional spent resin 60. The regenerant recovery process reduces the amount of regenerant solution 186 and salt needed to be discarded after an ion exchange resin regeneration process. This is good for the environment, reduces regeneration costs, and can even allow reuse of the compounds formed in the extraction of ions from the spent regenerant solution 100.

The spent regenerant solution 100 comprises different ions in varying concentrations depending on the nature of the ion exchange resins 22, the composition of the liquid being treated, and the ions removed from the liquids by the resins 22. For example, regenerant solution 186 comprising a brine solution can be used to treat spent ion exchange resins 22 which were used to remove multivalent ions 424 from water. The resultant spent regenerant solution 100 can contain (i) primary exchanging ions such as monovalent sodium ions which are used in the brine solution, (ii) secondary exchanged ions removed from the spent resin 60 such as divalent ions, e.g., calcium ions, magnesium ions, and other types of ions, in smaller concentrations, and (iii) solids removed from the spent resins 60. For example, the spent regenerant solution 100 can have a hardness of greater than 15,000 mg/L as $CaCO_3$, or even 40,000 mg/L as $CaCO_3$, depending on the amount of spent resin 60 being regenerated at a time and the amount of spent resin 60 that is fully exhausted. As another example, the spent regenerant solution 100 can have a salinity concentration of from about 10% to about 15% by weight. Thus, treatment of the regenerant solution 186 depends on the chemical composition of the solution at the time the regenerant solution 186 is extracted from the recovery system for treatment.

Referring back to FIG. 3A, the spent regenerant solution 100 is transferred from the regeneration vats 140a-c via the vat solution outlets 106a-c controlled by vat solution valves 105a-c to a regenerant waste liquid sump 214. For the sake of simplicity in the following description, spent regenerant solution 100 refers to spent regenerant solution by itself or a combination of spent regenerant solution and other types of regeneration waste liquids. The sump 214 collects the spent regenerant solution 100 and/or other salt containing waste liquids, such as an initial amount of spent rinse water, until it fills up, or there is enough spent regenerant solution 100 for a batch type regenerant recovery process. The spent regenerant solution 100 is then pumped from the regenerant waste liquid sump 214 using a spent regenerant pump 219, which can be a submersible pump or a centrifugal pump, to a spent regenerant tank 220 which is used to store the spent regenerant solution 100 until the regenerant recovery system 205 is to be operated. Spent regenerant solution 100 is pumped from the spent regenerant tank 220 to the regenerant recovery system 205 for treatment and recovery of the spent regenerant solution 100.

The portion of the resin regenerant and recovery system 80 used for treating spent regenerant solution 100 with a regeneration treatment composition 111 (as per step 17 of FIG. 1) is illustrated in FIG. 3B. In operation, the spent regenerant solution 100 is pumped to the inlet 109a of the regenerant recovery tank 296 using a regenerant solution pump 203 which can be a centrifugal pump. At this time, a sample of the spent regenerant solution 100 is drained off the pipeline and collected in the sample jar for analysis. The regenerant solution sample should be filled at the same rate of flow as the flow rate of spent regenerant solution 100 into the regenerant recovery tank 296 to get an accurate, representative water sample. The sample solution is chemically analyzed to determine the concentrations of different ions and compounds, such as, for example, any of magnesium, calcium, sodium, chlorine, and so on. The chemical analysis is then used to determine the composition of the regenerant treatment composition 111 that is used to regenerate the spent regenerant solution 100.

In one version, the spent regenerant solution 100 comprises a solution of sodium ions and chloride ions, for example, obtained from sodium chloride dissolved in water and which has dissolved divalent ions, such as calcium, magnesium, barium and other ions. A regenerant treatment composition 111 suitable to treat this composition of spent regenerant solution 100 comprises (i) a hydroxide component, comprising one or more hydroxide compounds, to remove soluble ions from the spent regenerant solution 100 that form precipitate flocs 114 containing hydroxide compounds, and (ii) a carbonate component, comprising one or more carbonate compounds, to remove soluble ions from the spent regenerant solution 100 that form precipitate flocs 114 containing carbonate compounds. Suitable hydroxide compounds comprise calcium hydroxide, sodium hydroxide, or other alkali or alkaline earth metal hydroxides. Suitable carbonate compounds comprise sodium carbonate or other alkali or alkaline earth metal carbonates. The hydroxide component is added in a molar ratio of at least about 70 mM of hydroxide ions per liter of spent regenerant solution 100, or even from about 30 to about 120 mM of hydroxide ions per liter. The carbonate component is added in a molar ratio of at least about 50 mM of carbonate ions per liter of spent regenerant solution 186, or even from about 60 to about 360 mM of carbonate per liter.

In one version, the regenerant treatment composition 111, used in step 17, comprises a hydroxide component comprising a mixture of calcium hydroxide and sodium hydroxide, and a carbonate compound comprising sodium carbonate. Advantageously, a mixture of calcium hydroxide and sodium hydroxide not only precipitates compounds from the spent regenerant solution 100 but also serves to add sodium ions to replenish the sodium ion concentration within the spent regenerant solution 100. The addition of sodium hydroxide assists in decreasing the sludge volume by producing a denser sludge.

As one example, a suitable regenerant treatment composition 111 can include calcium hydroxide, sodium hydroxide, and sodium carbonate. The calcium and sodium hydroxide can be added in an amount sufficient to precipitate at least about 90% of the magnesium ions in the spent regenerant solution 100 to form a first precipitate compound comprising magnesium hydroxide; and the sodium carbonate can be added in an amount sufficient to precipitate at least about 90% of the calcium ions in the spent regenerant solution 1000 to form a second precipitate compound comprising calcium carbonate. Precipitation of the calcium carbonate and magnesium hydroxide removes most of the undesirable divalent ions in the spent regenerant solution 100.

The amount of the regenerant treatment composition 111 added to the spent regenerant solution 100 to remove all the mineral hardness is determined by the background or baseline total mineral hardness in mg/L as $CaCO_3$. The mineral hardness concentrations in spent regenerant solution 100 used to regenerate a 120 cubic foot batch of spent resin 60 can be from about 10,000 to about 50,000 mg/L as $CaCO_3$ depending on how exhausted the spent resin 60 is at the time of the regeneration. Assuming that the regenerant treatment composition 111 comprises 99% pure calcium hydroxide, sodium hydroxide and sodium carbonate, the following dosages result in treated regenerant solution containing total hardness levels less than 300 mg/L as $CaCO_3$.

For total hardness concentrations in the spent regenerant solution 100 of from about 10,000 to about 25,000 mg/L as $CaCO_3$, 2,996 g/L calcium hydroxide or 40.43 moles/L calcium hydroxide: 0.2498 moles/L total hardness as $CaCO_3$; 2,996 g/L sodium hydroxide or 75.91 moles/L sodium hydroxide: 0.2498 moles/L total hardness as $CaCO_3$; and 23,968 g/L sodium carbonate or 226.1 moles/L sodium carbonate: 0.2498 moles/L total hardness as $CaCO_3$.

For total hardness concentrations in the spent regenerant solution 100 of from about 25,000 to about 35,000 mg/L as $CaCO_3$, 2,996 g/L calcium hydroxide or 40.43 moles/L calcium hydroxide: 0.3497 moles/L total hardness as $CaCO_3$; 2,996 g/L sodium hydroxide or 75.91 moles/L sodium hydroxide: 0.3497 moles/L total hardness as $CaCO_3$; and 29,960 g/L sodium carbonate or 282.7 moles/L sodium carbonate: 0.3497 moles/L total hardness as $CaCO_3$.

For total hardness concentrations in the spent regenerant solution 100 of from about 35,001 to 45,000 mg/L as $CaCO_3$, 2,996 g/L calcium hydroxide or 40.43 moles/L calcium hydroxide: 0.4496 moles/L total hardness as $CaCO_3$; 2,996 g/L sodium hydroxide or 75.91 moles/L sodium hydroxide: 0.4496 moles/L total hardness as $CaCO_3$; and 35,952 g/L sodium carbonate or 339.2 moles/L sodium carbonate: 0.4496 moles/L total hardness as $CaCO_3$. This ratio provides the benefits of consistent removal of the total hardness to less than 300 mg/L as CaCO3 while still maintaining the salinity, or salt concentration, of 10% to 13% by weight, required to regenerate subsequent spent cationic resin.

In the examples above, the chloride ion concentration in the treated regenerant liquid 342 can be adjusted by adding a chloride ion source, such as hydrochloric acid, to the treated liquid 342. For example, between 8 gallons and 16 gallons of 31.5% hydrochloric acid per 1,000 gallons of treated regenerant solution can be used to bring the pH down to an acceptable range of from about 6.5 to about 7.5.

The spent regenerant solution 100 in the regenerant recovery tank 296 is then pumped through piping 334 in a continuous flow through a chemical dispenser 280 into which a regeneration treatment composition 111 is fed for mixing with the spent regenerant solution 100. A diaphragm pump 65 is used to pump the spent regenerant solution 100 and from the bottom of the regenerant recovery tank 296 as the motive flow 55 for the chemical addition in the chemical dispenser 280. A peristatic pump, similar to the ones used for brining and resin transfer, can also be used as an alternative method of pumping the chemically dosed, soft, spent regenerant solution 100 without shearing the flocs 114 formed in the liquid.

A regenerant treatment composition 111 comprising the desired weights or concentrations of compounds capable of recovering the spent regenerant solution 100 is dispensed into the spent regenerant solution. For example, the regenerant treatment composition 111 can include at least one hydroxide component and at least one carbonate component which react with the regenerant solution to form treated regenerant liquid and precipitate flocs 114. In one version, solids comprising the regenerant treatment composition 111 are injected into the chemical dispenser 280 while the spent regenerant solution 100 is flowed across the dispenser 280 to achieve rapid mixing. In this step, a flow of spent regenerant solution 100 from a recovery tank outlet 107 of the regenerant recovery tank 296 is pumped through the piping 334 with the valve 307 in an open position using a diaphragm pump 65 so that a stream of spent regenerant solution 100 mixes with the regenerant treatment composition 111 dispensed from the chemical dispenser 280. The resultant solution stream comprising the regenerant treatment composition 111 is then passed into the second inlet 109b which is at the top of the regenerant recovery tank 296 to complete a closed loop system that is open to the atmosphere.

Figure 3C:
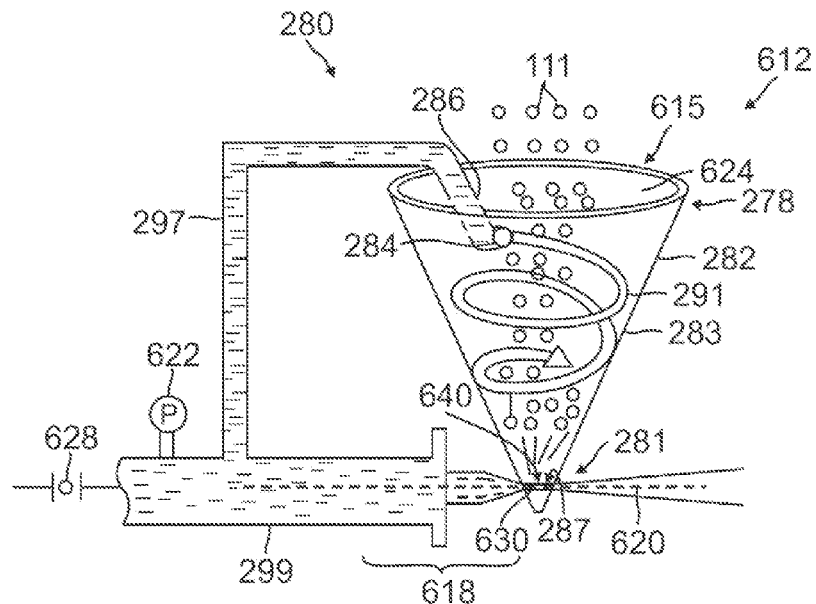
FIG. 3C is a schematic diagram of a chemical dispenser that includes a hopper and an eductor for mixing solids of a regenerant treatment composition into a flowing stream of spent regenerant solution.

In one version, the chemical dispenser 280 comprises a venturi mixer 281 that includes a hopper 278 having a mixing well 282 for more efficient mixing of the regenerant treatment composition 111 into the spent regenerant solution 100, as shown in FIGS. 3B and 3C. The mixing well 282 comprises a conical funnel 283 having a built-in water spray dispenser 286 comprising one or more wash-down nozzles 284 lining the funnel 283. The spray dispenser 286 can be connected via side tubing 297 to the main tube 299 that supplies liquid to the venturi mixer 281 to receive an offshoot of the liquid flow as it travels through the tube 299. The nozzles 284 of the spray dispenser 286 are oriented to spray liquid or mist down the internal sides of the mixing well 282 in a spiral flow 291. The spiral flow 291 of a stream or mist of liquid reduces airborne particulate emissions to dissolve and dilute the chemicals of the regenerant treatment composition 111 added to the mixing well 282 as the chemicals pass through the flow of spent regenerant solution 100. For example, the spray dispenser 286 can subdue powder fines from the hydroxide or carbonate compounds of the regenerant treatment composition 111 that would otherwise become airborne upon dispensing into the mixing well 282. The regenerant treatment composition 111 is added in a solid form to mixing well 282 to reach the venturi mixer 281 and achieve rapid mixing into the passing flow of spent regenerant solution 100 after passing through the venturi opening 287 at the bottom of the mixing well 282, as shown in FIG. 3C.

Referring to FIG. 3C, the venturi mixer 281 can be an eductor 612 having a pressure connection 618, a discharge connection 620, and one or more regulators 622. An eductor hopper 615 is positioned between the pressure connection 618 and the discharge connection 620, such that the hopper 615 comprises an inlet 624 configured to receive chemicals of the regenerant treatment composition 111, and an outlet 630 to dispense the chemicals of the regenerant treatment composition 111 to the liquid stream passing though a liquids channel 640. The liquid channel 640 passes a flowing stream of spent regenerant solution 100 past the outlet 630 of the hopper 615 to receive, and disperse, the dispensed regenerant treatment composition 111 into the flowing liquid stream. The composition 111 is passed to the flowing stream as it flows through the pressure connection 618 and the discharge connection 620. Pressure connection 618 and discharge connection 620 may be substantially integrated into piping 334 that transfers the spent regenerant solution 100 being treated in the regenerant recovery tank 296. The pressure connection 618 provides a pressure differential in liquid as it flows under the eductor hopper 615 so as to force liquid to increase velocity or mix with the chemicals of the regenerant treatment composition 111, such as the hydroxide and carbonate chemicals, as they are introduced. It should be further appreciated that one or more regulators 622 may be implemented to assist in regulation of flow of water to eductor 612 or to assist in creation of suction in the eductor hopper 615. One or more valves 628 can also be used to assist in management of the pressure regulator 622. The venturi mixer 281 can achieve a mixing intensity of approximately $200\ s^{-1}$ and provides thorough chemical dispersion in the spent regenerant solution 100.

The chemical-laden spent regenerant solution 100 is pumped in a closed loop through the piping 334 back to the regenerant recovery tank 296 and again through the chemical dispenser 280 to receive additional regenerant treatment composition 111. This closed loop pumping system is continued by pumping using the diaphragm pump 65 until all of the regenerant treatment composition 111 has been added to the spent regenerant solution 100.

In the regenerant recovery tank 296, a circulation mixer 275, such as the suspended impeller mixer 322 provides slow mixing of the spent regenerant solution 100 with the dispersed regenerant treatment composition 111 to dissolve the chemical compounds and allow undesirable ions in the spent regenerant solution 100 to precipitate out as precipitated compounds in the spent regenerant solution 100 within the tank 296. The suspended impeller mixer 322 in the regenerant recovery tank 296 provides slow mixing to allow the precipitated compounds to coalesce into precipitate flocs 114, for example, precipitated hydroxide or carbonate compounds. For example, a suitable slow mixing rate that allows precipitate flocs 114 of the precipitated compounds to form in the chemically-treated solution is from about $10\ s^{-1}$ (one rotation in about ⅒ sec) to about $15\ s^{-1}$.

The precipitate flocs 114 formed in the spent regenerant solution 100 are separated from the treated regenerant liquid 342, as per step 18 of FIG. 1, to form a separated regenerant solution or supernatant, such as, for example, the filtered regenerant solution 374. In one version, the precipitate flocs 114 formed in the spent regenerant solution 100 are separated by passing the liquid through a solids separator 500 such as a filtering system 324, (e.g., a filter press or centrifuge). After the precipitate flocs 114 being to be formed, the impeller mixer 322 in the tank 296 is stopped and the inlet valve 305 on the filter press 300 is opened while the bypass valve 307 is closed. This causes treated regenerant liquid 342 (comprising spent regenerant solution 100 and precipitated flocs 114) to flow through an intake 310 of the filtering system 324 and filtered regenerant solution 374 to begin flowing out of the outlets 311a, b and the opened outlet valves 308a, b. In one version, the filtering system 324 comprises a filter press 300 which separates the flocs of precipitated carbonate and hydroxide compounds while allowing filtered regenerant solution 374 to flow through the press 300. A suitable filter press 300 provides filtration and separation of particles sized from about 0.1 to about 100 microns, or even from about 1 to about 20 microns (e.g., 5 micron).

The residue from the filter press 300 comprises solids generated in the form of the filter cakes 304 comprises precipitated compounds, including precipitated calcium carbonate and magnesium hydroxide. The filter cakes 304 can be resold or disposed of, or transferred to and stored, in a solids disposal dump 346. For example, the filter cakes 304 can be used as additives/by-products in the following for cement, the purification of iron ore in blast furnace, drilling liquid in oil industry, seacrete/Biorock, which is a high strength concrete and coral, paint extender, plastic filler, powder used in microporous baby diaper film, chalk, product in adhesives and sealants, replacement of kaolin in production of glossy paper, bleaching solutions, non-hazardous alkali to neutralize acidic wastes, smoke suppressant, fire retardant, wastewater treatment plant, odor control, and seeding agents. The filter cakes 304 or precipitate flocs 114 can also be disposed of in a non-hazardous landfill or used as a by-product in concrete aggregate, cement gypsum, and many other industries.

The supernatant or filtrate, namely the filtered regenerant solution 374, from the filter press 300 is separated and passed to the regenerant recovery tank 296 for reuse as per step 21 of FIG. 1. The filtered regenerant solution 374 is transferred via piping 334 and through open valve 289 in a closed loop while valve 289 is closed, and the clarity of the filtrate liquid throughout this process is visually inspected. Once the filtrate clarifies to drinking water clarity, the valves 289 and 290 are reset to close valve 289 and open valve 290 to allow all the filtered liquid flow to enter the pH-adjusting tank 350. The filtered is now pumped using the diaphragm pump 65 through the filter press 300, across valve 290, and into the pH-adjusting tank 350.

Thereafter, the pH of the filtered regenerant solution 374 is adjusted as per step 23 of FIG. 1, in the tank 350, by a pH adjuster 351 to set the pH to the desired level. For example, the pH can be adjusted by adjusting the concentration of at least one of the sodium ions or chloride ions in the filtered regenerant solution to be substantially the same, for example, ±10%, or even ±5%, of the concentration of the sodium ions or chloride ions in fresh regenerant solution 186. The pH of the filtered regenerant solution 374 can be adjusted in the tank 350 by a pH adjuster 351 to set the pH to the desired level and to have a sufficient number of chloride ions to balance the sodium ions from the added sodium hydroxide of the regenerant treatment composition 111. It should be noted that the treated regenerant liquid 342 in the regenerant solution tank 188 typically contains from about 10% to about 13% by weight sodium chloride.

In one version, the pH adjuster 351 comprises a chloride ion source that is capable of supplying chloride ions, such as a chloride-containing compound, e.g., a chloride-containing acid such as hydrochloric acid. The hydrochloric acid is stored in a pH-adjuster tank 387 which can serve as an acid source tank, which is pumped using a pH-adjuster feed pump 389 (or a chloride ion adjusting pump) to an inlet 392 of the tank 350. The pH adjuster 351 comprising the chloride ion compound is added to the separated regenerant solution 374 to change the pH of the solution. The pH of the regenerant solution can be adjusted to be within a value that is within about, ±10%, or even ±5%, of the pH of the fresh regenerant solution 186. In one example, the chloride-containing compound can be added to the separated regenerant solution 374 in a volume sufficiently high to adjust the pH of the separated regenerant solution 374 to be in the acceptable range of from about 6.5 to about 7.5. The chloride-containing compound can also be added in a volume sufficient to obtain a chloride ion concentration in the separated regenerant solution 374 that is within about ±10%, or even ±5%, of the chloride ion concentration in the fresh regenerant solution 186. For example, from about 8 gallons to about 16 gallons of 31.5% hydrochloric acid per 1,000 gallons of treated regenerant liquid 342 or separated regenerant solution 374 can be added to the spent regenerant solution 100 to bring the pH down to an acceptable range of from about 6.5 to about 7.5.

An impeller mixer 394 is used to mix the hydrochloric acid into the separated regenerant solution 374. An online pH meter 396 that is continually submersed in the solution in the pH-adjusting tank 350 indicates the when the operator can de-energize the pH-adjuster feed pump 389 when the pH falls with the desired neutral range. As an alternative, periodic grab samples can be taken from the pH adjusting tank 350 to verify when the feed pump 389 can be de-energized.

After adjusting the pH, the separated regenerant solution 374 becomes a treated regenerant liquid 342 which is ready to be recycled as fresh regenerant solution 186, and consequently, pumped by the solution transfer pump 230 back to the regenerant solution tank 188. The treated regenerant liquid 342 is recycled and recovered regenerant solution 186 and is pumped by the regenerant solution pump 190 to the resin regeneration vats 140a-c for treatment of additional batches of spent resin 60. Approximately $\frac{1}{10}^{th}$ to $\frac{1}{15}^{th}$ of the initial volume of the treated regenerant liquid 342 is left at the bottom of the regenerant recovery tank 296. The volume of precipitate flocs 114 in this liquid acts as a seeding agent to provide nucleation sites for the next batch of filtered regenerant solution 374 which is to be treated in the regeneration treatment process.

Figure 3D:
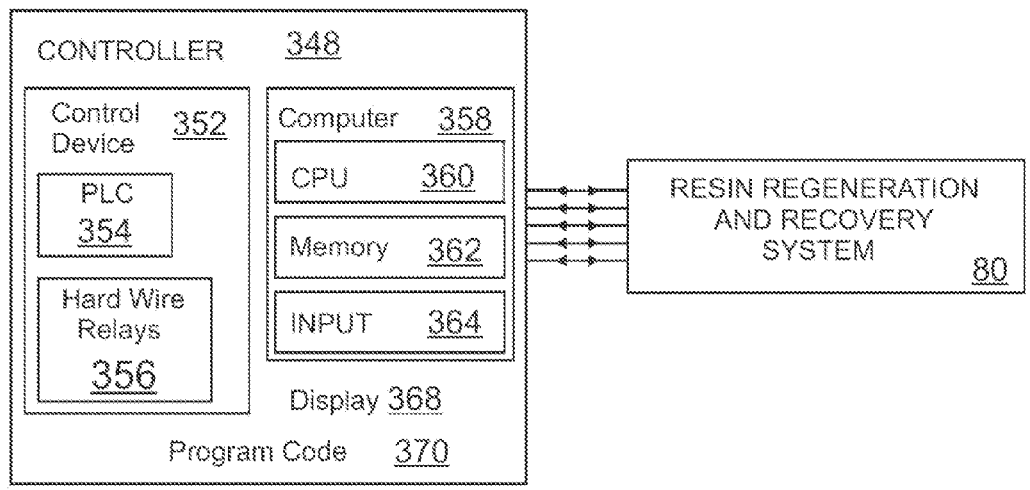
FIG. 3D is a schematic diagram of a system controller for controlling the resin regeneration and regenerant recovery system of FIGS. 3A to 3C.

The resin regeneration and recovery system 80 described above can be manually operated or operated with one or more control devices 352 and/or a system controller 348 which controls many operations, or even all the operations, of the regenerant recovery process. An exemplary embodiment of a system controller 348, as shown in FIG. 3D, can be a single control device 352 or a set of control devices 352a-i, such as a plurality of separate or individual control devices (e.g., packaged control panels). The control devices 352 can include switches, programmable logic chips (PLC) 354, and/or hard wire relays 356, and can operate independently or in conjunction with each other.

In one version, the systems controller 348 is a general purpose computer 358 comprising a CPU 360 with memory 362 and an input device 364, which receives and sends signals to all of the devices of the system 80 to control the devices or display their signals in a display 368. The system controller 348 may be also used to display the status of: the different processes of the resin regeneration and regenerant treatment process; the volume of resin or liquid in any of the tanks, pits, or vats that are filled with fresh resin 22, spent resin 60, regenerated resin 194, regenerant solution 186, rinse water 196, backwash water 144, spent regenerant solution 100, or other liquids; salinity or pH of the solutions; soaking or flow time of any of the liquids through the spent resin 60; the volume or mass of chemicals being added to form the regenerant treatment composition; and other process functions. The system controller 348 is programmed with program code 370 comprising suitable operating code instructions written in computer language such as C++, assembly language or the like or even programmed directly into a programmable logic chip. The program code 370 is computer code or instructions sets of code that operate valves, pumps, filters, level indicators, chemical dispensers, hoppers, and other components of the system 80 to perform the process shown in FIG. 1. The program code 370 accepts incoming signals comprising data or instructions from these components and also sends outgoing signals comprising instructions or data to these devices. For example, the system controller 348 can be programmed to control the regenerant recovery process in the resin regeneration system 80, and accordingly, is connected to the various pumps, valves, chemical dispensers, and other control systems of the system 80. The system controller 348 can also control these devices and components, receive signals from them, and transmit signals from the devices to one another or to an operator.

The resin regeneration and recovery system 80 described herein allows recovery of greater than 90%, or even 98%, of the spent regenerant solution 100. This greatly reduces the environmental impact that would otherwise be caused by the disposal of these materials, especially when the regenerant solution 100 contains a large amount of sodium chloride. The resin regeneration and recovery system 80 also reduces water consumption and saves the cost of the chemical compounds used in the recycled regeneration solution 100, as they are retained in the solution while undesirable ions are removed by the recovery process.

Batch-Type Regenerant System II

Another exemplary embodiment of a batch-type resin regeneration and recovery process is illustrated in the flowcharts of FIGS. 4A to 4D. The resin regeneration and recovery system 80 processes spent resin 60, comprising spent cation exchange resin bead, from the tanks 26 of a plurality of ion exchange apparatus 20, as previously described. The resin 60 is regenerated with regenerant solution 186 to form spent regenerant solution 100, which is treated and recovered for recycling in the process by itself or mixed with other regenerant waste liquids such as spent rinse water 204 or backwash water 144. Again, for the sake of simplicity, spent regenerant solution 100 refers to spent regenerant solution by itself or a combination of spent regenerant solution 100 and other types of regeneration waste liquids. In one version, the system 80 can, for example, be used to regenerate at least 3,000 gallons per day of spent regenerant solution 100 per day; recover at least 2,000 gallons per day of backwash water; and recover at least 1,800 gallons per day of spent rinse water 204. This recovery process can substantially eliminate waste regeneration liquids from resin regeneration and recovery process 80 by giving a more environmentally friendly and cost-effective resin regeneration process.

Figure 5A:
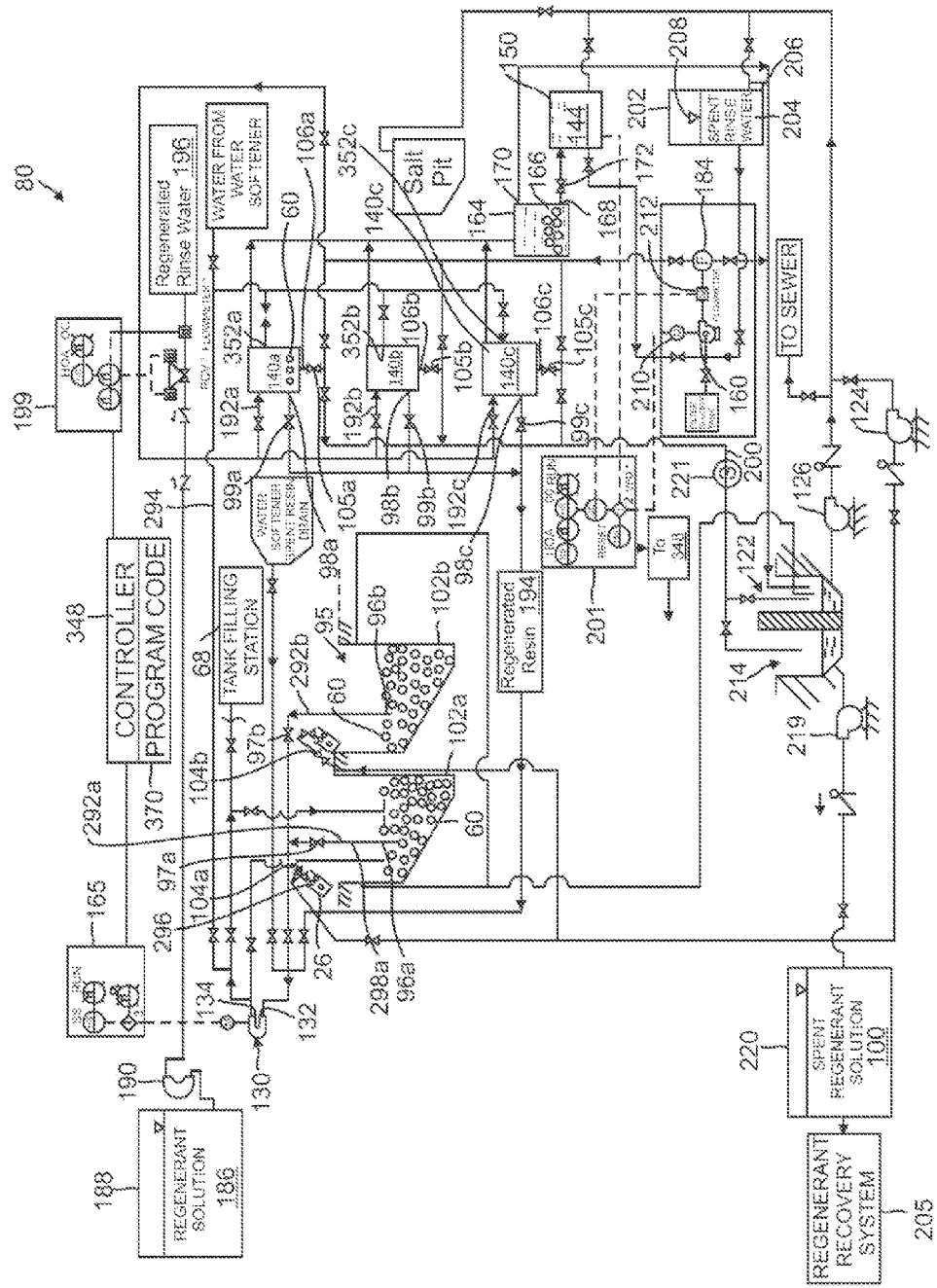
FIG. 5A is a schematic diagram of a portion of another exemplary embodiment of a resin regeneration system for regenerating spent resin, and treating and recovering spent regenerant solution.

A resin regeneration and recovery system 80 for regenerating spent resin 60 according and recovering spent regenerant solution 100 is illustrated with reference to FIGS. 5A to 5B. The spent resin 60 from a plurality of tanks 26 is transferred to one of the sub-grade resin holding pits 102a, b. A pair of pits 102a, b can be used to allow shifting the receiving location of the spent resin 60 from a first resin holding pit 102a to a second resin holding pit 102b. Each individual tank 26 is tipped to allow spent resin 60 to evacuate into one of the pits 102a, b. The tank 26 should not be filled with fresh resin 22 when dumping the spent resin 60 into the resin holding pit 102a. Additional tanks 26 are emptied into a first resin holding pit 102a until the pit is filled to the top with spent resin 60, at which time, any additional or leftover tanks 26 are emptied into a second, standby resin holding pit 102b.

A water jet nozzle 104a, b is directed into the cavity of each tank 26 to flush out spent resin 60 from the tanks 26 into the resin holding pits 102a, b using water from the washout sump 122 which is pumped with a washout water pump 124. The washout water pump 124 is energized when the water jet nozzles 104a, b are opened and deenergizes when the nozzles are closed. To fill the washout sump 122, a backwash recovery pump 160 sucks dirty water from a backwash supply tank 150. Also, the floor drain water overflows the dump pit and drains to the washout water sump 122 which is provided to hold non-salty water. From the washout water sump 122, the drain water can also be transferred to a backwash recovery settling tank 164 or to the sewer using a drain pump 126. During spent resin dumping into the pits, a recirculation pump (not shown) which circulates water in the resin holding pit 102 should be in standby mode. The washout water pump 124 can also serve as the recirculation pump by pumping washout water from the sump 122 to the resin holding pits 102a, b.

After a resin holding pit 102a, b is filled with spent resin 60, a resin distribution manifold 165 is configured so that spent resin 60 can be transferred to a resin regeneration vat 140a-c. A non-abrasive resin transfer pump 130 is used to transfer the spent resin 60 by connecting a suction port 132 of the pump 130 to the one of the resin holding pits 102a,b and an output port 134 of the pump 130 to one of the resin regeneration vats 140a-c. A call to transfer the spent resin 60 from a resin holding pit 102a, b to a regeneration vat 140a-c can be initiated manually by activating the resin transfer pump 130 or via a command from a system controller 348, as previously described, which sends signals to the resin distribution manifold 165.

In the pumping process, a liquid such as water is added to the spent resin 60 in the resin holding pits 102a, b to form a liquid-resin mixture that facilitates pumping the resin between sites without having to add a large amount of water to the resin. In one version, the liquid-resin mixture comprises a volumetric ratio of resin to water of from about 0.5:1 to about 2:1. For example, to form liquid-resin mixture having a volumetric ratio of resin to water of about 1:1, one gallon of water is added for each gallon of resin to form the liquid-resin mixture in the pits 102a, b. As compared to conventional centrifugal pumps, the non-abrasive resin transfer pump 130 uses a ratio of resin to water which reduces the amount of water required to transfer the resin by a factor of 10, or even a factor of 15. This substantially increases the speed of resin transfer. Further, the non-abrasive resin transfer pump 130 does not deform or otherwise change the resin bead shape and also reduces erosion of the resin and formation of resin fines 166 during pumping operations. For this reason, the non-abrasive pump 130 is advantageous compared to conventional centrifugal pumps.

The resin transfer process from a resin holding pit 102a to a regeneration vat 140a-c is stopped when a desired resin volume level is reached in a regeneration vat 140a-c via a command from the controller 348 to stop the resin transfer pump 130. The resin volume level can be determined from the fill height of the spent resin in the vat 140a-c which is visually estimated through a sight glass or from a semi-transparent wall of the vat 140a-c. In the transferring process, the spent resin 60 from the resin holding pit 102a, b is sucked out via the resin receiving pipes 292a, b which terminates in the resin pit outlets 96a, b with resin tank valves 97a, b, respectively, turned to the "flow" position, to suction port 132 of the resin transfer pump 130. The pump 130 outputs the spent resin 60 through outlet port 134 to flow via resin transfer pipe 294 to the vat resin inlets 136a-c until one or more of the vats 140a-c are filled with spent resin 60. In the same manner, spent resin 60 from resin holding pit 102b can be sucked out via the resin receiving pipe 292b which terminates in a pit resin outlet 96b, with resin tank valve 97b turned to the "flow" position.

After the desired volume of spent resin 60 is loaded into any one or all of the regeneration vats 140a-c, the spent resin 60 is backwashed with backwash water 144 in the vats 140a-c to remove suspended solids and particulates that would otherwise interfere with the efficiency of the resin regeneration process. The spent resin 60 is backwashed by passing a stream of water upwardly though the spent resin. In this step, the vat valve manifold 199 is configured to allow backwash water 144 to fluidize the spent resin 60 in the vat 140a which is ready for backwashing. The backwash supply tank 150 holds clean or filtered water to be used as the backwash water 144. The backwash water 144 is passed through the vat 140a to remove resin fines 166 and other colloidal and suspended particulates that would otherwise coat the spent resin 60 and reduce the efficiency of regenerating the resin. In the backwashing step, a backwash recovery pump 160 is energized to deliver clean or filtered backwash water 144 from the backwash supply tank 150 at a flow rate and duration sufficiently low to prevent over-liquidization of the resin bed (volume of resin in tank) of spent resin 60 in the vats 140a-c. Typically, a resin bed expansion from about 50% to about 75%, which correlates to from about 5-gpm/ft$^2$ to about 6.5-gpm/ft$^2$ hydraulic loading rate, is used to effectively remove the solids accumulated on the beads of spent resin 60. The regeneration vats 140a-c are sized wide enough in diameter to ensure proper hydraulic loading rates (gpm/ft$^2$), and tall enough to allow ample headspace for expansion of the bed of spent resin 60. If sized properly, only the resin fines 166, which are produced from normal wear and tear over the resin life, are lifted from the bed and escape the top of the regeneration vats 140a-c.

The resin fines 166 drawn out of the regeneration vats 140a-c during the backwash process are recaptured by transferring the spent backwash water 207 from the vats 140a-c to a backwash settling tank 164. The resin fines 166 accumulate at the bottom of the backwash settling tank 164 and are extracted by opening a drain valve on a tank outlet 168 before they accumulate to reach the level of the backwash settling tank intake 170, which is typically a few feet from the bottom of the backwash settling tank 164. For a backwash settling tank 164 having a conical bottom, the resin fines 166 are evacuated using block and bleed valves 172. The resin fines 166 can also be collected by suction with a venturi-injector or peristaltic pump. The resin fines are removed from the bottom of the backwash settling tank 164 and reintroduced to the regeneration vats 140a-c after backwashing of the spent resin 60 in the vats 140a-c and before the resin regeneration process to allow the resin fines 166 to be thoroughly remixed with the spent resin 60 as the fines have high softening capacity due to the high surface area to volume ratio.

Recycled floor drain water can also be transferred by a backwash recovery pump 160 to a backwash recovery tank. When there is enough backwash water 144 (or drain water) in the backwash supply tank 150, this dirty water is filtered and reused to backwash another batch of spent resin 60 in a vat 140a-c. In this process, the dirty water in the tank is pumped out by the backwash recovery pump 160, passed through a particle filter 184 (as previously described), and then pumped into the regeneration vats 140a-c to backwash the spent resin 60 in the vats in a closed loop configuration. In this step, the flow rate on the VFD 210 is set to achieve the desired resin bed expansion in the vats 140a-c and controlled by a signal from a backwash flowmeter 212. Typically, the signal from a flowmeter 212 is at provided in a current range of from about 4 to about 20 mA. The backwashing step is completed when the backwash water 144 overflowing from the vats 140a-c has cleared up sufficiently as visible through a semi-transparent backwash overflow pipe, such as polyvinyl chloride (PVC) pipe. The filtered backwash water 144 is transferred to the backwash supply tank 150 and stored in the tank or sent directly to another regeneration vat 140a-c ready for back-washing at the hydraulic fluid loading rate required to properly liquidize the resin bed. Periodically, softened city water can be added to the backwash supply tank 150 to augment the water lost in backwashing if a media or membrane system is used for filtration. The used or reclaimed water can also be removed after a period of time or when it reaches a threshold, such as a high bacteria count, undesirable dissolved material, or other factors.

After the spent resin 60 is backwashed in the regeneration vats 140a-c to remove particulates and solids, the spent resin 60 is treated with regenerant solution 186. Initially, a first batch of regenerant solution 186 is made having a concentration of sodium chloride in about 10 wt % to about 13 wt % in softened water and stored in a regenerant solution tank 188. The regenerant solution 186 can be made adding sodium chloride to water in a ratio of ½ volume of saturated brine solution with ½ volume of softened water. The regenerant solution tank 188 also serves to store recovered regenerant solution 186. The composition of the regenerant solution 186 depends on the composition of the spent resin 60, original resin 22, and the type of ions accumulated in the spent resin 60. In the example provided above, the cation exchange resins accumulate divalent ions, such as calcium, magnesium and other ions, when used to treat hard water to obtain soft water. Such spent resin 60 can be regenerated using a regenerant solution 186 comprising sodium chloride, that is, a brine solution of water with dissolved sodium chloride. The water can be any hard water supply with total hardness levels above 140 mg/L as CaCO3.

Figure 5B:
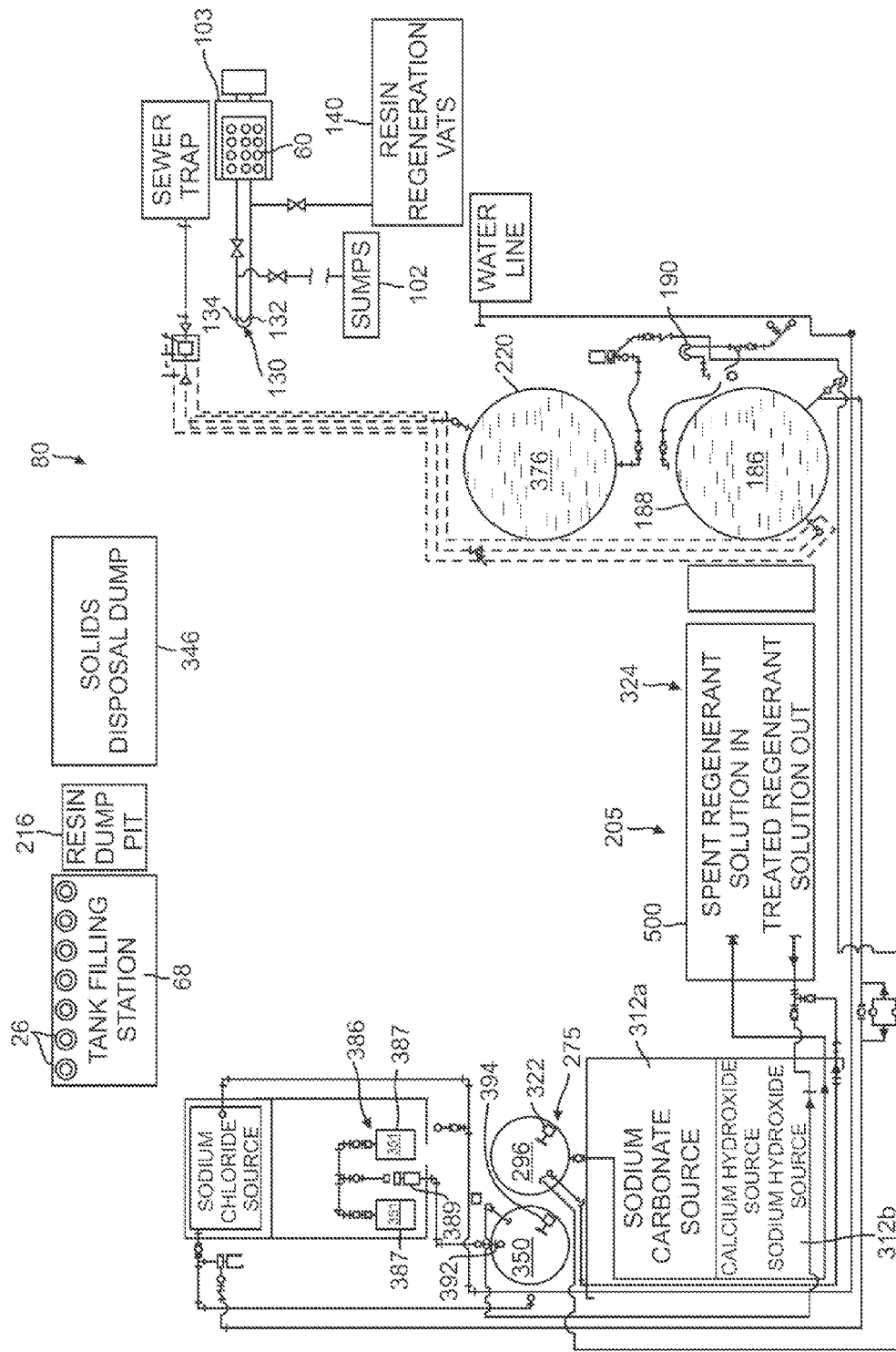
FIG. 5B is schematic diagram of another portion of the regeneration and recovery system of FIG. 5A.

The fresh or recovered regenerant solution 186 is pumped from the tank 188 into one of the regeneration vats 140a-c through the vat inlets 192a-c using a regenerant solution pump 190 as shown in FIG. 5B. The regenerant solution pump 190 can be a positive displacement, peristaltic pump, similar to the non-abrasive resin transfer pump but having a variable frequency drive device that ramps the rotation of the rollers up or down to maintain a consistent set flow rate as entered in the pump display by an operator. Since the volume of the regenerant solution 186 in the hose of the peristaltic pump is constant, increasing or decreasing the rotational speed of the rollers results in increasing or decreasing the instantaneous flow rate. Advantageously, the chemically corrosive nature of the regenerant solution 186 comprising salt brine does not adversely affect the pump 190 since only the chemically compatible hose is in contact with the salt brine of the regenerant solution 186.

An alternative regenerant solution pump 190 is a magnetic drive centrifugal pump having a variable frequency drive (VFD) connected to an internal or external programmable logic controller. A flow meter outputting a signal of 4 to 20 mAmps is provided on the discharge of the pump to control the flow rate therethrough to the calculated flow rate. A programmable logic circuit (PLC) ramps up or down the speed of the VFD depending on the desired flow rate and the signal from the downstream flow meter. The magnetic drive pump has neodymium magnets that rotate a seal-less ceramic impeller in an enclosed volute. Such pumps are good replacements for mechanical sealed pumps in corrosive duty applications. Magnetic drive pumps can also achieve pump efficiencies of up to 70%, which results in significant savings of electricity. They also have very high corrosion resistance since they are durably molded from corrosion resistant polypropylene or PVDF.

In the resin regeneration step, the vat valve manifold 199 is configured to allow the regenerant solution 186 to flow through the spent resin 60 for a sufficient time at a sufficiently high flow rate to regenerate the spent resin 60 into fresh resin 22. The desired time duration that the regenerant solution 186 is passed through the spent resin 60 in any of the vats 140*a-c* is calculated and depends on the flow rate, percentage concentration of salt in the regenerant solution, and the resin dosage. In an exemplary calculation for the flow duration with respect to flow rate, a one gallon volume of spent resin 60 comprising cation exchange resins can be exposed to regenerant solution 186 comprising a salt brine solution having sodium chloride in a strength of from about 10 wt % to about 13 wt %, and a dosage rate of 10 pounds per cubic foot to 20 pounds per cubic foot of resin. Household self-regenerating water softeners can regenerate with lower brine concentrations with sodium chloride concentrations of from about 4 wt % to about 8 wt %, and a dosage rate of 4 pounds per cubic foot to 6 pounds per cubic foot of resin. At a concentration of 10% by weight sodium chloride and a dosage of 20 pounds per cubic foot for a 120 cubic foot resin regeneration will result in approximately 2,680 gallons of spent brine solution, or 22.3 gallons per cubic foot of resin. At a concentration of 13% by weight sodium chloride and a dosage of 10 pounds per cubic foot for a 120 cubic foot resin regeneration generates approximately 1,005 gallons of spent regenerant solution comprising brine, or 8.3 gallons per cubic foot of resin.

While the examples provided herein are illustrated with respect to a regenerant solution 186 comprising a brine solution, other compositions of regenerant solution 186, such as potassium chloride, can also be used depending on the nature of the resins 22 and the desired water quality. The regenerant solution 186 is passed across the spent resin 60 for sufficient time and flow rate to regenerate the spent resin 60 to fresh resin. For example, the regenerant solution 186 can be passed through the vat 140 in a co-current or countercurrent continuous manner at a hydraulic loading rate of 0.4 gallons per minute per square foot of vat surface area to 4.0 gpm/ft2, until the desired volume of fresh brine, at the previously stated concentrations, has been introduce to the resin 60 in the vat 140.

Spent regenerant solution 100 flows out from the bottom of the regeneration vats 140*a-c* via the vat solution outlets 106*a-c* controlled by vat solution valves 105*a-c* to a regenerant waste liquid sump 214 which collects the spent regenerant solution 100 until it fills or there is enough spent regenerant for a regenerant recovery process. The spent regenerant solution 100 is then pumped from the regenerant waste liquid sump 214 using a spent regenerant pump 219 (which can be a submersible pump or a centrifugal pump) to a spent regenerant tank 220 which is used to store the spent regenerant solution 100 until it is pumped to the regenerant recovery system 205 for treatment and recovery of the spent regenerant solution 100.

It should be further noted that the first portion of the regenerant solution 186 passing through the vats 140*a-c* can be allowed to flow back to the backwash supply tank 150 until the measured total dissolved solids (TDS) in the outflow begins to rise up to levels higher than the city water supply 108, as this portion represents flushed-out backwash water 144 that can be reused for backwashing the resin. Thereafter, the remaining portions of the regenerant solution 186 comprises a concentration of salt that is closer to that of fresh regenerant solution, in addition to the ions extracted from the spent resin 60, and this spent regenerant solution 100 is collected for treatment for recovery and recycling as explained below.

The resin regeneration process is completed when a magnetic flow meter totalizer (not shown) on the pump 190 indicates a total flow of regenerant solution 186 that passes through the pump which corresponds to the predetermined calculated volume of regenerant solution required to be passed through the resin bed in the regenerant vats 140*a-c* to regenerate the spent resin 60. A suitable magnetic flow meter totalizer that indicates instantaneous flow in gallons per minute and total flow in thousands of gallons comprises a PROMAG 53 manufactured by Endress+Hauser, Greenwood, Mass.

After performing the regeneration process, the regenerated resin 194 is rinsed with rinse water 196 at a predetermined or calculated flow rate to achieve exposure of the regenerated resin 194 to predetermined volume of rinse water 196, the rinse water comprising softened or distilled water. In the rinsing step, the vat valve manifold 199 and the main water distribution manifold 201 are configured to allow rinse water 196, comprising either soft filtered chlorinated rinse water or distilled water from the thermal distillation recovery process, to enter the regeneration vats 140*a-c*. The rinse water 196 enters the vats 140*a-c* from the top vat inlets 192*a-c* and exits from the bottom vat solution outlets 106*a-c* by gravity where it flows past a salometer 221 and then flows into the spent rinse water sump 202. During the rinsing process, the initial volume of spent rinse water 204 that passes across the regenerated resins 194 forces out a substantial quantity of the regenerant solution 186 comprising brine. Accordingly, this initial volume of spent rinse water 204 has a high salt concentration and is passed to the regenerant waste liquid sump 214. In the example provided above, this initial volume of the salty spent rinse water 204 comprises typically from about 50 to about 100 gallons. When the float switch 208 of a submersible pump 206 in the spent rinse water sump 202, as shown in FIG. 5A, indicates that the sump 202 has been filled with rinse water 196, the submersible pump 206 activates to pump the spent rinse water 204 to the regenerant recovery tank 296 shown in FIG. 5B. Any residual portion of the rinse water 196 is then directed to a flow-monitored sewer connection or to a thermal distiller 420 for distillation.

In the rinsing process, the proper volume of rinse water 196 should be passed over the resin to thoroughly rinse the regenerated resin 194, and this rinse end step can be determined when a conductivity or salometer 221 on the vat drain line 200 indicates readings equal to those obtained on fresh rinse water. For example, the resin rinsing process is completed when the salometer 221 on the drain line 200 of the regeneration vats 140*a-c* indicates that the excess salt from the regenerant solution 186 has been substantially entirely rinsed off the regenerated resin 194. In this situation, the salometer 221 would indicate a low level of residual salt (for example, less than 0% by weight salt concentration, or 50 Mmho conductivity) in the flowing spent rinse water 204.

After the resin has been rinsed, the regenerated resin 194 is transferred out of the regeneration vat 140 using a resin transfer pump 130 with the appropriate pipelines and isolation valves. In the resin transfer process, the resin distribution manifold 165 is configured to purge spent resin 60 into resin dump so as not to contaminate regenerated resin 194 that utilizes the same peristaltic pump and a portion of the main suction and discharge line.

At this stage, the regenerated resin 194 is fully rinsed off and ready for reuse. The resin distribution manifold 165 is configured and the resin transfer pump 130 turned on to transfer the regenerated resin 194 into the tanks 26 in the tank filling station 68. Thereafter, when the tanks 26 of the ion exchange apparatus 20 are ready to be filled with freshly regenerated resin 194, the resin distribution manifold 165 is configured and the resin transfer pump 130 turned on to transfer the regenerated resin 194 into a plurality of individual tanks 26. After all of the regenerated resin 194 has been filled into a number of tanks 26, the tanks 26 are loaded onto a delivery truck 103 and delivered back into ion exchange apparatus 20 in residential homes or offices.

As the regenerated resin 194 fills a tank 26 in the tank filling station 68, residual rinse water that is softened water with a high total dissolve solids content exits the tanks 26 and falls to the floor of the station 68. Rubber stoppers in the floor drains which are connected to a resin dump pit 216 prevent the soft residual rinse water or regenerated resin 194 from entering the resin dump pit 216. The carrier or resin transfer water, which is soft because it is the last water to have contact with the regenerated resin 194 can be passed to the washout water sump 122. On completion of the tank filling operations, the pumps 124 or 126 connected to the washout water sump 122 can be energized as the water in the sump accumulates to a preset level to pump out water.

The resin regeneration process creates spent regenerant solution 100 comprising brine containing the divalent ions removed from the spent resins 60. For example, after treating the spent cation exchange resins 22, a regenerant solution 186 comprising a brine solution contains (i) monovalent ions such as sodium ions, (ii) divalent ions, such as calcium or magnesium ions, and (iii) solids removed from the spent resins, such as resin fines 166, sand, and other particulates. In the present processes, the spent regenerant solution 100 is regenerated and recycled instead of being discarded. This avoids sending a large volume of spent regenerant solution 100 containing undesirable compounds, such as solids and other metal ions such as calcium, magnesium and barium, to the sewage system. This, in turn, avoids increasing waste treatment and environmental problems while also saving a lot of water and large amounts of sodium chloride. In addition, the regeneration and recycling process for the spent regenerant solution 100 can also generate compounds, such as calcium carbonate and magnesium hydroxide, which can be recycled into other products. The present resin regeneration and recovery system 80 allows treatment of the spent regenerant solution 100 in a multi-step process to recover and recycle the regenerant solution 186. The regeneration process creates spent regenerant solution 100 comprising brine and the divalent ions removed from the spent resins 60. In conventional processes, the spent regenerant solution 100 was typically flushed out into the municipal water or sewage systems. Consequently, a large volume of spent regenerant solution 100 containing undesirable compounds was passed to the municipal or private wastewater collection system. This creates an environmental problem, generating significant amounts of salt-laden wastewater with very high total hardness levels. Such poor water quality cannot be removed economically in traditional activated sludge wastewater treatment plants and gets passed on to the end user of the treated wastewater. It is costly to the owner of the resin regeneration facility because often they are assessed impact fees by the local wastewater treatment provider for the discharge of this wastewater into their collection system, not to mention they need to continually purchase new water and salt for subsequent regenerations. In contrast, the recovered, purified regenerant solution 186, as well as spent rinse water 204, can be reused, by itself or with additional water or chemical compounds, to treat additional spent resin 60. The regenerant recovery process reduces the amount of regenerant solution 186 and salt needed to be discarded after an ion exchange resin regeneration process. This is good for the environment, reduces regeneration costs, and can even allow reuse of the solids generated from the extraction of the ion in the spent regenerant solution 100.

The spent regenerant solution 100 or the regenerant waste liquid 376 containing at least partially, the spent regenerant solution 100, comprises different ions in varying concentrations depending on the nature of the ion exchange resins 22, the composition of the liquid being treated and the ions removed from the liquids by the resins. For example, regenerant solution 186 comprising a brine solution can be used to treat spent ion exchange resins which were used to remove polyvalent ions from water. As before, the resultant spent regenerant solution 100 can contain monovalent sodium ions which are used in the brine solution; polyvalent or divalent ions (e.g., calcium ions, magnesium ions, and other types of ions) in smaller concentrations; and solids removed from the spent resins 60. Thus treatment of the regenerant waste liquid 376 or spent regenerant solution 100 depends on the chemical composition of the liquid 342 or solution 100 at the time they are extracted from the recovery system for treatment.

In the recycling process, spent regenerant solution 100 from each of the regeneration vats 140a-c is transferred to a regenerant waste liquid sump 214 to form regenerant waste liquid 376 containing at least partially, the spent regenerant solution 100. The spent regenerant solution 100 flows through the vat solution outlets 106a-c and vat solution valves 105a-c which are located at the bottoms of the regeneration vats 140a-c. In the treatment process, unwanted dissolved and solids constituents are removed from the spent regenerant solution 100 while leaving behind desirable compounds, such as sodium ions, to allow reuse of treated regenerant liquid 342. Optionally, other spent or waste liquids from the resin regeneration process, such as, for example, spent backwash water 207, rinse water 196, and other liquids discharged in the resin regeneration treatment process, can also be collected in the regenerant waste liquid sump 214 and treated as a single composition of spent regenerant solution 100. Other waste liquids are generally collected only when these liquids have a high concentration of the resin-regenerant compounds, such as sodium chlorine or other salts. It should be understood that spent regenerant solution 100 is used interchangeably to mean either spent regenerant solution purely by itself, or spent regenerant solution combined with other waste liquids. Referring now to FIG. 5A, the regenerant waste liquid 376 containing at least partially, the spent regenerant solution 100, is transferred from the regenerant waste liquid sump 214 via a submersible spent regenerant pump 219 to the spent regenerant tank 220. A suitable tank 220 can hold from about 500 to about 5000 gallons, for example, or even from about 750 to about 2000 gallons (e.g., 1500 gallons). When the tank 220 is filled with regenerant waste liquid 376 containing at least partially, the spent regenerant solution 100, the pump 124 is energized to transfer the liquid 376 to a regenerant recovery tank 296. The pump 124 can be similar to the brine dosing pump described earlier but without the VFD. The water is pumped to the spent regenerant tank 220 until a high water level float switch 208 in the tank activates after the tank 220 is filled to the desired amount to de-energize the magnetic drive pump.

Jar tests of solution samples taken from the batch of regenerant waste liquid 376 containing at least partially, the spent regenerant solution 100, to be processed for recovery, are used to determine the appropriate chemicals and dosage of a regenerant treatment composition 111 needed to treat the regenerant waste liquid 376 (or spent regenerant solution 100, as used interchangeably herein) to remove undesirable chemicals, such as divalent ions, while leaving behind desirable ions, such as sodium ions. A jar test can be performed for each new batch of spent regenerant solution 100 to (1) establish the percent removal of divalent ions such as strontium, barium, calcium, magnesium, and the total hardness for increasing concentrations of calcium hydroxide and sodium carbonate, and (2) determine the regenerant treatment composition 111 in terms of doses of hydrated lime or calcium hydroxide, sodium carbonate, and optionally, sodium hydroxide and/or hydrochloric acid which is required to recover the spent regenerant solution 100 in the form of a recovered regenerant solution 186 comprising brine for subsequent resin regeneration processes.

Stock chemical solutions were prepared to facilitate the jar tests, and these included:

(1) a calcium hydroxide solution comprising hydrated or slaked lime, in a concentration of 45 wt %, in water; and a (2) a sodium carbonate solution comprising sodium carbonate (assumed 100 percent pure) in a concentration of 100 mg/mL water with 50 gram in 500 mL of distilled water;

(3) a sodium hydroxide solution comprising sodium hydroxide in a concentration of 50 wt %, in water;

(4) a hydrochloric acid solution comprising a 100 mg/mL stock solution formed by adding 116.6 mL of 37 percent hydrochloric acid (density=9.7 lbs/gallon) into 500 mL of distilled water under a well ventilated chemical hood with appropriate personal protection (e.g. safety glasses, compatible apron and gloves). The hydrochloric acid stock solution is used and stored per MSDS requirements.

To obtain sample spent regenerant solution 100 for the jar tests, a 1- or 2-gallon jar pre-rinsed with distilled water is filled with the spent regenerant solution 100 by opening the sample tap on the discharge of the magnetic drive pump during the spent regenerant transfer process. The gallon jar is filled at the same rate as that at which the reaction vessel is being filled to achieve a representative sample. The gallon jar sample is used to fill a smaller 500-mL graduated cylinder with spent regenerant solution 100. A salometer is floated in the cylinder to verify the salt concentration level in weight percent, after which the 500 mL solution is poured back into the gallon container. The measured salt strength in the sample spent regenerant solution 100 should be read and is desirably at the strength level needed for regenerating spent resin 60. For example, the spent regenerant solution 100 should have a sodium chloride concentration of from about 10 wt % to about 13 wt % to regenerate spent resin 60. If the solution strength is weaker than the desired level, the backwash purge water, pre-brine water, last one-third of rinse water, and floor drain water should not be combined in the sump 122 otherwise this would cause further dilution of the salinity and hardness of the spent regenerant solution 100 prior to treatment of the same. If the solution strength is at or greater than the desired level, the quality of the spent regenerant solution 100 indicates that only the brine is being sent to the reaction vessel.

At this stage, the batch of solution regenerant may need a laboratory test or not, depending upon if a similar spent regenerant total hardness concentration was effectively treated and recorded in the past. If a lab test is desired, a set of appropriate sampling bottles are filled with samples of the spent regenerant solution 100 from the gallon container. Jar tests are then conducted on these samples in a field laboratory to determine total mineral hardness and solution composition. For example, a spent regenerant solution sample can be diluted in a ratio of 1:100 (spent regenerant solution to water) with distilled water so that colorimetric total hardness and TDS field test kits can read the composition of the sample. A suitable colorimeter is a multi-parameter field colorimeter capable of determining total hardness as $CaCO_3$, pH and total dissolved solids, such as, for example, an Orobeco Hellige MC500 multi-parameter Field Colorimeter. A 10 mL sample of this solution is sucked out with a pipette and transferred to an Erlenmeyer flask where it is diluted with 990 mL of distiller water. A total hardness and TDS tests are then performed on the water sample, and the results of these tests are multiplied by 100 to get the actual concentration of salts in the solution. The measured total hardness can be used to calculate the regenerant treatment composition 111 that needs to be added to the spent regenerant solution 100 to regenerate the solution.

In one version, the measured total hardness and other measured values from the spent regenerant solutions 100 are recorded in a tabular Excel™, Microsoft Corp spreadsheet having formulas therein—an exemplary printout being shown in Table I—to calculate the desired regenerant treatment composition to reduce the total hardness level as $CaCO_3$ in the spent regenerant solution 100 to below 300 mg/L. The formulas used in Table I are as follows:

BS %=Brine Strength (% by weight) (where Brine refers to a regenerant solution comprising sodium chloride dissolved in water.

BS#=Brine Strength (lb salt/gal water)

$$BS\# = 0.0007 \times BS\%^2 + 0.0824 \times BS\% + 0.0019$$

$BS_{DEGREE}$=Brine Strength (degree salometer)

$$BS_{DEGREE} = 3.7887 \times BS\% - 0.0024$$

$V_{RESIN}$=Volume of resin per batch (cf)
$D_{SALT}$=Salt Dosage (lb salt/cf of resin)=Determined from desired capacity from MFR curves
$W_{SALT}$=Weight of Salt per regeneration batch (lb salt/regen)

$$W_{SALT} = D_{SALT} \times V_{RESIN}$$

$V_{REGEN}$=Volume of Brine per Regeneration batch (gal brine/regen)

$$V_{REGEN} = \frac{W_{SALT}}{BS\#}$$

$HRT_{BRINE}$=Hydraulic Retention Time for Brining (min)= specified by MFR=0.5 gpm/cf=15 min
$Q_{BRINE}$=Brine Flow Rate (gpm)=MFR suggested flow rate to achieve desired contact time $$Q_{BRINE} = \frac{V_{REGEN}}{HRT_{BRINE}}$$

$T_{BRINE}$=Duration of Brining (min)

$$T_{BRINE} = \frac{V_{REGEN}}{Q_{BRINE}}$$

$D_{VESSEL}$=ID of Reaction Vessel (in)
$H_{SS}$=Side shell Height of Reaction Vessel (in)=HWL pump cutoff
WL=Water Level=Water level in reaction vessel at end of treatment cycle $$V_{SEED} = \pi \frac{(D_{VESSEL}/12)^2}{4} \times \left(\frac{WL}{12}\right) \times 7.48$$

$V_{BATCH}$=Treated Volume (gal)=Reaction vessel batch volume used in chemical dose calculations.
$V_{TOTAL}$=Total Volume (gal)=Reaction vessel total volume $$V_{TOTAL} = \pi \frac{(D_{VESSEL}/12)^2}{4} \times \left(\frac{H_{SS}}{12}\right) \times 7.48$$

$V_{BATCH} = V_{TOTAL} - V_{SEED}$ $V_{SAMPLE}$=Sample Volume of Jar Test (mL)=Volume of spent brine that will have chemistry added to it=500 mL $W_{LIME}$=Weight of Calcium Hydroxide (Lime) Added to $V_{SAMPLE}$ (g)=Amount of chemical that gave favorable total hardness removal results after mixing, settling and lab centrifuge $W_{NAOH}$=Weight of Sodium Hydroxide Added to $V_{SAMPLE}$ (g)=Amount of chemical that gave favorable total hardness removal results after mixing, settling and lab centrifuge $W_{SODA}$=Weight of Sodium Carbonate (Soda Ash) Added to $V_{SAMPLE}$ (g)=Amount of chemical that gave favorable total hardness removal results after mixing, settling and lab centrifuge $D_{LIME}$=Calcium Hydroxide (Lime) Dosage (g/mL)

$$D_{LIME} = \frac{W_{LIME}}{V_{SAMPLE}}$$

$D_{NAOH}$=Sodium Hydroxide Dosage (g/mL)

$$D_{NAOH} = \frac{W_{NAOH}}{V_{SAMPLE}}$$

$D_{SODA}$=Sodium Carbonate (Soda Ash or Soda) Dosage (g/mL)

$$D_{SODA} = \frac{W_{SODA}}{V_{SAMPLE}}$$

$D_{LIME,batch}$=Calcium Hydroxide (Lime) Dosage of Treatment Batch (lb/gal)

$$D_{LIME,batch} = \frac{D_{LIME}}{453.6} \times 3785$$

$W_{LIME,batch}$=Weight of Bagged Lime to Add to Batch (lbs)

$W_{LIME,batch} = D_{LIME,batch} \times V_{BATCH}$ $D_{NAOH,batch}$=Sodium Hydroxide Dosage of Treatment Batch (lb/gal)

$$D_{NAOH,batch} = \frac{D_{NAOH}}{453.6} \times 3785$$

$W_{NAOH,batch}$=Weight of Bagged Sodium Hydroxide to Add to Batch (lbs)

$W_{NAOH,batch} = D_{NAOH,batch} \times V_{BATCH}$ $D_{SODA,batch}$=Soda Ash Dosage of Treatment Batch (lb/gal)

$$D_{SODA,batch} = \frac{D_{SODA}}{453.6} \times 3785$$

$W_{SODA,batch}$=Weight of Bagged Soda Ash to Add to Batch (lbs)

$W_{SODA,batch} = D_{SODA,batch} \times V_{BATCH}$ $D_{RV}$=ID of Reaction Vessel (ft)=5.79 ft
$A_{RV}$=Cross Sectional Area of Reaction Vessel (ft$^2$)

$$A_{RV} = \pi \frac{D_{RV}^2}{4}$$

$A_{RV}$=Cross Sectional Area of Reaction Vessel (ft$^2$)
$LVL_{RV}$=Drop of HCL Level in Reaction Vessel (in)=Required to depress pH to near neutral
$V_{INCR}$=Incremental Volume of Reaction Vessel (gal/in)

$$V_{INCR} = A_{RV} \times \frac{7.48}{12}$$

$C_{HCL,batch}$=Hydrochloric Acid Consumption at 31% Concentration (gal/batch)=Amount of HCL needed to bring the treated regenerant solution pH back to near neutral $C_{HCL,batch} = V_{INCR} \times LVL_{RV}$ $\$_{HCL,unit}$=31% HCL Unit Cost (\$/gal)=1.53 \$/gal
$\$_{HCL,batch}$=31% HCL Cost per batch (\$/batch)

$\$_{HCL,batch} = C_{HCL,batch} \times \$_{HCL,batch}$ $\$_{LIME,unit}$=99% Lime Unit Cost (\$/lb)=0.17 \$/lb
$\$_{LIME,batch}$=99% Lime Cost per batch (\$/batch)

$\$_{LIME,batch} = W_{LIME,batch} \times \$_{LIME,unit}$ $\$_{NAOH,unit}$=99% Sodium Hydroxide Unit Cost (\$/lb)=0.33 \$/lb
$\$_{NAOH,batch}$=99% Sodium Hydroxide Cost per batch (\$/batch)

$\$_{NAOH,batch} = W_{NAOH,batch} \times \$_{NAOH,unit}$ $\$_{SODA,unit}$=99% Soda Ash Unit Cost (\$/lb)=0.25 \$/lb
$\$_{SODA,batch}$=99% Soda Ash Cost per batch (\$/batch)

$\$_{SODA,batch} = W_{SODA,batch} \times \$_{SODA,unit}$

---

ZLD Chemical Dose Calcs Table Legend

Columns with a * indicate a calculation.
Columns without a * indicate an assumption or data entry field.
Chemical Costs:
HCL = 1.52 $/gal
Lime = 0.17 $/lb
NaOH = 0.33 $/lb
Soda Ash = 0.25 $/lb
Columns in the table, listed from left to right, are:
Salometer: Neat brine salt concentration used to regenerate this batch that was just treated.
Dosage: Salt dosage used to regenerate this batch that was just treated.
Dilution Ratio: The dilution ratio needed for the colorimeter, but only multiply TEST 201 total hardness result by 100
Total Hardness: The total hardness of the spent brine to be treated

ZLD Chemical Dose Calcs Table Legend

TDS: Total dissolved solids of the raw water spent brine taken in 1:1000 diluted sample
pH (pre-dilution): Actual pH of spent brine b4 dilution occurs
pH (Colorimeter): PH of 1:1000 Diluted TH sample in colorimeter . . . must be between 6.5 and 7.5
Salometer: Spent brine salt concentration used to regenerate this batch that was just treated.
Level: Level of treated brine left over in the bottom of 1,000 gal white tank
SEED Volume*: Calculated volume of treated water left over in white 1,000 gal tank
BATCH Volume*: Calculated volume of actual treated water that equals the total volume in white tank minus the seed volume
Lime: Weight of calcium hydroxide (Ca(OH)2), or lime, per batch volume required to remove the temporary hardness in the spent brine
Sodium Hydroxide: Weight of sodium hydroxide (NaOH) per batch volume required to remove the temporary hardness in the spent brine
Soda Ash: Weight of sodium carbonate (Na2CO3), or soda ash, required to remove the permanent hardness and any excess Ca in the spent
Total Hardness in White Tank: The total hardness of the chemically treated spent brine taken in the white tank after settling for 10 minutes. This sample must be placed in the lab centrifuge b4 analyzing in the colorimeter
Total Hardness at PUMP: The total hardness of the chemically treated, filter pressed and pH adjusted brine taken at the discharge of the transfer pump
Total Hardness POST FILTER: The total hardness of the chemically trated, filter pressed and pH adjusted brine taken after the cartridge filter in case any solids passed through the press.
pH-high: The highest pH the filtrate reached in the balck tank taken while the mixer is on, after all of the
pH-low: The lowest pH the filtrate reached in the black tank while the mixer is on after adding the HCL
pH (Colorimeter): pH of the 1:10 diluted treated brine total hardness sample
HCL Consumption*: The volume calculation from the level drop in the HCL tank
Press Cleaned?: Note if the filter press has been cleaned.
Time to Treat: The total time it took to press the chemically treated spent brine
Salometer: Chemically treated neat brine salt concentration
Chemical Cost*: Only the chemical cost to treat the batch volume, based on Chemical Costs above

TABLE I

Dosage Calculations

| RW FIELD TESTS | | | | | | | | BATCH | | | | |
|---|---|---|---|---|---|---|---|---|---|---|---|---|
| BRINE | | | Total | | | | SEED | | | | | Sodium |
| Salometer (%) | Dosage (#cf) | Dilution Ratio | Hardness (ppm) | TDS (ppm) | pH (pre-dilution) | pH (Colorimeter) | Salometer (%) | Level (in) | Volume (gal) | Volume (gal) | Lime (lb) | Hydroxide (lb) |
| 10.0 | 15 | 1:1000 | 13,000 | 64,000 | — | — | 9 | 5.0 | 82 | 887 | 50 | 50 |
| 10.0 | 15 | 1:1000 | 14,000 | — | — | — | 9 | 4.5 | 74 | 895 | 50 | 50 |
| 10.0 | 15 | 1:1000 | 13,500 | 80,000 | — | — | 7.8 | 4.5 | 74 | 895 | 50 | 50 |
| 12.0 | 15 | 1:1000 | 13,500 | — | — | — | — | 4.5 | 74 | 895 | 50 | 50 |
| 12.0 | 15 | 1:1000 | 15,000 | — | — | — | — | 5.0 | 82 | 887 | 50 | 50 |
| 12.0 | 15 | 1:1000 | 16,000 | — | — | — | 8.5 | 5.0 | 82 | 887 | 50 | 50 |
| 12.0 | 15 | 1:1000 | 17,000 | 80,600 | — | — | 8.5 | 3.5 | 57 | 1,035 | 50 | 50 |
| 12.0 | 15 | 1:1000 | 17,000 | 80,600 | — | — | 8.5 | 3.5 | 57 | 1,035 | 50 | 50 |
| 13.0 | 15 | 1:1000 | 18,000 | — | — | — | 9.0 | 4.0 | 66 | 1,026 | 50 | 50 |
| 13.0 | 15 | 1:1000 | 12,000 | — | — | — | 9.0 | 4.0 | 66 | 1,026 | 50 | 50 |
| — | — | 1:1000 | 17,000 | — | — | — | 10.5 | 4.5 | 74 | 1,018 | 50 | 50 |
| — | 15 | 1:1000 | 15,000 | — | — | — | 10.0 | 4.5 | 74 | 1,018 | 50 | 50 |
| 13.0 | 15 | 1:1000 | 18,100 | — | — | — | 10.0 | 4.0 | 66 | 1,026 | 50 | 50 |
| 13.0 | 15 | 1:1000 | 18,000 | — | — | — | 9.5 | 4.5 | 74 | 1,018 | 50 | 50 |
| 13.0 | 15 | 1:1000 | 15,000 | — | — | — | 9.5 | 4.5 | 74 | 1,018 | 50 | 50 |
| 13.0 | 15 | 1:1000 | 21,700 | 154,000 | — | — | 9.0 | 4.5 | 74 | 1,018 | 50 | 50 |
| 13.0 | 15 | 1:1000 | 28,000 | — | — | — | 12.0 | 4.5 | 74 | 1,018 | 50 | 50 |
| 14.0 | 15 | 1:1000 | 29,400 | 188,400 | — | — | 12.0 | 4.5 | 74 | 1,018 | 50 | 50 |
| 12.0 | 15 | 1:1000 | 22,400 | 189,100 | — | — | 11.5 | 5.0 | 82 | 1,010 | 50 | 50 |
| 14.5 | 15 | 1:1000 | 27,600 | 190,800 | — | — | 11.5 | 5.0 | 82 | 1,010 | 50 | 50 |
| 12.0 | 15 | 1:1000 | 27,500 | >200k | — | — | 11.5 | 5.0 | 74 | 1,018 | 50 | 50 |
| 12.0 | 15 | 1:1000 | 21,800 | >200k | — | — | 11.0 | 5.0 | 82 | 1,010 | 25 | 25 |
| 12.0 | 15 | 1:1000 | 26,500 | 186,200 | — | — | 11.0 | 4.5 | 82 | 1,010 | 25 | 25 |
| 11.0 | 15 | 1:1000 | 19,900 | 188,400 | — | — | 11.0 | 5.0 | 82 | 1,026 | 50 | 50 |
| 11.0 | 15 | 1:1000 | 26,000 | 191,100 | — | — | 11.0 | 4.0 | 66 | 1,018 | 50 | 50 |
| 11.0 | 15 | 1:1000 | 17,000 | — | — | — | 11.0 | 4.5 | 74 | 1,018 | 50 | 50 |
| 11.0 | 15 | 1:1000 | 17,000 | — | — | — | 11.0 | 4.5 | 74 | 1,018 | 50 | 50 |
| 11.0 | 15 | 1:1000 | 17,000 | — | — | — | 11.0 | 4.5 | 74 | 1,018 | 50 | 50 |

TABLE I-continued

Dosage Calculations

| | | | | | | | | | | | | |
|---|---|---|---|---|---|---|---|---|---|---|---|---|
| 11.0 | 15 | 1:1000 | 15,000 | — | — | — | 11.0 | 4.5 | 74 | 1,018 | 50 | 50 |
| 11.0 | 15 | 1:1000 | 23,600 | 190,600 | — | — | 11.0 | 4.0 | 66 | 1,026 | 50 | 50 |
| 12.0 | 15 | 1:1000 | 29,500 | 180,900 | 6.00 | — | 11.0 | 4.0 | 66 | 1,026 | 50 | 50 |
| 12.0 | 15 | 1:1000 | 15,700 | 192,200 | 6.06 | — | 11.0 | 5.0 | 82 | 1,010 | 50 | 50 |
| 12.0 | 15 | 1:1000 | 28,600 | — | — | — | 11.0 | 5.0 | 82 | 1,010 | 50 | 50 |
| 12.0 | 15 | 1:1000 | 39,300 | >200k | 6.84 | — | 11.0 | 4.0 | 66 | 1,026 | 75 | 75 |
| 12.0 | 15 | 1:1000 | 31,700 | >200k | 6.10 | — | 11.0 | 5.0 | 82 | 1,010 | 50 | 50 |
| 12.0 | 15 | 1:1000 | 31,100 | >200k | 5.98 | — | 11.0 | 4.5 | 74 | 1,018 | 50 | 50 |
| 12.0 | 15 | 1:1000 | 27,200 | >200k | 6.70 | — | 11.0 | 4.5 | 74 | 1,018 | 50 | 50 |
| 12.5 | 15 | 1:1000 | 31,100 | >200k | 6.70 | 6.70 | 11.0 | 4.0 | 66 | 1,026 | 50 | 50 |
| 10.0 | 15 | 1:1000 | 30,000 | 195,200 | 6.70 | 6.60 | 11.0 | 4.5 | 74 | 1,018 | 50 | 50 |
| 12.0 | 15 | 1:1000 | 33,200 | — | 6.80 | — | 11.0 | 4.5 | 74 | 1,018 | 50 | 50 |
| 12.0 | 15 | 1:1000 | 27,900 | — | 6.75 | — | 10.5 | 4.5 | 74 | 1,018 | 50 | 50 |
| 12.0 | 15 | 1:1000 | 25,300 | — | 6.75 | — | 10.0 | 4.5 | 74 | 1,018 | 50 | 50 |
| 10.0 | 15 | 1:1000 | 26,700 | — | 6.61 | — | 10.0 | 4.5 | 74 | 1,018 | 50 | 50 |
| 10.0 | 15 | 1:1000 | 27,600 | — | 6.75 | — | 10.0 | 4.5 | 74 | 1,018 | 50 | 50 |
| 13.0 | 15 | 1:1000 | 35,300 | 175,100 | 6.70 | 7.13 | 11.0 | 4.0 | 66 | 1,026 | 50 | 50 |
| 13.0 | 15 | 1:1000 | 27,000 | >200k | 6.79 | 7.27 | 11.5 | 4.5 | 74 | 1,018 | 50 | 50 |

BATCH

| BRINE | | | Total Hardness @ PUMP (ppm) | Total Hardness POST FILTER (ppm) | HCL | | | | Salometerr (%) | Press cleaned? (Y/N) | COST Chemical ($/kgal) * |
|---|---|---|---|---|---|---|---|---|---|---|---|
| Salometer (%) | Dosage (#cf) | Soda Ash | | | pH-high | pH-low | Consumption (in) | HCL Consumption | | | |
| 10.0 | 15 | 150 | 10 | — | — | — | — | — | 9 | N | 70.48 |
| 10.0 | 15 | 175 | 10 | — | — | — | — | — | 9 | N | 76.82 |
| 10.0 | 15 | 175 | 10 | — | — | — | — | — | 9 | N | 76.82 |
| 12.0 | 15 | 175 | 10 | — | 12.9 | 7 | — | — | 8.5 | N | 76.82 |
| 12.0 | 15 | 175 | 10 | — | 12.9 | 6.5 | — | — | 8.5 | N | 77.53 |
| 12.0 | 15 | 200 | 20 | — | 12 | 7.5 | — | — | 9 | Y | 84.58 |
| 12.0 | 15 | 225 | 20 | — | 12.8 | 7.8 | — | 30 | 9 | N | 122.90 |
| 12.0 | 15 | 200 | 2 | — | — | — | — | — | — | — | 72.49 |
| 13.0 | 15 | 225 | 2 | — | 12.9 | 7 | — | 30 | 10 | N | 123.89 |
| 13.0 | 15 | 175 | 2 | — | 12.8 | 6.7 | — | 30 | 9.5 | N | 111.71 |
| — | — | 225 | 2 | — | — | — | — | — | — | — | 79.80 |
| — | 15 | 200 | 2 | — | 12.5 | 7 | — | 30 | — | Y | 18.75 |
| 13.0 | 15 | 225 | 2 | — | 12.8 | 6.5 | — | 30 | 12.5 | N | 123.89 |
| 13.0 | 15 | 225 | 8 | — | 12.7 | 7.4 | — | 30 | 10 | N | 124.88 |
| 13.0 | 15 | 200 | 2 | — | 12.1 | 7.5 | — | 30 | 10 | N | 118.75 |
| 13.0 | 15 | 225 | 50 | — | 12.3 | 7.3 | — | 30 | 10 | Y | 124.88 |
| 13.0 | 15 | 250 | 10 | — | 12.4 | 7.4 | — | 30 | 10 | N | 131.02 |
| 14.0 | 15 | 250 | 12 | — | 12.6 | 7.1 | — | 30 | 10 | N | 131.02 |
| 12.0 | 15 | 200 | 23 | — | 121.7 | 6.9 | — | 25 | 12 | N | 112.14 |
| 14.5 | 15 | 225 | 16 | — | 11.8 | 6.9 | — | 25 | 12 | Y | 118.32 |
| 12.0 | 15 | 200 | 8 | — | 11.8 | 8.1 | — | 20 | 12 | N | 103.72 |
| 12.0 | 15 | 150 | 19 | — | 11.4 | 3.2 | — | 5 | 11.5 | N | 57.08 |
| 12.0 | 15 | 200 | 330 | — | 11.6 | 7.3 | — | 5 | 11.5 | N | 69.46 |
| 11.0 | 15 | 150 | >600 | — | 12 | 3.6 | — | 10 | 11 | Y | 77.03 |
| 11.0 | 15 | 200 | 60 | — | 12.6 | 6 | — | 30 | 11 | N | 73.07 |
| 11.0 | 15 | 225 | 40 | — | 12 | 6.2 | — | 30 | 11 | Y | 109.86 |
| 11.0 | 15 | 225 | 40 | — | 11.8 | 6.5 | — | 25 | 11 | N | 109.86 |
| 11.0 | 15 | 225 | 140 | — | 11.9 | 8.3 | — | 25 | 11 | N | 109.86 |
| 11.0 | 15 | 200 | 300 | — | 11.6 | 7.2 | — | 20 | 11.5 | N | 103.72 |
| 11.0 | 15 | 200 | 17 | — | 12.6 | 2.6 | — | 5 | 12 | N | 87.98 |
| 12.0 | 15 | 250 | 11 | — | 12.4 | 6.7 | — | 5 | 12 | Y | 100.16 |
| 12.0 | 15 | 200 | 9 | — | 12.4 | 6.7 | — | 10 | 11 | N | 89.41 |
| 12.0 | 15 | 250 | 336 | — | 12 | 6.9 | — | — | 12 | N | 86.64 |
| 12.0 | 15 | 300 | 6 | 26 | 12.6 | 7.6 | — | 20 | 12 | N | 139.43 |
| 12.0 | 15 | 225 | 25 | 43 | 12.6 | 7.2 | — | 10 | 11 | N | 95.60 |
| 12.0 | 15 | 225 | 173 | — | 11.2 | 5.6 | — | 10 | 11.5 | Y | 94.83 |
| 12.0 | 15 | 225 | 5 | 28 | 11.7 | 6.4 | — | 10 | 11.5 | N | 94.83 |
| 12.5 | 15 | 235 | 22 | 27 | 11.8 | 6.2 | — | 10 | 11 | N | 96.51 |
| 10.0 | 15 | 215 | 256 | 263 | 11.8 | 5.8 | — | 10 | 11 | N | 92.37 |
| 12.0 | 15 | 250 | 175 | 240 | 11.8 | 7 | — | 10 | 11 | Y | 100.97 |
| 12.0 | 15 | 225 | 266 | over | 11.7 | 7.2 | — | 10 | 11 | N | 94.83 |
| 12.0 | 15 | 200 | 490 | over | 11.9 | 7.5 | — | 15 | 11 | N | 96.20 |
| 10.0 | 15 | 225 | 338 | 383 | 11.7 | 7 | — | 15 | 11 | N | 102.34 |
| 10.0 | 15 | 225 | 214 | 306 | 11.7 | 7 | — | 15 | 11 | Y | 102.34 |
| 13.0 | 15 | 250 | 31 | 35 | 12 | 6.6 | 2 | 16 | 11.5 | N | 109.10 |
| 13.0 | 15 | 225 | 248 | — | 11.9 | 6.4 | 2.375 | 19 | — | N | 108.35 |

For example, in one version, the appropriate calcium hydroxide, sodium hydroxide and sodium carbonate dosage per 500 mL sample from the spreadsheet shown in Table I, will bring the total hardness concentration in the regenerant waste liquid 376 or spent regenerant solution 100 down to <80 mg/L is determined from the dosage spreadsheet and then the calculated result verified with additional jar tests. A plurality of different dosage concentrations can be determined, for example, at least three or even at least four different compositions of regenerant solution 186. In one version, the calcium hydroxide and sodium hydroxide doses are approximately equal to each other, and the sodium carbonate dose is from about 3 to about 10 times the total amount of calcium hydroxide and sodium hydroxide. Either calcium hydroxide or sodium hydroxide, or both, can be used.

When four dosage levels are selected, four 500-mL graduated cylinders are filled with spent regenerant solution 100 out of the gallon container sample, and each regenerant treatment composition 111 is added to one of the graduated cylinders. With the top of graduated cylinder covered (for example, with an operator's hand with rubber glove on), each of the four graduated cylinder samples is aggressively shaken for 1 minute to mix the chemicals and liquid in the cylinder. Two of the four samples from the 500-mL graduated cylinders are then taken, and from these, 3×15 mL=45 mL of each sample poured into three 15-mL test tubes for centrifuging. The rubber stoppers on the test tubes should be marked with the sample number so that it can be identified. Two sets of samples of 3 each can be spun at the same time in a laboratory centrifuge having 6 slots. The centrifuge is turned on for 1 minute to separate the treated regenerant liquid 342 into precipitated solids and supernatant. The clear supernatant liquid in each sample test tube is poured into a 50-mL beaker and a pH meter inserted in the beaker to record a reading. Thereafter, a jar test is performed with a pH adjuster 351, such as the acid 231, for example, diluted hydrochloric acid (e.g., in a 31% strength) to determine the volume needed to depress the treated regenerant liquid 342 to be within a neutral pH range. The diluted hydrochloric acid is added to these beakers and the pH measured until the pH is near neutral. Any of the regenerant treatment composition 111 samples that reduced the hardness of the spent regenerant solution 100 to less than 300-mg/L, as measured from the field colorimeter and columns of Table I, is selected for use as the regenerant treatment composition 111 for the current batch of regenerant solution 186. The total hardness concentration of the treated samples in the graduated cylinders as determined from the pH adjusting tests is read using the Endress+Hauser pH probe. In this example, a regeneration treatment composition 111, comprising at least one hydroxide compound and at least one carbonate compound, is used to remove ions from the spent regenerant solution 100 in the form of precipitate flocs 114 of precipitated hydroxide and carbonate compounds. For example, the regeneration treatment composition 111 can remove divalent ions such as magnesium or calcium, barium, and other ions from the solution 100, as can be noted in the previous table.

The hydroxide compounds are provided to precipitate metal ion hydroxides that are insoluble, such as magnesium hydroxide. Suitable hydroxide compounds include, for example, calcium hydroxide, sodium hydroxide, and alkali or alkaline earth metal hydroxides. The hydroxide compound can also include a mixture of calcium hydroxide and sodium hydroxide. Advantageously, a mixture of calcium hydroxide and sodium hydroxide not only precipitates compounds from the spent regenerant solution 100 but also serves to add sodium ions to replenish the sodium ion concentration within the spent regenerant solution 100. The addition of sodium hydroxide assists in decreasing the sludge volume by producing a denser sludge. In this example, the calcium hydroxide is obtained from a hydroxide source such as a calcium hydroxide source 312a, and the sodium hydroxide is obtained from a hydroxide source such as a sodium hydroxide source 312b, as shown in FIG. 5B.

In one version, the regenerant treatment composition 111 comprises a hydroxide component comprising a mixture of calcium hydroxide and sodium hydroxide, and a carbonate compound comprising sodium carbonate. Advantageously, a mixture of calcium hydroxide and sodium hydroxide not only precipitates compounds from the spent regenerant solution 100, but also serves to add sodium ions to replenish the sodium ion concentration within the spent regenerant solution 100. The addition of sodium hydroxide assists in decreasing the sludge volume by producing a denser sludge. The amount of the regenerant treatment composition 111 added to the spent regenerant solution 100 to remove all the mineral hardness is determined by the background or baseline total mineral hardness in mg/L as $CaCO_3$. The mineral hardness concentrations in spent regenerant solution 100 used to regenerate a 120 cubic foot batch of spent resin 60 can be from about 10,000 to about 50,000 mg/L as $CaCO_3$ depending on how exhausted the spent resin 60 is at the time of the regeneration.

In one example, useful for treating spent regenerant solution 100 derived from sodium chloride regenerated resin 194, a regenerant treatment composition 111 comprising calcium hydroxide, sodium hydroxide and sodium carbonate, is added to the spent regenerant solution 100 to precipitate compounds to achieve a total mineral hardness in the treated and separated regenerant solution 374 of less than 300 mg/L in the form of $CaCO_3$. In one example, to achieve a total hardness concentration in the spent regenerant solution of less than 10,000 mg/L as $CaCO_3$, or less than 0.09991 moles/L as $CaCO_3$, can require from about 0.005 to about 38 moles/L of calcium hydroxide, or even from about 0.006 moles/L to about 0.06 moles/L calcium hydroxide, or more specifically 0.03 moles/L calcium hydroxide; from about 0.007 to about 53 moles/L sodium hydroxide, or even from about 0.015 moles/L to about 0.14 moles/L sodium hydroxide, or more specifically 0.075 moles/L sodium hydroxide; from about 0.002 to about 24 moles/L sodium carbonate, or even from about 0.034 moles/L to about 0.3 moles/L sodium hydroxide, or more specifically 0.17 moles/L sodium carbonate.

As another example, to achieve a total hardness concentration in the spent regenerant solution of from about 10,000 to about 25,000 mg/L as $CaCO_3$, or from 0.1 to about 0.25 moles/L as $CaCO_3$, can require from about 0.005 to about 38 moles/L of calcium hydroxide, or even about 0.01 moles/L to about 0.09 moles/L calcium hydroxide, or more specifically 0.05 moles/L calcium hydroxide; from about 0.007 to about 53 moles/L sodium hydroxide, or even from about 0.015 moles/L to about 0.14 moles/L sodium hydroxide, or more specifically 0.075 moles/L sodium hydroxide; from about 0.002 to about 24 moles/L sodium carbonate, or even about 0.045 moles/L to about 0.4 moles/L sodium carbonate, or more specifically 0.23 moles/L sodium carbonate.

As still another example, to achieve a total hardness concentration in the spent regenerant solution of from about 25,000 to about 35,000 mg/L as $CaCO_3$, or 0.25 to about 0.35 moles/L as $CaCO_3$, can require from about 0.005 to about 38 moles/L of calcium hydroxide, or even about 0.01 moles/L to about 0.09 moles/L calcium hydroxide, or more specifically 0.05 moles/L calcium hydroxide; from about 0.007 to about 53 moles/L sodium hydroxide, or even about 0.015 moles/L to about 0.14 moles/L sodium hydroxide, or more specifically 0.075 moles/L sodium hydroxide; from about 0.002 to about 24 moles/L sodium carbonate, or even about 0.057 moles/L to about 0.5 moles/L sodium hydroxide, or more specifically 0.28 moles/L sodium carbonate.

As yet another example, to achieve a total hardness concentration in the spent regenerant solution of from about 35,000 to about 45,000 mg/L as $CaCO_3$, or 0.35 to about 0.45 moles/L as $CaCO_3$, can require from about 0.005 to about 38 moles/L of calcium hydroxide, or even about 0.01 moles/L to about 0.09 moles/L calcium hydroxide, or more specifically 0.05 moles/L calcium hydroxide; from about 0.007 to about 53 moles/L sodium hydroxide, or even about 0.015 moles/L to about 0.135 moles/L sodium hydroxide, or more specifically 0.075 moles/L sodium hydroxide; from about 0.002 to about 24 moles/L sodium carbonate, or even about 0.07 moles/L to about 0.6 moles/L sodium carbonate, or more specifically 0.34 moles/L sodium carbonate.

As another example, to achieve a total hardness concentration in the spent regenerant solution of greater than 45,000 mg/L as $CaCO_3$, or 0.45 moles/L as $CaCO_3$, can require from about 0.005 to about 38.05 moles/L of calcium hydroxide, or even about 0.01 moles/L to about 0.09 moles/L calcium hydroxide, or more specifically 0.05 moles/L calcium hydroxide; from about 0.007 to about 53 moles/L sodium hydroxide, or even about 0.02 moles/L to about 0.2 moles/L sodium hydroxide, or more specifically 0.1 moles/L sodium hydroxide; from about 0.002 to about 24 moles/L sodium carbonate, or even about 0.08 moles/L to about 0.7 moles/L sodium carbonate, or more specifically 0.4 moles/L sodium carbonate.

The above defined ratios can provide the benefit of consistent removal of the total hardness to less than 300 mg/L as $CaCO_3$ while still maintaining the salinity, or salt concentration of from about 10% to about 13% by weight, required to regenerate subsequent spent cationic resin.

In another example, useful for spent regenerant solution derived from potassium chloride regenerated resin, a regenerant treatment composition comprising calcium hydroxide, potassium hydroxide and potassium carbonate, is added to the spent regenerant solution to precipitate compounds to achieve a total mineral hardness in the treated and separated regenerant solution of less than 300 mg/L in the form of $CaCO_3$. Assuming that the regenerant treatment composition comprises 99% pure calcium hydroxide, potassium hydroxide and potassium carbonate, the following dosages can result in treated regenerant liquid containing total hardness levels less than 300 mg/L as $CaCO_3$.

As an example, to achieve a total hardness concentration in the spent regenerant solution of less than 10,000 mg/L as $CaCO_3$ or less than 0.09991 moles/L as $CaCO_3$, can require from about 0.005 to about 38 moles/L of calcium hydroxide, or even about 0.006 moles/L to about 0.055 moles/L calcium hydroxide, or more specifically 0.03 moles/L calcium hydroxide; from about 0.007 to about 36 moles/L potassium hydroxide, or even about 0.015 moles/L to about 0.13 moles/L potassium hydroxide, or more specifically 0.075 moles/L potassium hydroxide; from about 0.002 to about 16.6 moles/L potassium carbonate, or even about 0.034 moles/L to about 0.3 moles/L potassium carbonate, or more specifically 0.17 moles/L potassium carbonate.

As another example, to achieve a total hardness concentration in the spent regenerant solution of from about 10,000 to about 25,000 mg/L as $CaCO_3$, or 0.1 to about 0.25 moles/L as $CaCO_3$, can require from about 0.005 to about 38 moles/L of calcium hydroxide, or even about 0.01 moles/L to about 0.09 moles/L calcium hydroxide; from about 0.007 to about 36 moles/L potassium hydroxide, or even about 0.015 moles/L to about 0.135 moles/L potassium hydroxide, or more specifically 0.075 moles/L potassium hydroxide; from about 0.002 to about 16.6 moles/L potassium carbonate, or even about 0.045 moles/L to about 0.4 moles/L potassium carbonate, or more specifically 0.23 moles/L potassium carbonate.

As still another example, to achieve a total hardness concentration in the spent regenerant solution of from about 25,000 to abut 35,000 mg/L as $CaCO_3$, or from about 0.25 to about 0.34 moles/L as $CaCO_3$, can require from about 0.005 to about 38 moles/L of calcium hydroxide, or even about 0.01 moles/L to about 0.09 moles/L calcium hydroxide, or more specifically 0.052 moles/L calcium hydroxide; from about 0.007 to about 36 moles/L potassium hydroxide, or even about 0.015 moles/L to about 0.14 moles/L potassium hydroxide, or more specifically 0.075 moles/L potassium hydroxide; from about 0.002 to about 16.6 moles/L potassium carbonate, or even about 0.057 moles/L to about 0.5 moles/L potassium carbonate, or more specifically 0.28 moles/L potassium carbonate.

As yet another example, to achieve a total hardness concentration in the spent regenerant solution of from about 35,000 to about 45,000 mg/L as $CaCO_3$, or from about 0.35 to 0.45 moles/L as $CaCO_3$, can require from about 0.005 to about 38 moles/L of calcium hydroxide, or even about 0.01 moles/L to about 0.09 moles/L calcium hydroxide, or more specifically 0.052 moles/L calcium hydroxide; from about 0.007 to about 36 moles/L potassium hydroxide, or even about 0.015 moles/L to about 0.14 moles/L potassium hydroxide, or more specifically 0.075 moles/L potassium hydroxide; from about 0.002 to about 16.6 moles/L potassium carbonate, or even about 0.069 moles/L to about 0.61 moles/L potassium carbonate, or more specifically 0.34 moles/L potassium carbonate.

As a further example, to achieve a total hardness concentration in the spent regenerant solution 100 of greater than about 45,000 mg/L as $CaCO_3$, or 0.4496 moles/L as $CaCO_3$, can require from about 0.005 to about 38 moles/L of calcium hydroxide, or even about 0.01 moles/L to about 0.09 moles/L calcium hydroxide, or more specifically 0.05 moles/L calcium hydroxide; from about 0.007 to about 36 moles/L potassium hydroxide, or even about 0.02 moles/L to about 0.2 moles/L potassium hydroxide, or more specifically 0.1 moles/L potassium hydroxide; from about 0.002 to about 16.6 moles/L potassium carbonate, or even about 0.09 moles/L to about 0.7 moles/L potassium carbonate, or more specifically 0.4 moles/L potassium carbonate. These ratios provide the benefits of consistent removal of the total hardness to less than 300 mg/L as CaCO3 while still maintaining the salinity, or salt concentration of from about 10% to about 13% by weight, required to regenerate subsequent spent cationic resin.

In any of the illustrative examples provided above, in addition to the regenerant treatment composition, a ph adjuster 351 can be added to the treated regenerant liquid 342 to change the pH of the treated and/or separated regenerant liquid to acceptable levels. The ph adjuster 351 can be added during the treatment process, for example, while the regenerant treatment composition is being stirred into the regenerant waste liquid 376 containing at least partially, the spent regenerant solution 100, or afterwards, after separation of the precipitated compounds. In one example, the ph adjuster 351 comprises a chloride ion compound, such as hydrochloric acid. As one example, ph adjuster 351 comprising hydrochloric acid in a concentration of about 31.5% can be added in an amount of from about 8 gallons to about 16 gallons for every 1,000 gal of treated regenerant solution to bring the pH to an acceptable range of from about 4.5 to about 7.5, or more specifically from about 5 to about 6 to re-dissolve the calcium carbonate precipitate that may form in the vats during and after brining.

After the correct composition of a regenerant treatment composition 111 suitable for the current batch of regenerant waste liquid 376 containing at least partially, the spent regenerant solution 100, is determined using the sample jar tests, a scaled-up dosage composition of the regenerant treatment composition 111 needed to treat the amount of spent regenerant solution 100 in the reaction vessel is calculated using a Dosage spreadsheet. For example, when the amount of spent regenerant solution 100 in the reaction vessel is about 1500 gallons, the scaled-up dosage composition of the regenerant treatment composition 111 to treat this volume of regenerant liquid is calculated as follows:

After the jar tests are done, a regenerant treatment composition 111 comprising the desired concentrations of calcium hydroxide, sodium hydroxide and sodium carbonate is then weighed out for mixing with the regenerant waste liquid 376 containing at least partially, the spent regenerant solution 100. In this step, the regenerant treatment composition 111 is weighed out in a first chemical dispenser 280 that includes a mixing well 282 in which the chemicals are mixed before their introduction into the regenerant recovery tank 296. The mixing well 282 has a conical shape with several wash-down nozzles 284 which spray and mist water down the internal sides of the mixing well 282 in a spiral manner to reduce the airborne particulate matter and further dilute the chemicals, as shown in FIG. 3C. To mix in the chemicals, the diaphragm pump 65 is started, and the gauges are allowed to cycle completely back and forth by turning on the compressor powered by the diesel engine 600. The diaphragm pump 65 can be powered by an air compressor, which in turn is driven by a shaft connected to a diesel engine 600 to provide an air powered pump having a high flow rate, high demand availability, and rapid duty cycle. The valves of the recovery system are configured so that the diaphragm pump 65 energizes the closed flow pumps in a closed loop while the regenerant treatment composition 111 is added to the regenerant waste liquid 376. The diaphragm pump 65 is used to draw regenerant waste liquid 376 from the bottom of the regenerant recovery tank 296 as the motive flow for the chemical addition. The pump 65 can also be a rotary screw air compressor, such as one rated up to 200 csm at 150 psi, and which does not generally need a reservoir. A peristaltic pump 79 similar to the ones used for brining and resin transfer, can also be used as an alternative method of pumping the chemically-dosed, regenerant waste liquid 376 without shearing the precipitate flocs 114 formed therein.

A pulse dampener 560 is connected to the pump 65 to reduce any "water hammer effect" to even out the flow of water from pump 65. In one version, a pulse dampener 560 may be connected to the pump 65 via a connector 554. A suitable pulse dampener 560 may be, for example, a Sentury pulsation dampener from BLACOH LIQUID CONTROL, Riverside Calif. Other accessories can also be implemented in the solids separator 500, such as a baffle, circulation pump, submersible suction device or the like.

A supply of regenerant waste liquid 376 from the recovery tank outlet 107 of the regenerant recovery tank 296 is pumped through the piping 334 (with the valves 125a-d in an open position and valve 125e in a closed position) using a diaphragm pump 65, so that a stream of regenerant waste liquid 376 mixes with the chemicals from the chemical dispenser 280 to form a solution stream comprising treated regenerant liquid 342 comprising the regenerant treatment composition 111 which is then fed into the second inlet 109b at the top of the regenerant recovery tank 296 to complete a closed loop system that is open to the atmosphere.

During mixing of the chemicals via the chemical dispenser 280 into the regenerant waste liquid 376 to form the treated regenerant liquid 342, the chemically-dosed treated regenerant liquid 342 is returned to the regenerant recovery tank 296 by the diaphragm pump 65 which continues to pump the water in a loop until all of the regenerant treatment composition 111 has been added. The treated regenerant liquid 342 is sent back to regenerant recovery tank 296 for slower mixing with the impeller mixer 322. The impeller mixer 322 in the regenerant recovery tank 296 is energized when the initial chemical addition begins, and it can stop after all of the chemistry is added to the fixed volume of treated regenerant liquid 342. The slower mixing achieves a mixing intensity of from about 10 to about 15 $s^{-1}$ allowing flocs 114 of precipitated compounds to form in the chemically-treated solution.

After mixing in all the chemicals and when the hardness level is determined to be acceptable, the treated regenerant liquid 342 is passed through a solids separator 500 to separate out the precipitate flocs 114 formed in the liquid 342. In one version, the solids separator 500 comprises a filtering system 324, such as a filter press 300. In this process, the diaphragm pump 65 is started, the impeller mixer 322 is turned off, and the various valves 125a-e configured reconfigured to pass the treated regenerant liquid 342 to the filter press 300 of the solids separator 500. For example, opening valves 125a, 125c, and 125e direct the liquid 342 containing the precipitates 114 into and through the filter press 300. A suitable filter press 300 provides filtration and separation of particles sized from 0.1 to about 100 microns, such as from 1 to 20 microns (e.g., 5 micron). During the filter pressing operation, the impeller mixer 322 in the regenerant recovery tanks 296 is turned off. The residue from the filter press 300 comprises solids generated in the form of the filter cakes comprises precipitated compounds, including precipitated calcium carbonate and magnesium hydroxide. The filter cakes are transferred and stored in the solids disposal dump 346, and they can be resold or disposed of as determined from Toxicity Characteristic Leaching Potential Tests, WET, Landfill Leachate Tests and Aqueous Solubility Tests Leaching, conducted by The University of Arizona.

The supernatant or filtrate liquid from the filter press 300 enters the top of the regenerant recovery tank 296 in a closed loop through a dedicated recirculation line where it is visually inspected, and once the filtrate clarifies to drinking water clarity, the valves 125a-e are reset to allow all of the filtered liquid flow to enter the pH-adjusting tank 350. As an alternative to looking into the regenerant recovery tank 296 to see if the filtrate is of acceptable clarity to then transfer to the pH-adjusting tank 350, a short segment of clear PVC pipe can be used upstream or downstream of the diversion valves that redirect the clear filtrate from the regenerant recovery tank 296 to the pH-adjusting tank 350.

The treated regenerant liquid 342 is pumped through the filter press 300 across valve 125e and into a regenerant pH-adjusting tank 350. The pH of the treated and filtered regenerant liquid 342 is adjusted in the tank 350 by adding a pH adjuster 351 to set the pH to the desired level and also to have a sufficient number of chloride ions to balance the sodium ions which were increased by adding the sodium hydroxide in the regenerant treatment composition 111. The chloride ions added using a chloride ion source 386 which can be hydrochloric acid, held in the pH-adjuster tank 387, which is pumped using a pH-adjuster feed pump 389 to an inlet 392 of the tank 350. A second impeller mixer 394 is used to mix the hydrochloric acid into the treated regenerant liquid 342, and the resultant pH-adjusted treated regenerant liquid 342 can be recycled as fresh regenerant solution 186 when transferred by the solution transfer pump 230 to the regenerant solution tank 188.

A volume of precipitate 114 in the treated regenerant liquid 342 left in the tank serves as a seeding agent to provide nucleation sites for the next batch of treated regenerant liquid 342 to be treated in the regeneration treatment process. The impeller mixer 394 is then turned on to circulate this water while the pH adjuster 351 is added to the liquid in the tank 350. To add the pH adjuster 351, the pH-adjuster feed pump 389 is energized to supply hydrochloric acid to the liquid 342, and the pH of the liquid is continuously monitored using an Endress+Hauser pH probe in tank 350 (as shown in FIG. 3B) until the pH of the treated regenerant liquid 342 drops to neutral to become recovered regenerant solution 186. The impeller mixer 394 is then turned off, and the magnetic drive solution transfer pump 230 turned on to deliver recovered regenerant solution 186 to the regenerant solution tank 188 for reuse to regenerate additional spent resin 60.

At this point in the regenerant treatment process, the recovered regenerant solution 186 can be used in subsequent regenerations after proper pH adjustment, seeing as the salinity has not been affected during this process and is at ideal levels for brining. Table II below provides data on the quality of the brine in typical raw untreated spent regenerant solution 100 and the treated regenerant liquid 342. It should be noted that the reading of the untreated and treated spent regenerant solution 100 and rinse water 196 from the salometer 221 was between 38 and 40 degrees, which indicates a salt concentration by weight of 10-10.6% (0.9-0.95 # salt/gal). This concentration is within the 10%-13% by weight recommendations of the manufacturer, therefore requiring no additional salt to be added. Samples 1, 2 and 3 were taken from different tests using various doses of regenerant treatment composition 111 comprising sodium hydroxide, calcium hydroxide and sodium carbonate to treat the spent regenerant solution 100 comprising brine only, brine and rinse combination and rinse only, respectively. It is apparent through the removal efficiency of several constituents that the regenerant treatment process was effective in treating the spent regenerant solution 100 to levels that exceeded "sweet" and reclaimed brine. The "sweet" brine in this context refers to saturated brine at 26.4% by weight (2.65 #salt/gal) at which point additional salt will not dissolve in the solution. The treated regenerant liquid 342, labeled "Reclaim Brine" in Table II, which is the last one-third of the rinse cycle, is captured and blended with the highly concentrated sweet brine to achieve the proper salinity strengths. Typically, the last one-third of the rinse cycle is predominately free of contaminants and has moderate levels of salinity which lends well to using it for blending down the "sweet" brine. However, in Table II below, it is apparent that the treated regenerant liquid 342 had higher hardness levels attributed to capturing the rinse water 196 too early in the process.

TABLE II

TESTING REPORT

| | | $Na^+$ (g/L) | $Ca^{2+}$ (mg/L) | $Mg^{2+}$ (mg/L) | $Fe^{3+}$ (mg/L) | $Ba^{2+}$ (mg/L) | $Sr^{2+}$ (mg/L) | $K^+$ (mg/L) | Mn (mg/L) | As (mg/L) |
|---|---|---|---|---|---|---|---|---|---|---|
| Sample 1 | Supernatant | 53.91 | 12.80 | 0.96 | BDL | 0.3280 | 1.6500 | 419.81 | 0.0800 | 1.5700 |
| | Filtrate | 53.98 | 6.40 | 0.96 | BDL | 0.3960 | 1.5800 | 450.83 | 0.0385 | 0.4590 |
| | Brine | 27.97 | 8800.00 | 6240.00 | BDL | 11.2000 | 149.9188 | 366.00 | 1.2300 | 0.3780 |
| Sample 2 | Supernatant | 68.71 | 56.00 | 0.00 | BDL | 0.3280 | 1.5000 | 265.68 | 0.0603 | 1.1200 |
| | Filtrate | 70.16 | 8.00 | 0.00 | BDL | 0.2570 | 1.0400 | 281.10 | 0.0230 | 0.5680 |
| | Brine | 51.45 | 4400.00 | 720.00 | BDL | 8.3000 | 96.1293 | 234.03 | 0.9740 | 8.1000 |
| Sample 3 | Supernatant | 59.06 | 72.00 | 4.32 | BDL | 0.4920 | 3.8800 | 417.29 | 0.0125 | 0.5540 |
| | Filtrate | 59.41 | 32.00 | 5.76 | BDL | 0.9030 | 7.4000 | 397.17 | 0.0097 | 0.4370 |
| | Brine | 29.86 | 6400.00 | 5280.00 | BDL | 9.1000 | 102.5359 | 336.64 | 1.1200 | 0.5470 |
| Sweet Brine | | 159.39 | 128.00 | 5.28 | BDL | 0.1050 | 2.3000 | BDL | 4.2900 | 2.5300 |
| Reclaim Brine | | 65.67 | 10000.00 | 1200.00 | BDL | 15.5000 | 185.7957 | 438.19 | 1.6100 | 0.6780 |

| | | $Cl^-$ (g/L) | $SO_4^{2-}$ (mg/L) | $SiO_2$ (mg/L) | Zn (mg/L) | Cu (mg/L) | Ni (mg/L) | Pb (mg/L) | Cd (mg/L) |
|---|---|---|---|---|---|---|---|---|---|
| Sample 1 | Supernatant | 82.49 | 200.97 | 34.6663 | 1.6400 | 1.2200 | 0.0967 | 0.0489 | 0.0018 |
| | Filtrate | 82.78 | 177.55 | 22.8969 | 0.5220 | 1.6900 | 0.1090 | 0.0676 | 0.0011 |
| | Brine | 69.81 | 170.22 | 9.3941 | 5.0700 | 1.9700 | 0.3880 | 0.1870 | 0.0020 |
| Sample 2 | Supernatant | 104.50 | 293.33 | 18.3175 | 0.6350 | 1.5300 | 0.1720 | 0.0392 | 0.0009 |
| | Filtrate | 96.20 | 260.70 | 31.6704 | 0.2270 | 1.7100 | 0.0689 | 0.0278 | 0.0014 |
| | Brine | 88.01 | 317.99 | 11.5126 | 1.1200 | 1.7500 | 0.3210 | 0.1950 | 0.0044 |
| Sample 3 | Supernatant | 90.97 | 396.99 | 4.0016 | 0.2280 | 1.3100 | 0.0496 | 0.0240 | 0.0004 |
| | Filtrate | 91.47 | 373.12 | 10.9991 | 0.3750 | 1.7300 | 0.1110 | 0.0413 | 0.0005 |
| | Brine | 69.13 | 172.01 | 7.4682 | 2.7700 | 1.9600 | 0.4350 | 0.1330 | 0.0085 |
| Sweet Brine | | 248.01 | 214.85 | 8.7950 | 0.5610 | 5.0000 | 0.0601 | 0.1110 | 0.0079 |
| Reclaim Brine | | 122.94 | 182.95 | 8.5810 | 1.2300 | 3.7400 | 0.3960 | 0.0814 | 0.0004 |

| | | pH | Hard (mg/L as) | Alk. (mg/L as) | $OH^-$ (mg/L as) | $HCO_3^-$ (mg/L) | $CO_3^{2-}$ (mg/L) | Conduct. (mS/cm) | Temp. (° C.) | TOC (mg/L) |
|---|---|---|---|---|---|---|---|---|---|---|
| Sample 1 | Supernatant | 6.92 | 35.93 | 805.00 | 0.0042 | 980.74 | 0.38 | 139.50 | 21.60 | 8.05 |
| | Filtrate | 7.92 | 19.93 | 660.00 | 0.0413 | 798.50 | 3.03 | 139.80 | 21.70 | 10.92 |
| | Brine | 6.70 | 47573.77 | 70.00 | 0.0025 | 85.31 | 0.02 | 114.90 | 21.80 | 9.11 |
| Sample 2 | Supernatant | 7.11 | 140.00 | 1510.00 | 0.0064 | 1838.91 | 1.08 | 167.40 | 21.80 | 11.52 |
| | Filtrate | 7.30 | 20.00 | 1120.00 | 0.0099 | 1363.06 | 1.24 | 166.50 | 21.90 | 12.07 |
| | Brine | 6.80 | 13950.82 | 135.00 | 0.0031 | 164.50 | 0.05 | 143.90 | 21.80 | 6.30 |
| Sample 3 | Supernatant | 5.76 | 197.70 | 25.00 | 0.0003 | 30.48 | 0.00 | 150.20 | 21.90 | 6.90 |
| | Filtrate | 9.84 | 103.61 | 105.00 | 3.4942 | 74.86 | 24.05 | 150.90 | 21.80 | 7.56 |

TABLE II-continued

TESTING REPORT

| | | | | | | | | | |
|---|---|---|---|---|---|---|---|---|---|
| Brine | 6.60 | 37639.34 | 75.00 | 0.0020 | 91.41 | 0.02 | 114.50 | 22.00 | 6.04 |
| Sweet Brine | 7.12 | 341.64 | 105.00 | 0.0065 | 127.86 | 0.08 | 254.00 | 21.60 | 11.64 |
| Reclaim Brine | 6.49 | 29918.03 | 90.00 | 0.0016 | 109.70 | 0.02 | 180.00 | 22.00 | 4.06 |

BDL: Below detection limit

The treated regenerant liquid 342 can be pH-adjusted with a pH-adjuster such as an acid from a pH-adjuster tank 387 via ph-adjuster feed pump 389. A suitable acid is hydrochloric acid. The purpose of the pH adjustment is to neutralize the relatively high pH of the treated regenerant liquid 342 to an adjusted pH to reduce or prevent scaling and balance the chloride ion concentration in the treated regenerant liquid 342. This can either be performed in a batch type process or a compound loop flow paced process. In the batch type embodiment, the ph adjuster 351, such as the hydrochloric acid, is added until the desired pH range or chloride ion concentration is achieved as indicated by a pH probe or pH test strips. In the compound loop flow paced embodiment, a PLC automatically adjusts the speed and/or stroke of a metering pump based on the filtrate flow entering the ph-adjusting tank 350 and fine tunes the dosage based on a real-time pH probe feedback from instrumentation in the ph-adjusting tank 350. In either embodiment, a circulation mixer, such as an impeller mixer 394 or an inline static mixer, is utilized to thoroughly disperse the acid 231 into the filtrate stream supplied to the tank 350. Since the spent rinse water 204 is combined with spent regenerant solution 100 and spent backwash water 207 to form the regenerant waste liquid 376, excess "sweet" brine will be generated. In this context, "sweet" brine refers to brine that is ready for regeneration without having to add any more salt and/or dilution water. The excess quantity of "sweet" brine generated in the regenerant treatment process can be sold separately, or treated with a distillation process to later be used as rinse water 196 in the regeneration process as described below. The excess, pH-adjusted treated regenerant liquid 342 of brine can be stored in the regenerant solution tank 188 for recycling and reuse.

The resin regeneration and regeneration system 80 can be manually operated, or operated with one or more control devices 352a-i and/or a system controller 348, as described above. The control devices 352a-i can be, for example, packaged control panels that include switches, programmable logic chips (PLC) 354, and/or hard wire relays 356, and which can operate independently or in conjunction with each other. The control devices 352a-i control the regenerant recovery process in the resin regeneration system 80, and accordingly, are connected to the various pumps, level indicators (not shown) in the tanks and vats, valves, chemical dispensers, and other components of the system 80. The system 80 can also be partially or fully automated using a system controller 348 with appropriate program code 370. For example, the system controller 348 can include program code 370 comprising instruction sets that sends signals to the various valves in the piping 334 to control the flow of the liquids through the system 80, such as the regenerant solution 186, spent regenerant solution 100, treated regenerant liquid 342, regenerant waste liquid 376, backwash water 144, and rinse water 196. The valves can include ball valves, air or vacuum valves, or check valves. The program code 370 also has instructions sets to receive and sends signals to and from pressure gauges 187 which are used to monitor their liquid pressure in the piping 334 of the system 80, and flow meters. The program code 370 also includes instruction sets to operate other components such as the chemical dispensers and sprayers.

The batch-type resin regeneration system 80 achieved excellent results in removing the divalent ions and other chemicals from the spent regenerant solution 100. This allows an almost complete recovery and reuse of the spent regenerant solution 100, limiting the environmental impact that would otherwise be caused by the disposal of spent regenerant solution containing a large amount of sodium chloride and other mineral hardness into the wastewater systems. The following Table III reveals actual certified laboratory results for the regenerant solution recovery system.

TABLE III

| | | Location post PH adjustment | | |
|---|---|---|---|---|
| Analyte | Units | Raw Water | Filtrate (no 5 um) | Filtrate (5 um filt) |
| TREATED WATER RESULTS | | | | |
| Silicon (as SiO2) | mg/L | <52 | <52 | — |
| Nitrate-N | mg/L | 0.3 | 0.3 | — |
| Hydroxide | mg/L | 0 | 0 | — |
| Alkalinity | mg/L | 163 | 2860 | — |
| Sodium - Total | mg/L | 20100 | 37000 | — |
| Arsenic - Total | mg/L | <0.020 | <0.020 | <0.020 |
| Strontium - Total | mg/L | 68.6 | <2.5 | — |
| Carbonate | mg/L | 163 | 2860 | — |
| Barium - Total | mg/L | 6.47 | <0.2 | — |
| Total Dissolved Solids | mg/L | 79700 | 102000 | 98600 |
| Fluoride | mg/L | <1 | <1 | — |
| Chloride | mg/L | 49100 | 58300 | 58300 |
| Magnesium - Total | mg/L | 1030 | <25.0 | <25.0 |
| Hardness - Total | mg/L | 14400 | <16.6 | <16.6 |
| Manganese - Total | mg/L | 0.69 | <0.2 | — |
| Calcium Total | mg/L | 4060 | <125.0 | <125.0 |
| Calcium Hardness | mg/L | 10100 | <12.5 | <12.5 |
| Silicon - Total | mg/L | <25 | <25 | — |
| Bicarbonate | mg/L | <20 | <20 | — |
| Potassium - Total | mg/L | 135 | 131 | — |
| Sulfate | mg/L | 237 | 177 | 51 |
| Iron - Total | mg/L | <2.5 | <2.5 | — |
| TREATMENT PARAMETERS THAT LED TO TREATED WATER RESULTS ABOVE | | | | |
| Brine Strength | % by wt | 12 | REGEN OPS | |
| Brine Strength | lb salt/gal | 1.092 | VARIABLES | |
| Brine Dose | lb/cf | 15 | | |
| Regen Resin Volume | cf | 120 | | |
| Brining Volume | gal | 1649.1 | | |
| Untreated Total Hardness | mg/L | 14400 | JAR TEST | |
| Test Volume | mL | 500 | | |
| CaOH Dose | g | 3 | | |
| NaOH Dose | g | 3 | | |
| NaCO3 Dose | g | 13.5 | | |
| Treated Total Hardness | mg/L | 10 | | |
| Untreated Total Hardness | mg/L | 14400 | FULL SCALE EQUIPMENT | |
| Batch Volume | gal | 1035 | | |
| CaOH Dose | lb | 51.8 | | |
| NaOH Dose | lb | 51.8 | | |
| NaCO3 | lb | 232.9 | | |

TABLE III-continued

| Analyte | Units | Location post PH adjustment | | |
| --- | --- | --- | --- | --- |
| | | Raw Water | Filtrate (no 5 um) | Filtrate (5 um filt) |
| Treated Total Hardness | mg/L | <16.6 | | |

The batch-type resin regeneration system 80 can achieve a zero liquid discharge, which means that almost none or less than 5% of the liquid used in regeneration and recovery is discharged to drains. In fact, the resin regeneration system 80 described herein allows recovery of greater than 90%, or even 98% of the spent regenerant solution 100. The regeneration system 80 reduces water consumption and saves the cost of the chemical compounds used in the recycled regenerant solution 100, as they are retained in the solution while undesirable ions are removed by the recovery process.

Resin Transfer Pump

In any of the resin regeneration and recovery systems 80 described herein, a non-abrasive resin transfer pump 130 can be used to transfer resin without excessively abrading or deforming the resin. The non-abrasive resin transfer pump 130 does not degrade spent resin 60 or regenerated resin 194 during pumping transfer operations because it has moving pumping components that can pump the resins without excessively abrading, deforming, or re-shaping the resin. In contrast, the mechanical components of conventional pumps directly contact and apply pressure to the resin to abrade or erode the resin into resin fines 166, distort its shape by flattening beads, or by changing the surface area or porosity of the resin. The non-abrasive resin transfer pump 130 is used to transfer fresh resin 22, spent resin 60, or regenerated resin 194 between the different pits, vats and tanks, of the resin regeneration and recovery system 80 using pumping components that do not abrade the spent ion exchange resin in the liquid-resin mixture.

Figure 4A:
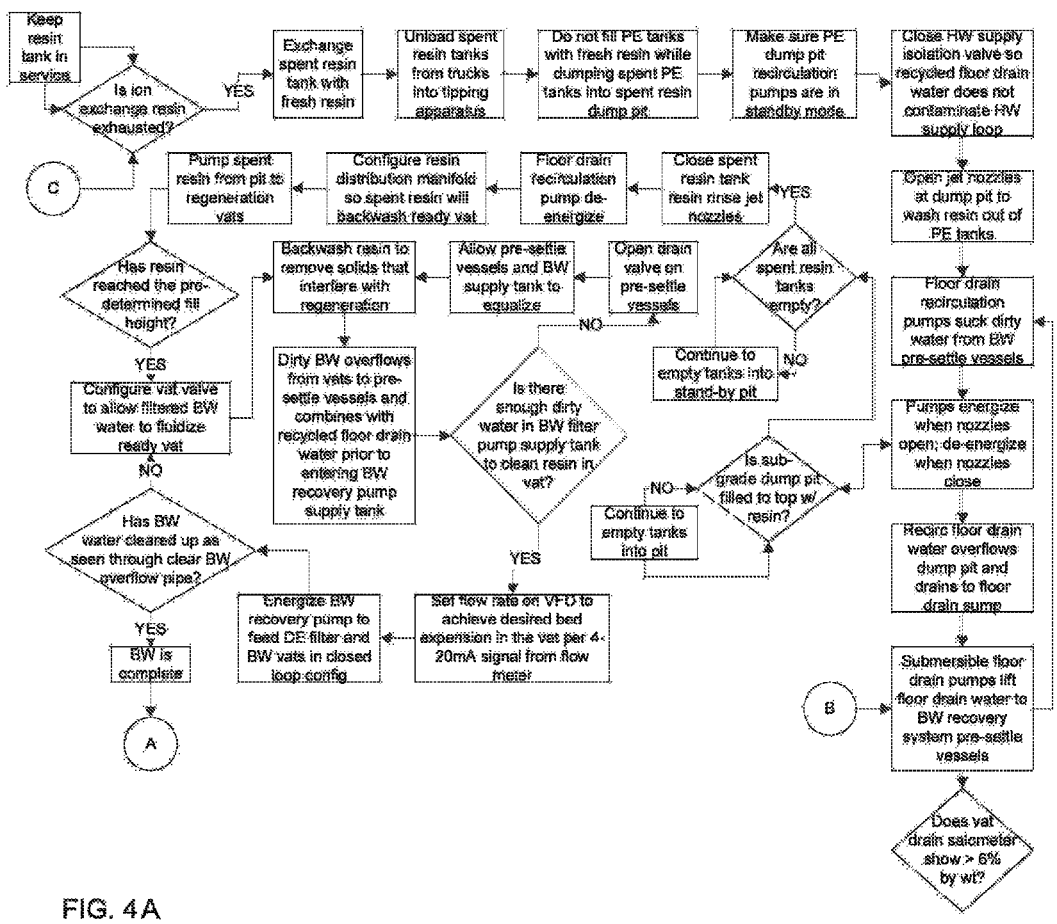
FIGS. 4A to 4D are flowcharts of another exemplary embodiment of a resin regeneration and recovery process.
Figure 4B:
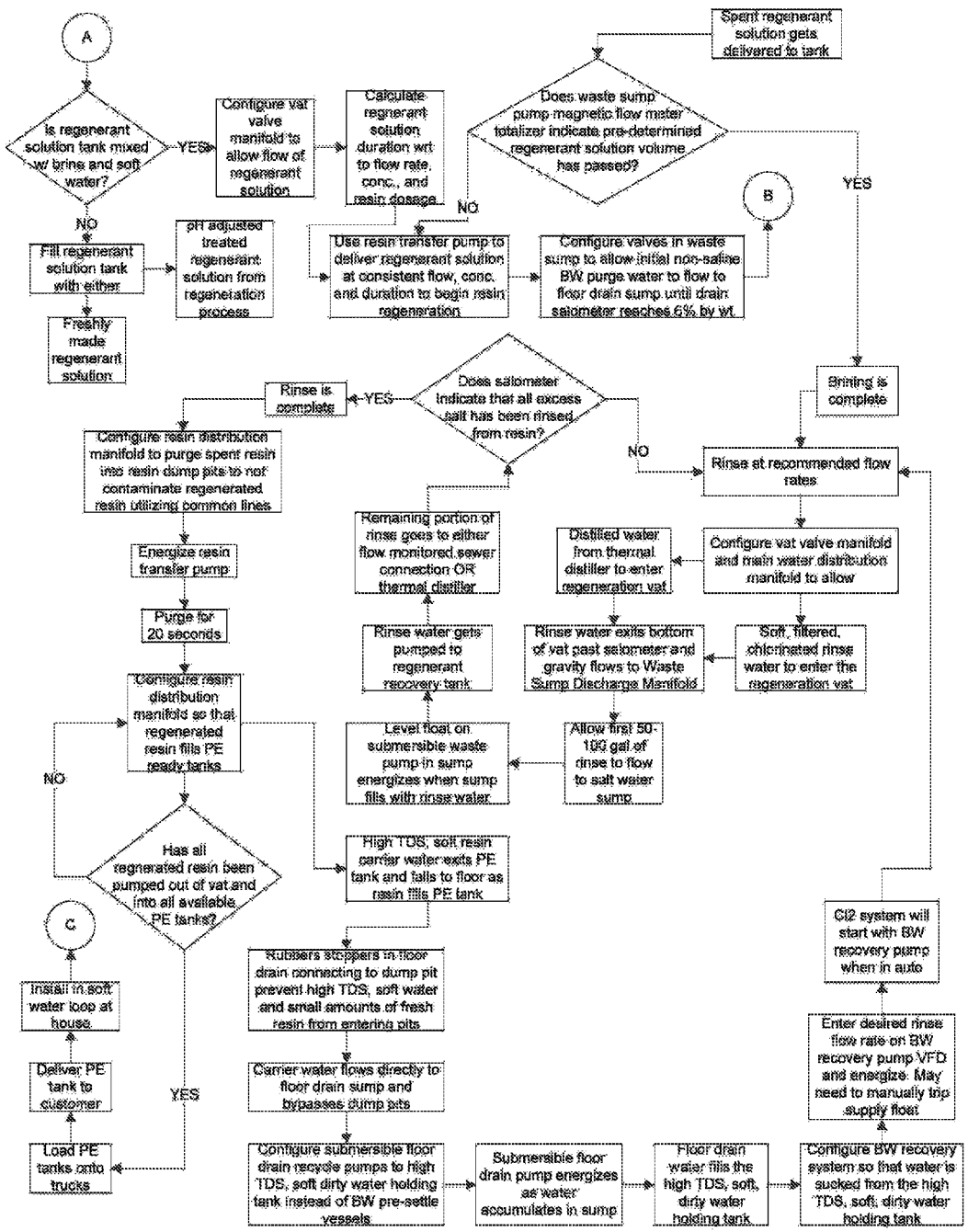
Figure 4C:
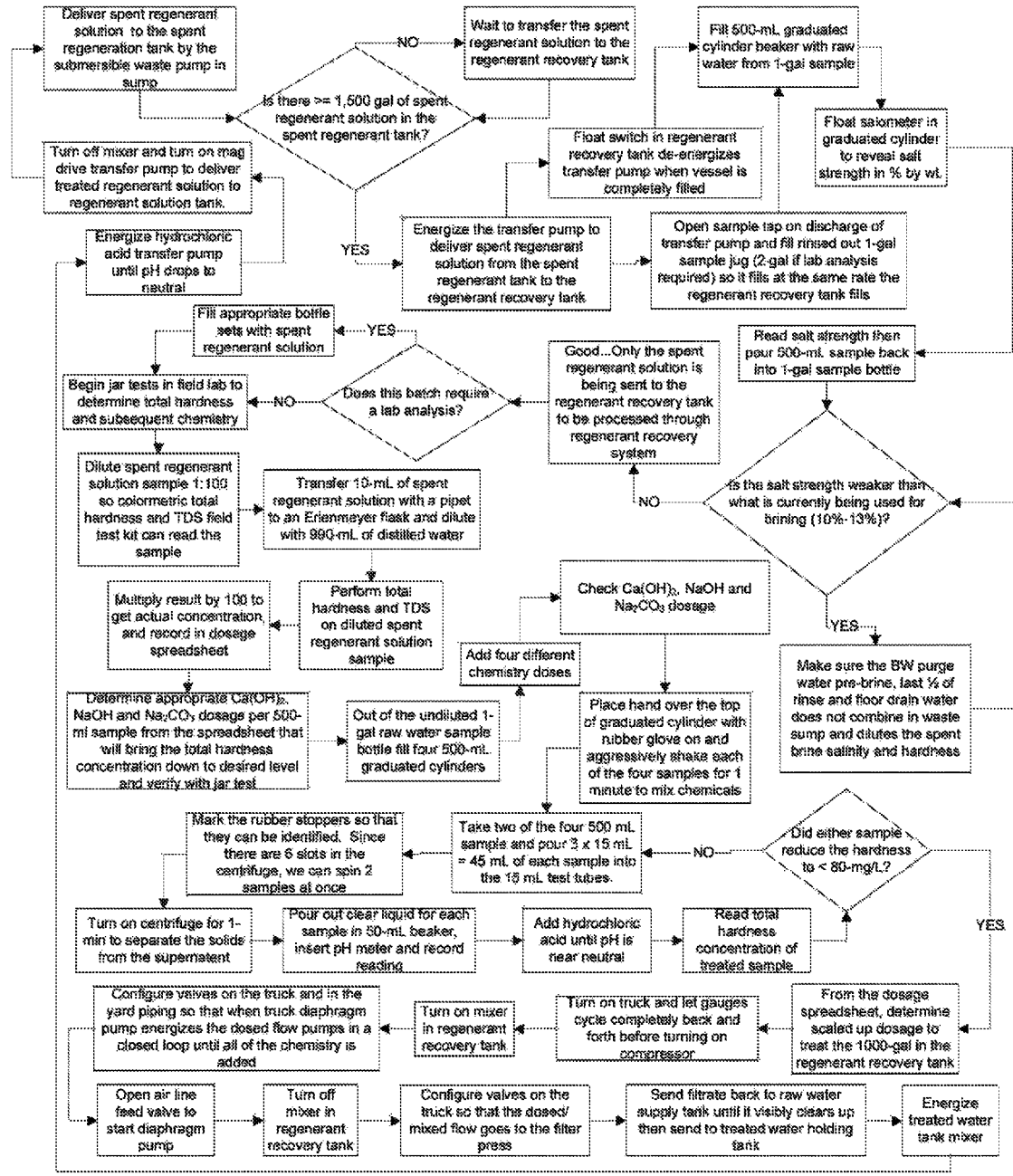
Figure 4D:
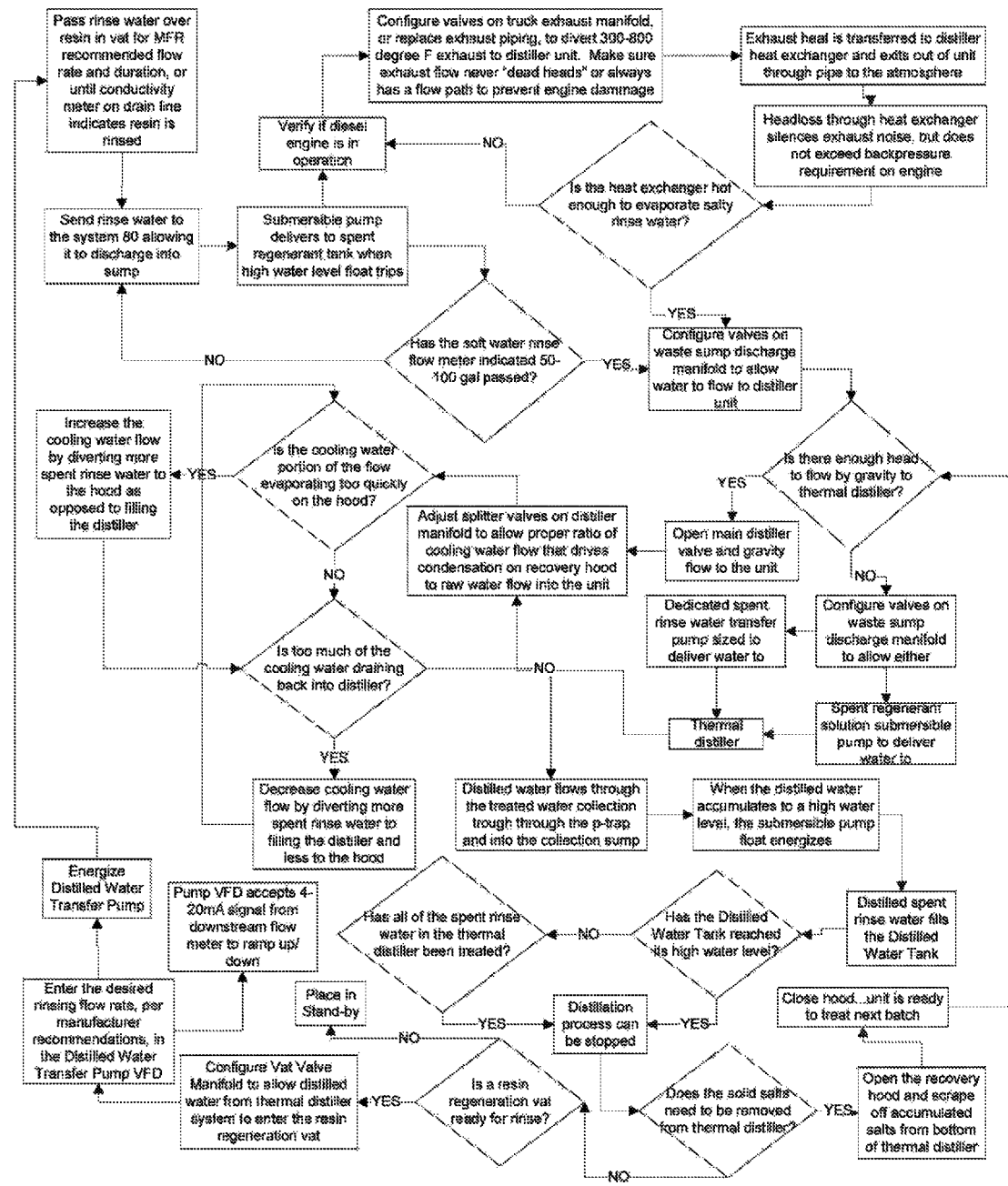

In one version, the non-abrasive resin transfer pump 130 comprises a positive displacement peristaltic pump 79 (also known as a hose pump, or peristaltic pump) an illustrative version of which is shown in FIGS. 6A to 6C. The peristaltic pump 79 provides a positive displacement flow of pressurized water without the need of excess water to aid in the resin movement. In the version shown, the peristaltic pump 79 (also known as a hose pump) comprises a housing 81 having an arcuate casing 82 that is shaped to hold a flexible tube 83 in an arcuate shape, such as U-shape (as shown), or even a C-shape or O-shape (not shown). A motor 85 powers a rotatable support 86 that is mounted at the center of radius 87 of the arcuate casing 82. Each of two spin rollers 89a, b are mounted on axes 91a, b on the support 86, which are located at the external circumference of the tube 83. The motor 85 rotates the rotatable support 86, which in turn rotates the two spin rollers 89a, b freely about their own axes 91a, b, respectively, as shown in FIGS. 6A and 6B. The rotating spin rollers 89a, b compress and squeeze the flexible tube 83 against the arcuate casing 82 as they rotate around to squeeze forward the spent resin 60 (or fresh or regenerated resin 194) in the tube 83 from the suction port 132 to the output port 134 of the pump 79. As the spin rollers 89a, b turn, the part of tube 83 under compression occludes to force the resin 60 (and added liquid such as water) to be pumped to move through the tube 83 as shown in FIGS. 4B and 4C. Further, as the tube 83 opens to its natural state after the passing of the spin roller 89a, b the natural resilience of the tube 83 pulls or sucks in more liquid and resin into the tube from the suction port 132, which in turn is directed to the output port 134 and eventually the regeneration vat 140. The rollers 89a, b can be rotated in a clockwise or counterclockwise manner to allow the resin to move bi-directionally (i.e., in either direction through the pump). The resin 60 is pushed through the flexible tube 83 in a pulsating manner until the desired volume of resin is transferred into any one of the vats 140a-c as can be seen by the sight glass window on the side of the vat.

A suitable peristaltic pump 79 comprises a PeriFlo Pump Model FMP60 peristaltic hose pump, fabricated by Periflo Inc, Loveland, Ohio. In one version, the peristaltic pump 79 has a maximum flow rate of from about 44 gallons per minute at 115 pounds per square inch pressure. A suitable displacement for the pump 79 is from about 0.83 gallons/revolution. The operating pressure can be from about 20 to about 300 psi, such as about 115 psi. The flexible tube 83 can be a polymer tube such as a natural rubber hose, Buna M, or Norpreen hose. The housing 81 of the pump 79 can be made from aluminum (e.g., powder epoxy-coated aluminum), the support 86 made from steel or other hard materials, and the base is also made from steel. The suction port 132 and output port 134 can have a diameter sized from about 0.5 to about 3 inches, or even 1 inch. The pump motor 85 can be a 0.5 to 4 HP motor, or even 1 HP. The pump motor 85 can be operated at a speed of 10 to 60 rpm for example, 39 rpm speed at 60 Hz. A variable frequency drive can be used to set the speed of the motor 85.

While an exemplary version of a peristaltic pump 79 is illustrated, other versions of the peristaltic pump 79 having shoes or wipers having other shapes instead of the spin rollers 89a, b can also be used. For example, a linear-shaped casing can also be used together with linear rollers that move along the direction of the linear tube instead of a curved U-shaped casing. Also, the suction port 132 and output port 134 can be reversed by reversing the polarity of a voltage applied to the motor 85.

The peristaltic pump 79 was found to be unexpectedly advantageous for pumping fragile resin 22 that cannot be pumped through conventional pumps without breaking or tearing the resin apart. Another side benefit to the peristaltic pump 79 was the elimination of softened water which is needed to transfer regenerated resin through conventional injector-type pumps. This reduces the costs of generating large amounts of softened water and the costs of regenerating associated water softening systems. While softened water is also used in other applications, changing the pump to the aforementioned peristaltic pump 79 effectively reduced regeneration of water softeners in the system to 2 times per month as compared with the 20 times per month needed for conventional injector-type pumps. Further, the peristaltic pump 79 pumps resin through the flexible tube 83 without pumping components such as moving metal parts directly contacting or touching the resin beads 24 in the tube 83. Thus, the pump 79 also allows pumping of corrosive liquids (such as regenerant solution 186 containing brine) which would otherwise corrode metal pump parts, without excessive corrosion of the pump.

In another embodiment, the non-abrasive resin transfer pump 130 is a differential pressure venturi-type injector 53 (also known as an ejector or eductor) which is placed on the discharge side of a motive flow 55, as shown in FIG. 7.

The injector 53 uses a venturi-type effect generated by a set of converging and diverging nozzles to convert the water pressure of a motive flow 55 to increased water velocity, which creates a low-pressure zone that draws in and entrains resin-liquid mixture containing the spent resins 60. In the version shown, the injector 53 comprises an inlet 51 comprising an inlet nozzle 54 through which the motive flow 55 of fluid at high pressure is provided. The fluid can be a liquid such as pressurized water, regenerant solution, or other solutions; or a pressurized gas such as steam or pressurized nitrogen. In one version, a conventional centrifugal pump 41 or other pressurized potable water supply is used to provide a motive flow 55 comprising pressurized liquid.

In operation, the motive flow 55 of pressurized liquid, such as water, is constricted by the inlet nozzle 54 to form a liquid jet stream 56 that is directed into an injection chamber 63 at a first velocity and first pressure. The increase in velocity of the motive flow 55 through the injection chamber 63 results in a corresponding decrease in pressure, which draws fresh resin 22 or spent resin 60 through a suction port 132 located adjacent and perpendicular to the flow direction of the jet stream 56. The pressurized liquid and resin stream 56 is then passed through the throat 57 of a converging-diverging nozzle 58, which creates a high pressure area at the throat 57. The pressure energy of the motive flow 55 is converted to kinetic energy in the form of velocity head at the throat 57 of the convergent-divergent nozzle 58. The mixed resin and liquid then enters a divergent nozzle 58 which allows expansion of the fluid jet stream in the divergent nozzle outlet 59, and thus, creates a second pressure that is even lower than the first pressure to keep the resin 22 and liquid flowing towards the outlet 77 and the regeneration vat 140. In this manner, the resin pumping process comprises providing a flow of pressurized water; constricting a flow of pressurized liquid to form a liquid jet stream; drawing resin through a suction port adjacent to the jet stream of water; and expanding the jet stream of water to have a second velocity and second pressure, the second velocity being lower than the first velocity and the second pressure being lower than the first pressure to pump the spent resin to the regeneration vat. Typical resin transfer ratios range from 13-35 gallons of water to move 1 gallon of resin. Suitable differential pressure injectors include the Eductor™ from Pentair, Minneapolis, Minn., or a Mazzei® Injector from Mazzei Injector Corp., Bakersfield, Calif. The injector 53 is also advantageous as it does not damage or otherwise degrade spent resin 60, especially resin beads 24, during transfer operations. The injectors 53 can also be used as back-up systems in the event of failure of the peristaltic pump 79, such as a breakage in the flexible tube 83, or when the pump 130 needs to be replaced or removed for maintenance.

Filtering System

In any of the resin regeneration and recovery systems 80 described above, a solids separator 500 can be used to separate insoluble material, such as precipitates, from a liquid such as water or other solutions, and may comprise, for example, a filter press, centrifuge, sediment filter, or other solids separating apparatus. In one version, the solids separator 500 comprises a filter 508 that filters the treated regenerant liquid 342 to separate out precipitate flocs 114 from the solution.

Figure 5C:
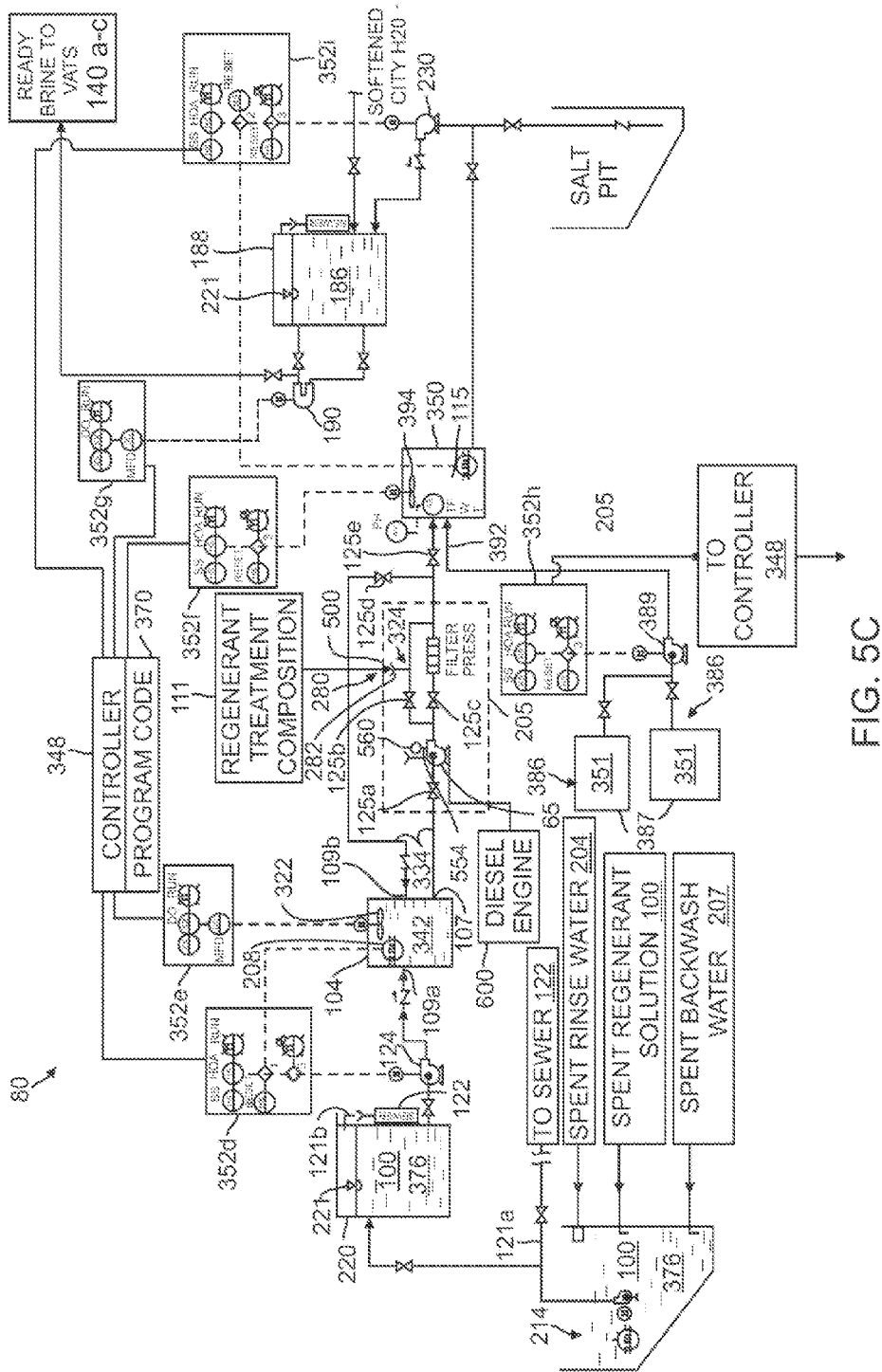
FIG. 5C is a schematic diagram of yet another portion of the regeneration and recovery system of FIGS. 5A and 5B.
Figure 8A:
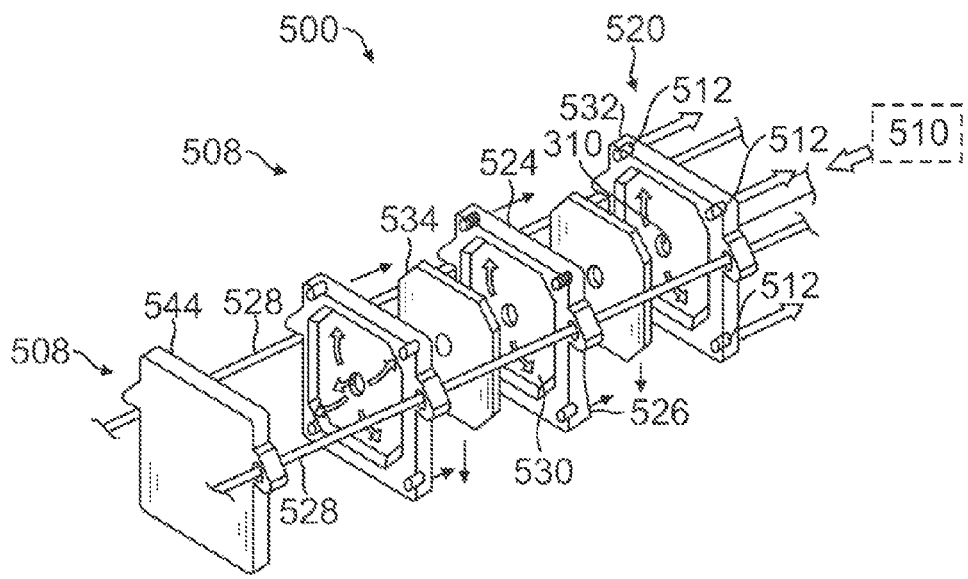
FIG. 8A is an exploded schematic perspective view of a section of a solids separator comprising a filter press showing a plurality of filter plates that slide along a pair of rails.
Figure 8B:
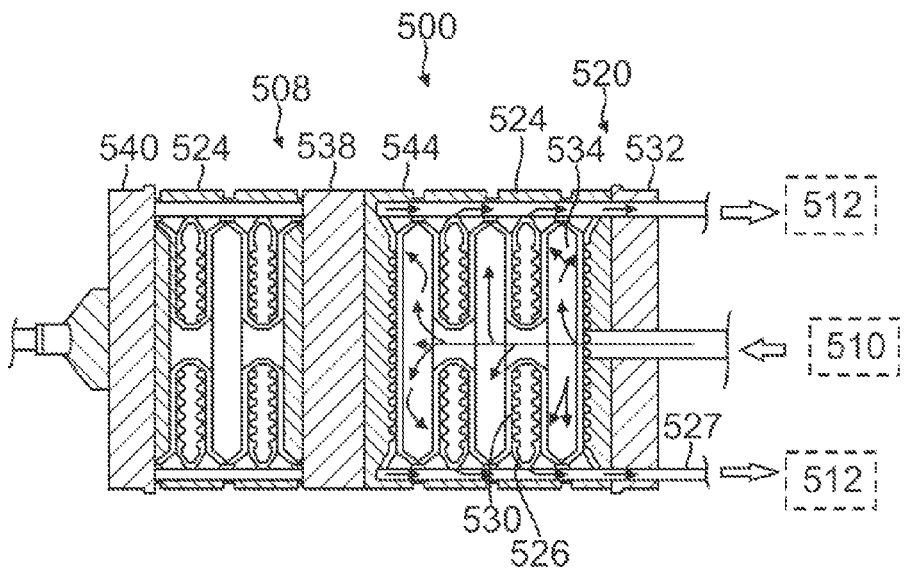
FIG. 8B is a cross-sectional top view of the filter press of FIG. 8A showing the flow of treated regenerant liquid comprising precipitate flocs across the plates.

In one embodiment, the filter 508 comprises a filter press 520 that includes a series of filter plates 524 which are configured to trap the precipitate flocs 114 from a treated regenerant liquid 342 that is pumped by a pump 65 (see FIG. 5C) through the filter plates 524, as illustrated in FIGS. 8A and 8B. The filter plates 524 each comprise a frame 526 made from polypropylene or metal, and a filtering cloth 530 stretched taut across the frame. The filter plates 524 are arranged substantially parallel to one another, and configured to slide along a pair of rails 528, so as to enable separation of the plates 524 to create space between the plates 524. A suitable filter press 520 is a J-Press® from Siemens Water Technologies, Corp., Holland, Mich.

In the version shown, each filter plate 524 comprises discharge tubes 526 to receive filtered fluid from the filtering cloth 530 and allow transfer of the filtered fluid along the filter stack to the outlets 512. O-rings can be provided around the periphery of the filtering cloth 530 and around the discharge tubes 527 so that when the filter plates 524 are pressed together, a water-tight seal is formed between the plates 524 and around the path of the discharge tubes 527. Head plate 532 and tail plate 544 are pressed towards each other to maintain an active filter stack in a water-tight state during filtering by sealing the ends of the stack. In the embodiment shown, a back-up plate 538 and follower plate 540 are provided behind tail plate 544 to enclose additional filter plates 524 to maintain this second filter stack in a water-tight state during filtration. Head plate 532 comprises passages to receive fluid from an inlet 510 and to release treated fluid from the discharge tubes 527 to the four outlets 512 which are located at each corner. The filter plates 524 can be separated to remove precipitated or insoluble material which accumulates between the filtering cloths 530 to form filter cakes 534. The accumulated filter cakes 534 can also be removed from the plates 524 by scraping, picking, vibrating, or shaking the plates after they are separated. The filter press 520 can optionally include rinse valves and rinse fluid supply system, and air drying valves with air supply system (not shown) to allow further treatment of the filter cake 534 prior to removal. For example the filter press 520 can include valves and fluid supply to supply a rinse fluid to the cake 534, e.g., for chemical neutralization of the precipitated material. Alternatively, or additionally, the filter press 520 can include air drying valves and air supply to pass air through the tubes 526, 527 of the filter press 520 and to enable drying of the cake 534 prior to removal.

Figure 9:
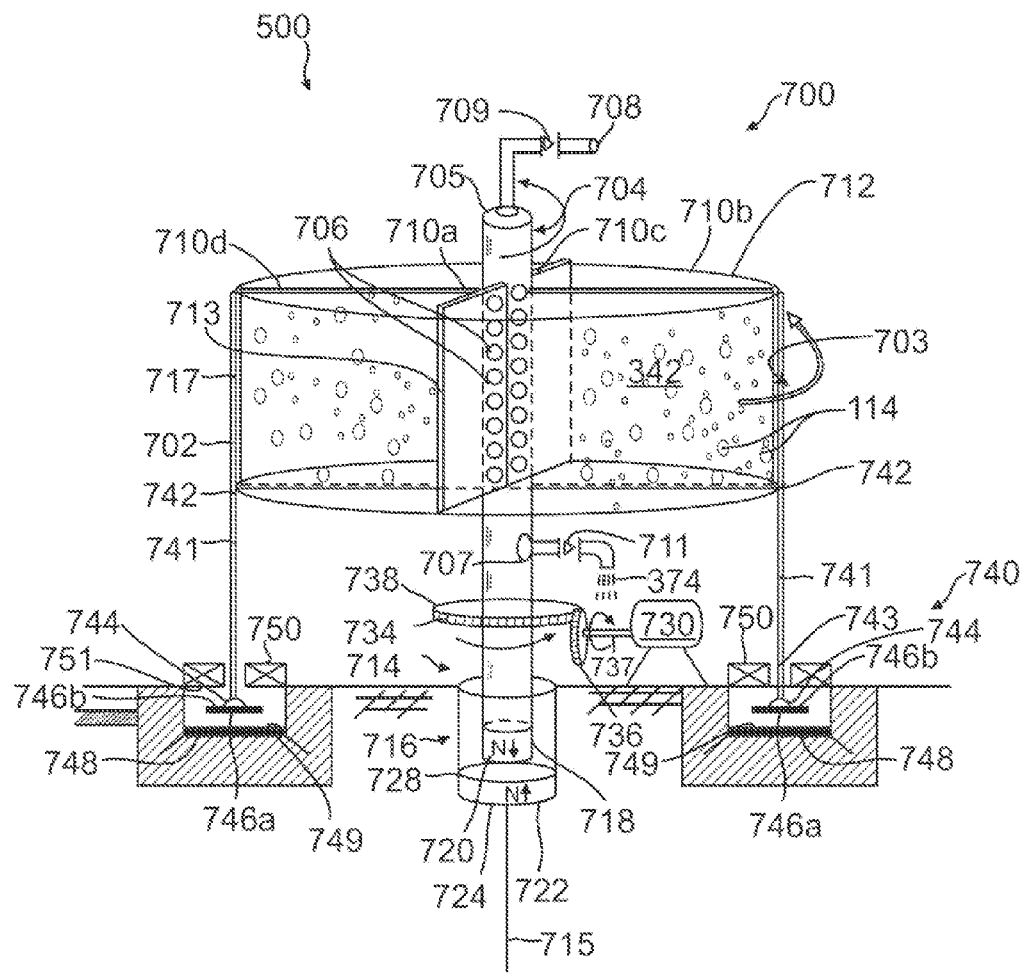
FIG. 9 is a schematic perspective view of a solids separator comprising a centrifuge.

In another version, the solids separator 500 comprises a centrifuge 700 that is adapted to centrifuge precipitate flocs 114 from a treated regenerant liquid 342 processed in the centrifuge 700, as illustrated in FIG. 9. The centrifuge 700 comprises a bucket 702 to hold the liquid 342, the bucket 702 comprising a cylindrical wall 712 having an inner circumference 703 and that encloses the liquid. The bucket 702 can be a stainless steel or plastic container. A rotatable shaft 704 is mounted in the radial center of the bucket 702. The rotatable shaft 704 comprises a hollow tube 705 with a plurality of openings 706, an inlet 708 to receive the treated regenerant liquid 342, and an outlet 707 to release output the centrifuged solution which is free of precipitated compounds of flocs. The openings 706 extend along a length of the hollow tube 705, and allow liquid 342 to pass from the inlet 708 into the hollow tube 705 and out of the openings 706 into the bucket 702. The inlet 708 has an inlet valve 709 which can be shut off once the bucket 702 is filled with liquid 342. During operation, the openings 706 also receive centrifuged clean liquid from the bucket 702 which is forced into the openings 706, and which then passes through the hollow tube 705 and out of the outlet 707. An outlet valve 711 allows clean liquid free of precipitate flocs to flow out of the shaft 704. In one embodiment, the rotatable shaft 704 is made from a metal such as stainless steel, aluminum or titanium. The rotatable shaft 704 can also have depressions or cut-outs to reduce the weight of the rotatable shaft 704.

A plurality of blades 710a-d extend radially outward from the rotatable shaft 704 and have an edge 713 that terminates close to the inner circumference 703 of the cylindrical wall 712 to leave a small gap 717 between the blades 710a-d and the wall 712 of the bucket 702. When rotated, the blades 710a-d impart a centrifugal force to the liquid 342 in the bucket 702 that causes the liquid 342 to spin around in the bucket to force solids, such as the precipitate flocs 114 or other particles, toward the wall 712 of the bucket 702. During the rotational process, clean liquid free of precipitates 114 is forced into the openings 706 and into the hollow tube 705, while the inlet valve 709 is shut and the outlet valve 711 is open, causing clean liquid comprising separated regenerant solution 374 to flow out of the outlet 707. In the version shown the blades 710a-d are flat rectangular plates that are spaced apart along, and attached to, the shaft 704 and extend parallel to a rotational longitudinal axis 715 of the shaft 704. However, the blades 710a-d can have other shapes and configurations that would cause the liquid 342 to be rotated efficiently in the bucket 702, as would be apparent to those of ordinary skill of the art. In one embodiment, the blades 710a-d are made from a metal such as stainless steel, aluminum or titanium.

The rotatable shaft 704 is allowed to rotate about its axis using a rotational system 714, such as ball bearings, fluid based bearings or other systems. In one version, the rotational system 714 comprises a first magnetic levitation system 716 that magnetically levitates the rotatable shaft 704. The magnetic levitation system 716 comprises a first magnet 718 having a first magnetic pole 720 facing away from the shaft 704, and which hovers above a second magnetic pole 722 of a second stationary magnet 724 which is held in place in a cylindrical base 728. The first and second magnets 718, 724 each have magnetic field strengths that are sufficiently strong to levitate the weight of the rotatable shaft 704 so that the shaft 704 can rotate with reduced or even negligible frictional forces.

The rotatable shaft 704 is powered by a motor 730 which rotates the rotatable shaft 704 about the longitudinal rotation axis 715 causing the blades 710a-d to rotate and generate a centrifugal force in the liquid 342 in the bucket 702. For example, the motor 730 may be a rotary electric motor connected to a gear assembly 734 comprising a first gear 736 attached to a shaft 737 of the motor 730 which drives a second gear 738 attached to the rotatable shaft 704. The motor 730 can rotate the rotatable shaft 704 at a speed of from about 500 to about 50,000 rpm.

A second magnetic levitation system 740 magnetically levitates the bucket 702. The second magnetic levitation system 740 comprises a cylinder 741 having a first end 742 that is attached to the wall 712, and a second end 743 attached to an annular magnet 744. The annular magnet 744 comprises a lower face 746a and an upper face 746b that have opposing polarities. A basal magnet 748 has an upward face 749 that faces the lower face 746a of the annular magnet 744, and the upward face 749 has a polarity opposite to the polarity of the lower face 746a. A top magnet 750 has a bottom face 751 that faces the upper face 746b of the annular magnet 744, and has a polarity opposite to the polarity of the upper face 746b. The pair of basal and top magnets 748, 750 each have magnetic field strengths that are sufficiently strong to levitate the weight of the bucket 702, wall 712, cylinder 741, and annular magnet 744 such that the bucket 702 and its liquid contents can rotate with reduced or even negligible frictional forces.

In the resin regeneration and recovery systems 80, spent rinse water 204 or other forms of wastewater which cannot be otherwise recovered can be distilled in a distillation apparatus 328 to form distilled water 329, for example, as shown in FIGS. 10A to 10D. In one version, the distillation apparatus 328 generates distilled water 329 from the spent rinse water 204, and the distilled water is highly pure and considered a "hungry" water, thereby wanting to bond to any available ions in the water such as the excess salt, and accordingly, is beneficial for reuse as "softened" rinse water. The distillation apparatus 328 can be used to treat 97% of the treated water volume needed for rinsing the regenerated resin 194, reducing the need to add make-up water from the city water supply for rinsing. This further minimizes water consumption and provides a closer to zero liquid discharge from the resin regeneration and recovery system 80.

Figure 10A:
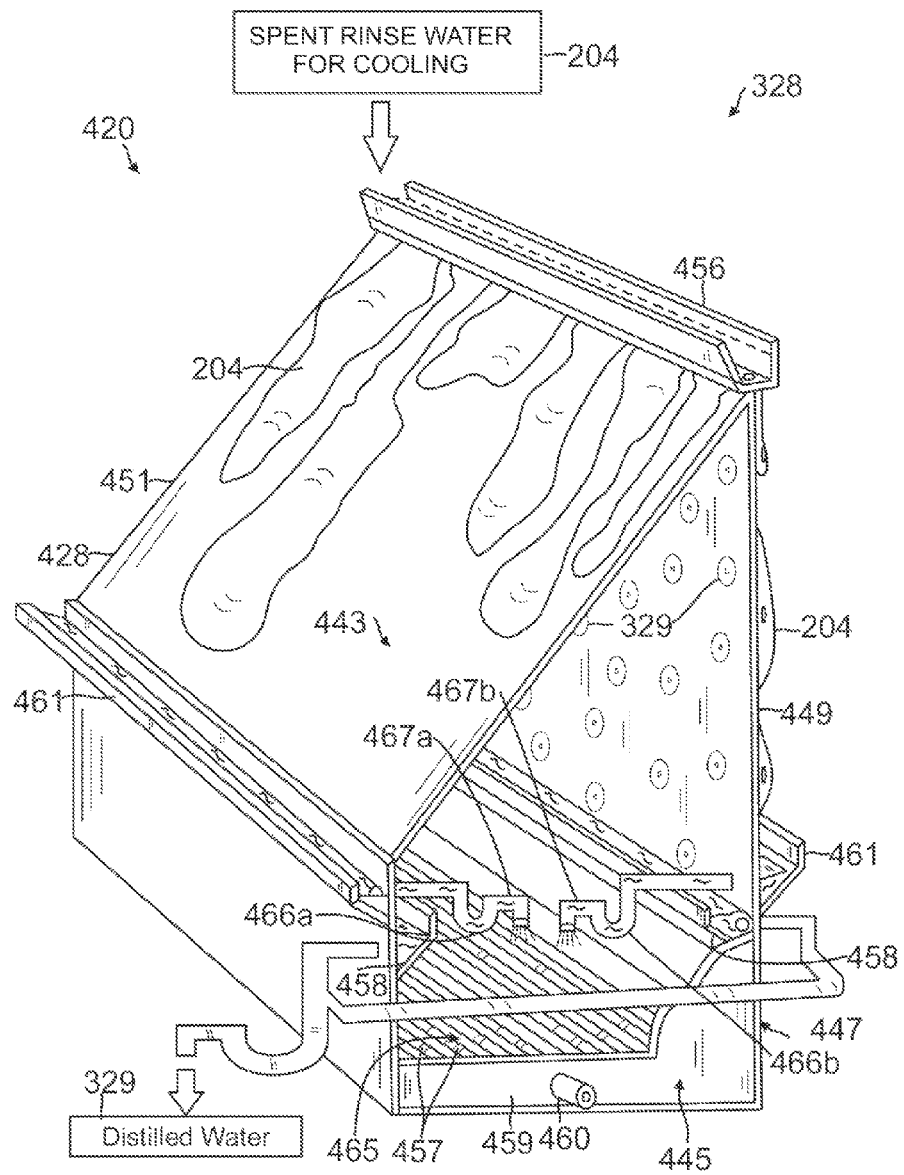
FIG. 10A is a perspective view of a thermal distiller to distill spent regenerant solution or other waste liquids from the resin regeneration process to recover distilled water.
Figure 10B:
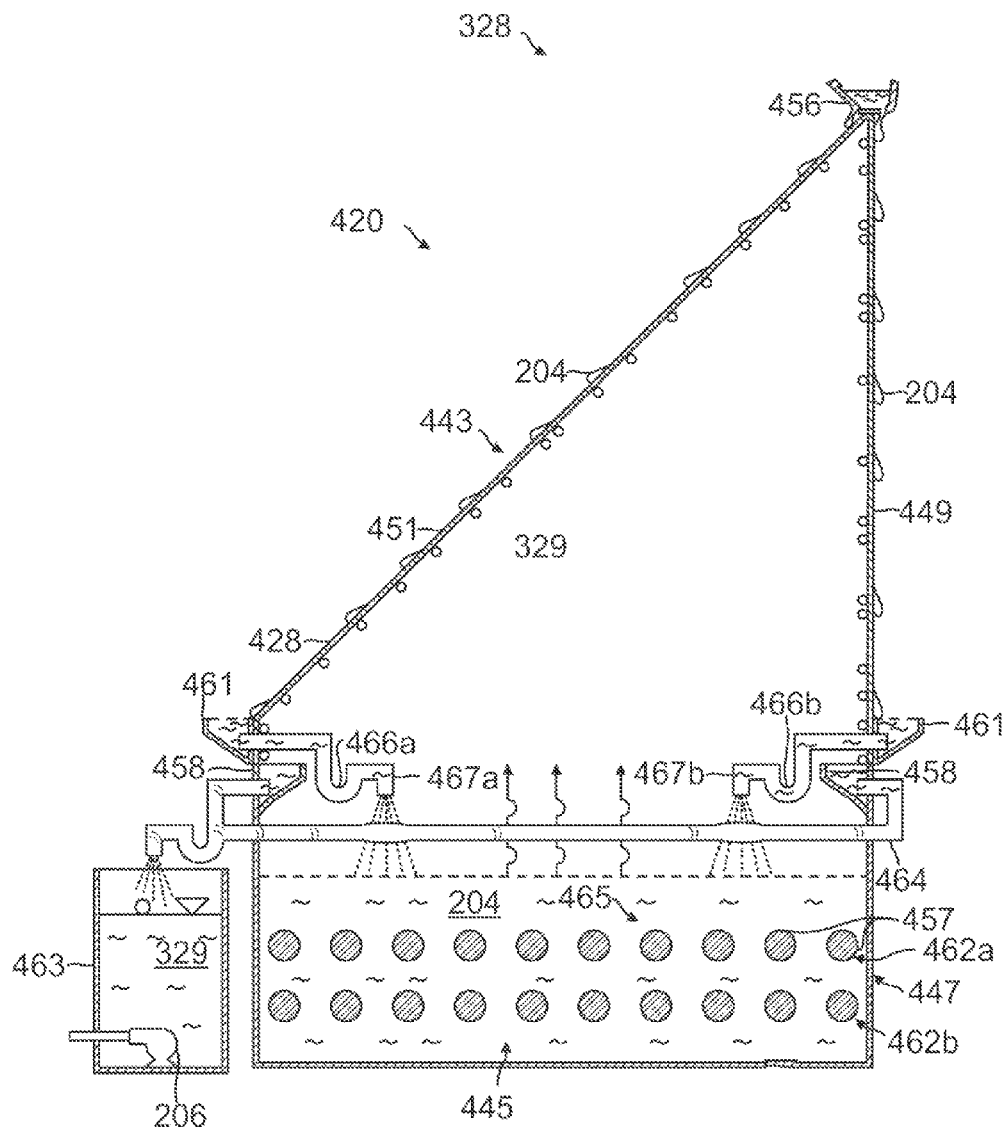
FIG. 10B is a schematic side view of the thermal distiller of FIG. 10A and a pumping system.
Figure 10C:
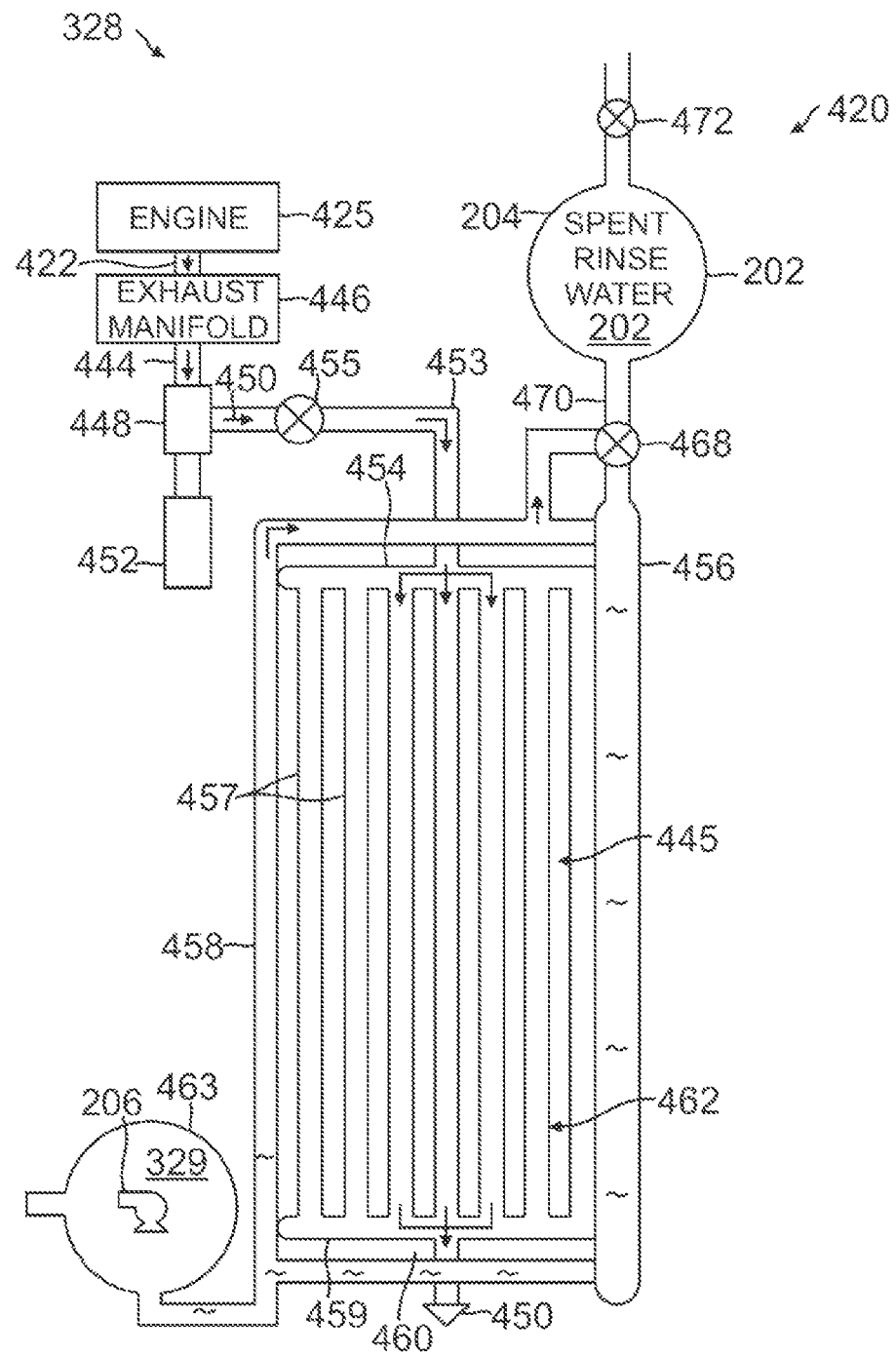
FIG. 10C is a schematic top view of the thermal distiller of FIGS. 10A and 10B showing piping connecting an exhaust of an engine to the heat exchanger of the thermal distiller.

The distillation apparatus 328 can use a heat source from an engine exhaust, heating elements, solar heat, or other sources to heat spent rinse water 204 or other waste liquid for distillation to form distilled water. In one version, as shown in FIGS. 10A to 10C, the distillation apparatus 328 comprises a thermal distiller 420 connected to the exhaust gas output 422 from an engine 425 to capture the heat from the exhaust gases of the engine 425 to evaporate and recover the spent rinse water 204. The engine 425 is, for example, an internal combustion engine which generates electrical or motive power to operate portions of the regenerant recovery system 205. In one version, the engine 425 is a diesel engine having an exhaust pipe 444 to deliver hot exhaust gas 450 from the engine 425 as shown in FIG. 10C. The engine 425 comprises an exhaust manifold 446 which collects exhaust gas 450 into an exhaust pipe 444 that leads to a catalytic converter 448 and an exhaust muffler 452 before venting to the atmosphere.

The thermal distiller 420 comprises a condenser housing 443 located directly above a heat exchanger 445 powered by a heat source, such as a hot exhaust gas 450 of an engine 425. The condenser housing 443 comprises a condenser hood 451, gutter well 456, condensed water tray 458, and cooling water tray 461, as shown in FIGS. 10A and 10B. The condenser hood 451 can for example, have a sloped wall 428 that connects to a sidewall 449. Part or all of the condenser housing 443 can be fabricated from a thermally conductive metal, such as stainless steel or copper.

The heat exchanger 445 comprises an inlet manifold 454 that feeds a plurality of longitudinal pipes 457 in a heat exchanger tray 447 with the pipes 457 terminating in an outlet manifold 459 which exhausts to the atmosphere. The heat exchanger tray 447 receives spent rinse water 204 (or other wastewaters, including spent regenerant solution 100). A gas transfer pipe 453 connected upstream of the muffler 452 in the exhaust pipe 444, redirects the exhaust gas 450 to the inlet manifold 454 of the heat exchanger 445. The gas transfer pipe 453 comprises an exhaust valve 455 to control the flow of exhaust gas 450 into the pipe 453. In one version, the heat exchanger 445 comprises a pipe array 465 of longitudinal pipes 457, each of which is spaced apart along a length of the inlet manifold 454 and exhaust manifold 446. In the version shown, the pipe array 465 of longitudinal pipes 457 can include one or more, (e.g., two) linear sub-arrays 465a, b of the longitudinal pipes 457 which are vertically spaced apart, and with each sub-array of pipes 465a, b offset from the other and stacked over each other to maximize heat distribution to the spent regenerant solution 100. The longitudinal pipes 457 can be, for example, copper pipes having a diameter of from about 1 cm to about 4 cm, or even 2.54 cm (1 inch). The outlet manifold 459 collects the exhaust gas 450 passing through the longitudinal pipes for discharge through a venting pipe 460 to the atmosphere.

In operation, spent rinse water 204 or other water comprising dissolved compounds is delivered from the spent rinse water sump 202 to the heat exchanger tray 447 and the gutter well 456 by a discharge manifold 470 comprising distiller valve 468. The gas transfer pipe 453 feeds the exhaust gas 450 into heat exchanger 445 causing the spent rinse water 204 on the heat exchanger tray 447 to evaporate, rise up, and then condense on the internal condensing surfaces of the sloped wall 428 and sidewall 449 of condenser hood 451, as shown in FIGS. 10A and 10B. The gutter well 456 cascades spent rinse water 204 over the external surface of the condenser hood 451 to cool off the condensing surface. The evaporated water that condenses on the condenser hood 451 comprises cleaned distilled water 329 and is collected in the condensed water tray 458, while spent rinse water 204 used to cool the condensing surfaces is collected in the cooling water tray 461. Distilled water 329 is then transferred from the condensed water tray 458 to the distilled water tank 463 through distilled water piping 464. Water in the cooling water tray 461 is returned through return water piping 467a, b to the heat exchanger tray 447 to be evaporated. The return water piping 467a, b comprises p-traps 466a, b to create a water-filled sealing mechanism in the U-shaped portion of the p-traps 466a, b in the piping that prevents steam from escaping the heat exchanger 445, which would result in wasted heat or water. The clean distilled water 329 collected in the distilled water tank 463 is pumped by a submersible pump 206 to the rinse water tank 198 to be used for subsequent rinsing processes. Using this system, from 800 gallons (used to rinse one batch of 120 ft$^3$/day of regenerated resin 194) to 1600 gallons (used for two batches of 120 ft$^3$ of regenerated resin 194) of spent rinse water 204 can be recycled and recovered instead of sending this spent rinse water to the sewer.

To operate the thermal distiller 420, the engine 425 has to be in operation, and the exhaust valve 455 on the exhaust manifold 446 is configured (or the exhaust piping redirected) to pass the exhaust gases 450 from the engine 425 to the thermal distiller 420. Typically, the exhaust gases 450 are at a temperature of from about 300 to about 800° F. In this step, it is desirable to ensure that the exhaust flow never "dead heads" or has a flow path that causes engine damage. The heat from the exhaust gas 450 is transferred to the longitudinal pipes 457 of the heat exchanger 445 and exits from the thermal distiller 420 to the atmosphere. The headloss through the pipes 457 silences the exhaust noise but does not exceed backpressure requirement on the engine 425.

When the longitudinal pipes 457 of the thermal distiller 420 are hot enough to evaporate water, the distiller valve 468 on the discharge manifold 470 are configured to allow water to flow to the thermal distiller 420. Also, before spent rinse water 204 in the spent rinse water sump 202 is sent to the thermal distiller 420, a water rinse flow meter 472 connected to the input of the spent rinse water sump 202 (or a floating water level gauge) should desirably have a reading indicating that from about 50 to about 100 gallons of spent rinse water 204 has passed to the spent rinse water sump 202 to have sufficient water in the sump for distillation.

When the water in the sump 202 is at a sufficiently high level, the head of water allows the spent rinse water 204 to flow by gravity to the thermal distiller 420, and this can be done by opening the distiller valve 468 to allow the gravity flow to the distiller 420. If not, the valves 468 on the discharge manifold 470 is configured, and a submersible or solution transfer pump is activated to deliver either spent regenerant solution 100 or spent rinse water 204 to the thermal distiller 420 for cooling the distiller 420 or for supplying the distiller with water for distillation.

After the water commences flow to the thermal distiller 420, the distiller valve 468 are adjusted on discharge manifold 470 to allow proper ratio of cooling water flow that drives condensation onto the external surfaces of the condenser hood 451 to flow cool water. At this stage it is desirable to check if the cooling water portion of the flow is evaporating too quickly on the condenser hood 451. If so, the flow rate of cooling water to the hood surface is increased by diverting more spent rinse water 204 to the gutter well 456 as opposed to filling the heat exchanger tray 447. Conversely, if too much cooling water is draining back into heat exchanger tray 447, then the flow of cooling water flow onto the hood 451 is decreased by diverting more spent rinse water 204 to filling the heat exchanger tray 447 and less to the gutter well 456.

When the distilled water 329 accumulates in the distilled water tank 463 to the high water level, a submersible pump 206 energizes to transfer the distilled water 329 to a distilled water tank 463. When all the spent rinse water 204 in the thermal distiller 420 has been treated or when the distilled water tank 463 is completely filled and reaches its high water level, the distillation process can be stopped. When solid salt residues need to be removed from the thermal distiller 420, the condenser hood 451 of the thermal distiller 420 is opened for scraping off the accumulated salts from tank 463 at the bottom of thermal distiller 420. The condenser hood 451 is then closed and the thermal distiller 420 ready to treat the next batch of spent rinse water 204.

In another version, the distillation apparatus 328 comprises a heating element (not shown), such as an immersion heater or a pipe heater located in the tank to heat the water in the tank. The hearing element can be powered by electricity and can be a resistive heater, such as a coil of nichrome or other resistor material. In still another example, the distillation apparatus 328 comprises a renewable heat source, such as, for example, solar power heated oil which is heated in tubes positioned at the focal point center of longitudinal convex, for example, parabola, shaped reflective surfaces (such as mirrors) or polished steel.

Advantageously, when the spent rinse water 204 contains salts washed away from the resins, less heat is required to evaporate the water, and consequently, precipitate the dissolved salts in the spent rinse water 204. For example, rinse water containing a sodium chloride concentration of from about 10 wt % to about 13 wt % has lower BTU requirements to evaporate because the dissolved salt reduces the specific heat of the solution, which also decreases the KW-hr per temperature increase ratio. Also, another advantage is that heating the spent rinse water 204 decreases the calcium solubility constant, thereby precipitating calcium carbonate at the bottom of the tank vessel similar to the scaling that occurs on a hot water heater heating element. This effect can also reduce the amount of calcium hydroxide and sodium hydroxide needed to precipitate the same calcium carbonate. In this manner, the thermal distiller 420 provides an efficient method of distilling water using waste heat from an engine 425 or other heat source.

EXAMPLES

The following examples are provided to illustrate exemplary embodiments of the present apparatus and process. However, these examples should not be used to limit the scope, applicability or configuration of the invention. Instead, the examples are intended to provide illustrations for implementing various embodiments of the invention. As will become apparent, changes may be made in the function or arrangement of any of the compounds, methods, steps, or apparatus described in the disclosed exemplary embodiments without departing from the spirit and scope of the invention.

Example 1

Composition of Spent Regenerant Solution

To determine the composition of an exemplary regenerant solution 186 as it is passed through spent resin 60, samples of regenerant solution 186 were taken out of a regeneration vat 140 at specific time intervals during treatment of spent resin 60 with regenerant solution 186 comprising brine. In this example, a small test vat (not shown) was filled with spent resin 60 and then regenerant solution 186 added to the spent resin 60. The regenerant solution 186 was re-circulated through the test vat for 50 minutes, followed by a 30 minute rinse of the treated resin 60 with water to remove regenerant solution residue, and then a secondary and final rinse of the treated resin was done with softened water.

The water quality of the composite sample from Table II was also compared to the water quality evaluated during the bench testing. The comparison shows that there is a slight difference in water quality with respect to the major concentrations of ions between the different resin regeneration cycle samples.

TABLE IV

| | | Sampling Time | | | | | | | | | | |
|---|---|---|---|---|---|---|---|---|---|---|---|---|
| | (min) | 10 | 20 | 30 | 40 | 50 | 60 | 70 | 80 | 90 | 100 | Comp. |
| pH | unitless | 7.31 | 6.29 | 6.4 | 6.58 | 6.7 | 6.76 | 7.1 | 7.68 | 8.04 | 8.44 | 6.96 |
| Na | g/L | 1.46 | 37.33 | 52.73 | 55.89 | 48.66 | 29.14 | 29.97 | 6.05 | 2.78 | 0.89 | 29.12 |
| Ca | mg/L | 25.54 | 8607.03 | 9466.89 | 5085.09 | 3426.91 | 2546.43 | 1284.72 | 83.72 | 22.34 | 17.57 | 2949.21 |
| Mg | mg/L | 10.63 | 2192.08 | 2586.05 | 773.86 | 589.97 | 371.71 | 166.18 | 12.94 | 4.26 | 1.27 | 971.06 |
| Fe3 | mg/L | <0.01 | 0.03 | 0.04 | 0.04 | 0.02 | <0.01 | <0.01 | <0.01 | <0.01 | <0.01 | 0.02 |
| Ba | mg/L | 10.17 | 164.54 | 167.53 | 83.77 | 53.85 | 41.88 | 17.95 | <5 | <5 | <5 | 107.7 |
| Sr | mg/L | <6 | <74 | <90 | <51 | <33 | <23 | <13 | <6 | <6 | <6 | <34 |
| K | mg/L | <19 | <100 | <177 | <176 | <93 | <70 | <40 | <7 | <3 | <1 | <42 |
| Cl | g/L | 1.58 | 60.45 | 91.16 | 87.30 | 75.41 | 69.84 | 45.63 | 8.60 | 2.74 | 1.02 | 52.18 |
| F | mg/L | 0.71 | 2.16 | 2.51 | 4.29 | 3.53 | 2.51 | 2.96 | 1.62 | 1.53 | 0.47 | 3.23 |
| SO4 | mg/L | 598.04 | 664.49 | 697.87 | 819.5 | 675.77 | 479.66 | 566.18 | 582.3 | 551.26 | 541.84 | 617.69 |
| NO3 | mg/L | <5 | <50 | <60 | <59 | <53 | <43 | <30 | <6 | <2 | <1 | <30 |
| SiO2 | mg/L | 10.07 | 4.71 | 4.89 | 5.53 | 5.32 | 5.53 | 7.58 | 9.74 | 10.28 | 10.61 | 8.02 |
| Hard. | mg/L as CaCO3 | 107.41 | 30501.50 | 34265.81 | 15884.28 | 10985.19 | 7889.45 | 3892.87 | 262.35 | 73.30 | 49.14 | 11352.77 |
| Alk. | mg/L as CaCO3 | 160 | 80 | 90 | 110 | 90 | 120 | 140 | 170 | 170 | 140 | 100 |
| OH | mg/L as CaCO3 | 0.01 | 0.001 | 0.001 | 0.002 | 0.003 | 0.003 | 0.006 | 0.024 | 0.055 | 0.138 | 0.005 |
| HCO3 | mg/L (Calc.) | 194.82 | 97.58 | 109.77 | 134.15 | 109.75 | 146.32 | 170.59 | 206.45 | 205.23 | 166.35 | 121.89 |
| CO3 | mg/L (Calc.) | 0.18 | 0.01 | 0.01 | 0.02 | 0.03 | 0.04 | 0.1 | 0.45 | 1.04 | 2.11 | 0.05 |
| Cond. | mS/cm | 6.61 | 156.2 | 184.6 | 182.1 | 169.7 | 162.4 | 111.2 | 26.8 | 9.4 | 3.9 | 111 |
| Turb. | NTU | 0.671 | 1.541 | 1.686 | 0.901 | 0.418 | 1.133 | 0.997 | 1.089 | 0.463 | 0.801 | 0.536 |
| Temp | C. | 19.68 | 19.23 | 19.31 | 19.31 | 19.12 | 19.36 | 19.21 | 19.17 | 19.29 | 19.42 | 19.12 |
| TOC | mg/L | 2.55 | 3.57 | 4.46 | 4.97 | 5.06 | 4.63 | 7.53 | 4.11 | 4.79 | 4.09 | 4.15 |
| DO | mg/L | 9.64 | 5.6 | 5.22 | 5.33 | 5.46 | 5.46 | 5.72 | 8.65 | 9.2 | 9.34 | 5.78 |

Samples of the spent regenerant solution 100 and spent rinse water 204 were taken from the test vat during recirculation of the regenerant solution 186 at 10 minute intervals in the resin regeneration process. These samples were chemically analyzed to determine the composition of the regenerant solution 186 over time as it regenerates the spent resin 60, as shown in Table IV. The regenerant solution samples mostly contained sodium chloride dissolved in water, but also contained many other dissolved ions extracted from the spent resins 60 such as $Ca^{+2}$, $Mg^{+2}$, $Fe^{+2}$, $Ba^{+2}$, $Sr^{+2}$ and other ions in trace amounts. Also, samples of softened rinse water passed through the regenerated resin 194 (after removal of the regenerant solution 186) became clean rinse water, indicating all the salt and other regeneration compounds had been rinsed out of the regenerated resin 194, after between 60 and 70 minutes. After this time most of the divalent ions were removed from the spent resin 60. Thus, after initially rinsing for 60 minutes, the remaining spent rinse water 204 can be reused without extensive recovery processing.

To evaluate a consistent composition of the spent regenerant solution 100 to determine the regenerant composition that would serve to regenerate the spent regenerant solution 100, a composite sample (Comp) was prepared by mixing together seven samples, each of which was taken at a specific time separated by ten minute intervals and in the first 70 minutes of a spent resin regeneration process. It should be noted that the composite sample was not taken over the entire 100 minute cycle so as not to dilute the composite sample with relatively 'clean' rinse water.

TABLE V

| | | Composite Spent regenerant solution 100 Samples | |
|---|---|---|---|
| | | Batch I | Batch II |
| pH | | 6.96 | 6.8 |
| Sodium | g/L | 29.12 | 50.02 |
| Calcium | mg/L | 2949.21 | 4906.68 |
| Magnesium | mg/L | 971.06 | 1623.49 |
| Iron (III) | mg/L | 0.02 | 0.0314 |
| Barium | mg/L | 107.7 | 6.11 |
| Strontium | mg/L | <34 | 53.4 |
| Potassium | mg/L | <42 | 99.0099 |
| Chloride | g/L | 52.18 | 50.02 |
| Flouride | mg/L | 3.23 | BDL |
| Sulfate | mg/L | 617.69 | 552.06 |
| Nitrate | mg/L | <30 | BDL |
| Silica | mg/L | 8.02 | 13.8237 |
| Hardness | mg/L as CaCO3 | 11352.77 | 18920.33 |
| Alkalinity | mg/L as CaCO3 | 100 | 70 |
| Hydroxide | mg/L as CaCO3 | 0.005 | 0.0032 |
| Bicarbonate | mg/L (Calc.) | 121.89 | 85.35 |
| Carbonate | mg/L (Calc.) | 0.05 | 0.02 |
| Conductivity | mS/cm | 111.1 | 111.5 |
| Temperature | C. | 19.12 | 23.9 |

Table V shows the water quality of samples taken to compare the composite samples of spent regenerant solution 100. It is seen that the barium concentration is dramatically different in the two composite cycles that were sampled from spent regenerant solution 100 that was extracted from regeneration processes conducted on ion exchange resins 22 at different times of the year, namely, April and July. While this discrepancy is not immediately explainable, the treatment and recovery process for the spent regenerant solution 100 would have to account for treatment of a range of solutions that includes these two composite sample compositions. Further, the solids content as represented by the silica levels are similar, which suggests the similarity in composition of potable water sources for the different areas. The alkalinity of both samples is very low relative to the total hardness, indicating that nearly all the hardness results from non-carbonate compounds. Further, the spent regenerant solution 100, as shown in Tables IV and V above, has a significant amount of calcium, barium and magnesium, which results in a high mineral hardness value in water.

Example 2

Regenerant Treatment Composition

Once the composition of some samples of different spent regenerant solutions 100 was evaluated, different compositions of the regenerant treatment compositions 111 were tested to treat and regenerate the spent regenerant solution 100 and to treat regenerant waste liquid 376 comprising spent regenerant solution 100 as well as other liquids, such as the first 50 gallons to 100 gallons of spent rinse water 204. In these experiments, a bench test was performed by filling a jar with the composite sample of the spent regenerant solution 100 as outlined above and treating the composite liquid sample with regenerant treatment composition 111 to regenerate the solution. In this test, a regenerant treatment composition 111 comprising a first regenerant composition 111a composed of calcium hydroxide (also known as lime or slaked lime) and a second regenerant composition 111b composed of sodium carbonate (also known as soda or soda ash) was added to each test jar. Calcium hydroxide was selected primarily to precipitate magnesium ions from the spent regenerant solution 100 in the form of magnesium hydroxide, and sodium carbonate was selected primarily to precipitate calcium ions from the spent regenerant solution 100 in the form of calcium carbonate.

The bench test was conducted to determine the dose rates for regenerant treatment compositions 111 comprising calcium hydroxide and sodium carbonate and also to measure the composition of the treated regenerant liquid 342 achievable through this process. Specifically, the composition of the treated regenerant liquid 342 was used to determine the percent removal of strontium, barium, calcium, magnesium and hardness, for increasing molar concentrations of calcium hydroxide and sodium carbonate, and the dose of hydrated calcium hydroxide and sodium carbonate needed to remove most of the undesirable calcium and magnesium ions in the treated regenerant liquid 342, allowing for reuse of the treated regenerant liquid to regenerate spent ion exchange resin 22, was also determined.

Table VI shows the results of adding a regenerant treatment composition 111a, b comprising adding first calcium hydroxide ($Ca(OH)_2$), and then sodium carbonate ($Na_2CO_3$) to the spent regenerant solution 100, sequentially. The first block of the table refers to tests in which no sodium carbonate was added and varying amounts of calcium hydroxide were added in the form of slaked lime. The calcium hydroxide was added to increase the pH to a level that would allow precipitation of all the magnesium ions in the form of magnesium hydroxide. Based on the magnesium removal rates, an optimum calcium hydroxide dose of 67 mM of calcium per liter of spent regenerant solution 100 was selected. The first half of the Table IV shows the results of bench tests in which 67 mM calcium hydroxide was added and varying amounts of sodium carbonate ranging from 67 mM to 217 mM were added to establish the dosage needed for complete removal of calcium from the solution 100. Based on these results, good calcium removal can be achieved with a sodium carbonate dosage of from about 2 to 3.25 times the addition of calcium hydroxide in moles. Thus, a calcium hydroxide addition molar of 3×(200 mM) was chosen for subsequent experiments.

TABLE VI

| | Sample | | | | | | | | | |
|---|---|---|---|---|---|---|---|---|---|---|
| | Chemical Addition | | | | | | | Final Concentration | | |
| | pH Lime Added | Ca Added | | Total Ca | | Na2CO3 Added | | Hardness mg/L as | Ca | Mg |
| | mg/L | mg/L | mM | mg/L | mM | mg/L | mM | CaCO3 | mg/L | mg/L |
| Lime Test | | | | | | | | | | |
| Brine Composite | 6.8 | 0 | 0.00 | 0.00 | 4720.00 | 117.77 | 0.00 | 0.00 | 17702 | 4720 | 1440 |
| Lime to Achieve pH | 9 | 158 | 85.19 | 2.13 | 4805.19 | 119.90 | 0.00 | 0.00 | 17711 | 4960 | 1296 |
| Lime to Achieve pH | 9.5 | 203 | 109.54 | 2.73 | 4829.54 | 120.50 | 0.00 | 0.00 | 17518 | 5040 | 1200 |
| Lime to Achieve pH | 10 | 270 | 146.05 | 3.64 | 4866.05 | 121.41 | 0.00 | 0.00 | 17121 | 4960 | 1152 |
| Lime to Achieve pH | 10.5 | 4275 | 2312.41 | 57.70 | 7032.41 | 175.47 | 0.00 | 0.00 | 16780 | 6240 | 288 |
| Lime to Achieve pH (Optimized) | 11 | 4950 | 2677.53 | 66.81 | 7397.53 | 184.58 | 0.00 | 0.00 | 16800 | 6720 | 0 |
| Lime to Achieve pH | 11.5 | 5400 | 2920.94 | 72.88 | 7640.94 | 190.65 | 0.00 | 0.00 | 17600 | 7040 | 0 |
| Soda Test | | | | | | | | | | |
| Soda = 1 × Optimized Lime | 11 | 4950 | 2677.53 | 66.81 | 7397.53 | 184.58 | 66.81 | 7080.97 | 9393 | 3600 | 96 |
| Soda = 1.5 × Optimized Lime | 11 | 4950 | 2677.53 | 66.81 | 7397.53 | 184.58 | 100.21 | 10621.46 | 4990 | 1760 | 144 |
| Soda = 2 × Optimized Lime | 11 | 4950 | 2677.53 | 66.81 | 7397.53 | 184.58 | 133.62 | 14161.95 | 997 | 320 | 48 |
| Soda = 3.25 × Optimized Lime | 11 | 4950 | 2677.53 | 66.81 | 7397.53 | 184.58 | 217.13 | 23013.16 | 8 | 0 | 2 |

Based on these results, it was determined that treating the spent regenerant solution 100 with the regenerant treatment composition 111 reduced the concentration of most of the divalent ions to less than 80% of the original concentrations, or even less than 90%, or even less than 98%. However, silica was left in the treated regenerant liquid 342 at a concentration of less than about 2 mg/L and sulfate salts were left at a concentration of less than about 270 mg/L, and some zinc was also in the solution, the presence of zinc being unusual and which may have resulted from contamination.

While it was observed that the magnesium ions were removed from the spent regenerant solution 100 by the addition of calcium hydroxide until the spent regenerant solution 100 achieved a pH level of about 11. However, the magnesium levels in the composite sample of the spent regenerant solution 100 for the addition of sodium carbonate show higher magnesium levels at a pH level of about 11. It was noted that magnesium removal was not as high because the pH was not raised as much as predicted (namely to 11) by the calcium hydroxide addition. Thus, a higher dosage of calcium hydroxide of up to about 70 mM would be expected to decrease magnesium content to below detectable levels, as well as decrease the overall hardness of the treated regenerant liquid 342 to approximately 40 mg/L $CaCO_3$.

Thus, an exemplary regenerant treatment composition 111 comprises calcium hydroxide added in a molar ratio of calcium hydroxide to spent regenerant solution 100 of at least about 25 mM of calcium per liter of spent regenerant solution, or even from about 30 to about 120 mM of calcium per liter. Another exemplary regenerant treatment composition 111 comprises sodium carbonate added in a molar ratio of sodium carbonate to spent regenerant solution 100 of at least about 50 mM of sodium per liter of spent regenerant solution, or even from about 60 to about 360 mM of sodium per liter. Other concentrations can also be used and should be sufficiently high to remove at least about 80% of the calcium ions from the spent regenerant solution 100. One exemplary regenerant treatment composition 111 comprises calcium hydroxide in a concentration of 70 mM and sodium carbonate in a concentration of 210 mM. This composition was calculated to reduce magnesium content to below detectable levels and also improve the hardness of the solution. Typically, a further reduction in magnesium ions in the spent regenerant solution 100 correlates with greater removal of silica, so a decrease of silica content to about 2.0 mg/L might also be expected.

Example 3

Solids Dewatering

Solids dewatering tests were performed using a bench-scale filter press 520, comprising a plate 524 and frame 526 mechanism, to extract water and characterize the amount of solids that could be expected in the extracted precipitates, which are in the form of filter cakes 534, to determine the composition of the material and if it could be sent to a landfill. The test results, as shown in Table VII, reveal that precipitates 114 contain large amounts of calcium hydroxide and that these materials are typically easy to concentrate to high levels. The filter cake 534 was generated by operating the filter press 520 at a pressure of 80 psi.

TABLE VII

| SAMPLE DESCRIPTION | RESULTS |
| --- | --- |
| Solids Content of Sample | 13.75 percent |
| Water Content of Sample | 86.25 percent |
| Solids Content of Filter Cake | 49 percent |
| Water Content of Filter Cake | 51 percent |

A toxicity test was then performed to determine relative toxicity of the solids to confirm if they can be disposed of to a landfill, as shown in Table VIII. It is clear from the test that the precipitate 114 from the filter cakes 534 has a high solids content and can be classified as nonhazardous waste material suitable for ordinary landfills. Therefore, it is anticipated that the solids could be disposed of in any normal landfill.

TABLE VIII

| | | | | Leaching Test | | | |
| --- | --- | --- | --- | --- | --- | --- | --- |
| EPA HW No.[1] | Contaminant | CAS No.[2] | Regulatory Level (mg/L) | TCLP (mg/L) | WET (mg/L) | Landfill Leachate (mg/L) | Aqueous Solubility (mg/L) |
| D004 | Arsenic | 7440-38-2 | 5 | 0.004410 | 0.013800 | 0.012900 | 0.006600 |
| D005 | Barium | 7440-39-3 | 100 | 0.030100 | 0.025400 | 0.003180 | 0.009570 |
| D006 | Cadmium | 7440-43-9 | 1 | 0.000010 | 0.000150 | 0.000350 | 0.000010 |
| D008 | Lead | 7439-92-1 | 5 | 0.000030 | 0.001210 | 0.000500 | 0.000230 |
| | Silica (SiO2) | | NAL | 1.744903 | 51.64409 | 15.19768 | 0.428993 |
| | Manganese | | NAL | 0.000070 | 2.106932 | 0.000270 | 0.000390 |
| | Nickel[3] | | 1,000 | 0.000575 | 0.017300 | 0.053900 | 0.000452 |
| | Copper[4] | | 100 | 0.025700 | 0.110364 | 0.044600 | 0.023100 |
| | Zinc | | NAL | 0.002640 | 0.091842 | 0.014400 | 0.002060 |
| | Strontium | | NAL | 0.473081 | 0.293663 | 0.089100 | 0.083800 |

[1]Hazardous waste number.
[2]Chemical abstracts service number.
[3]10X MCL under considered as surrogate regulatory limit
[4]100X Secondary drinking water standard as surrogate regulatory limit NAL: no action limit

Example 4

Nanofiltration Membrane

Figure 11A:
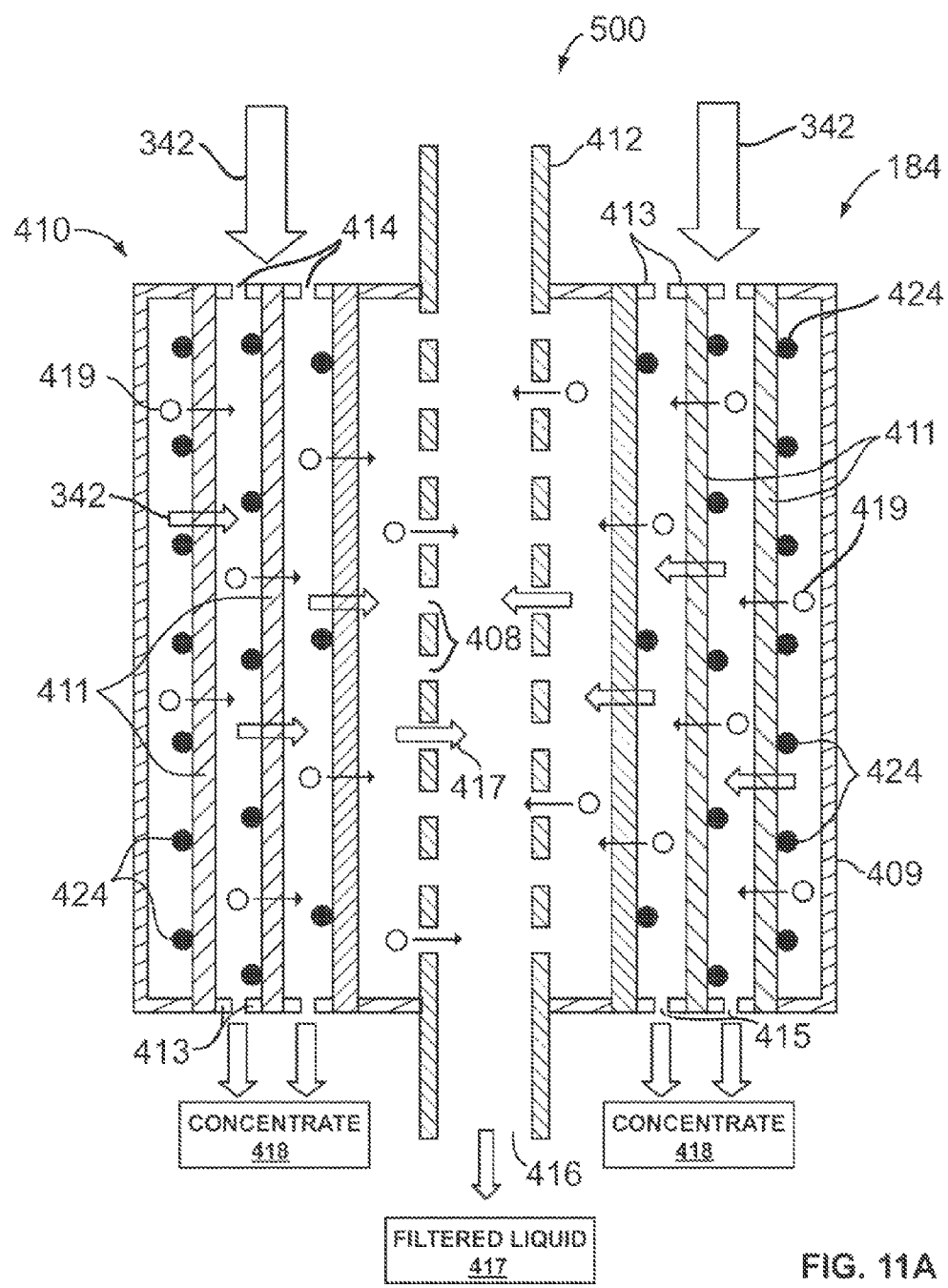
FIG. 11A is a schematic cross-sectional diagram showing treated regenerant liquid being passed through a particle filter comprising a nanofilter membrane.
Figure 11B:
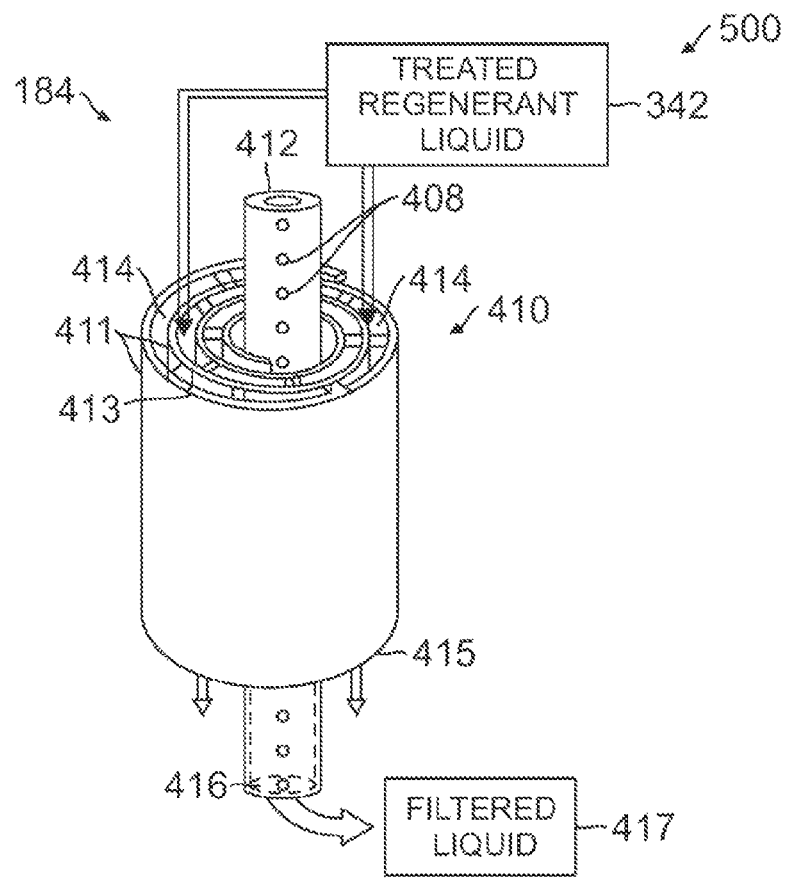
FIG. 11B is a schematic perspective diagram of the nanofilter membrane of FIG. 11A.

Optionally, the treated regenerant liquid 342 can be passed through a solids separator 500 comprising a particle filter 184 which is a nanofilter 410, an exemplary embodiment of which is shown in FIGS. 11A and 11B. The nanofilter 410 comprises a housing 409 holding a semipermeable membrane through which fluid, such as the treated regenerant liquid 342 and monovalent ions 419 ion solution in the fluid, will pass but which blocks the passage of multivalent ions 424 and other impurities. Typically, the nanofilter 410 comprises a semipermeable membrane that is spirally wrapped several times to form layers about a perforated central tube 412 having holes 408, with the semipermeable membranes separated by a plurality of feed solution spacers 413. Typically, the nanofilter 410 further comprises a feed solution input 414 which is at the top of and between the membranes, a concentrate output 415 which is at the bottom of and between the membranes, and a filtered liquid output 416 which is the bottom outlet of the tube 412.

The semipermeable membrane is permeable to fluid and monovalent ions 419 but restricts the passage of multivalent ions 424 and low molecular weight organics and salts. The feed solution spacers 413 create a space between the layers of semipermeable membrane that allows for the flow of fluid through the nanofilter 410 and across the surface of the semipermeable membrane. Typically, the feed solution spacers 413 separate the semipermeable membrane by from about 0.025 in to about 0.100 in, creating space for fluid to flow along the length of the nanofilter 410 and across the surface of the semipermeable membrane.

Solution such as the treated regenerant liquid 342 is admitted to the nanofilter 410 through the feed solution input 414, which communicates solution to the space between the layers of semipermeable membrane. When pressure is applied to the solution, fluid and monovalent ions 419 pass through the semipermeable membrane to form the filtered liquid 417, leaving the multivalent ions 424 and other impurities, such as solids, behind to form concentrate 418. Filtered liquid 417 passes through perforations in the central tube 412 and exits the nanofilter 410 through filtered liquid output 416, while concentrate 418 is retained outside of the central tube 412 and exits the nanofilter 410 through a concentrate output 415. The filtered liquid 417 can then be passed to the regenerant solution tank 188 (in FIG. 3B) as the filtered liquid solution should have a similar composition to the chemically treated filtrate after pH adjustment.

In one version, the nanofilter 410 can also be used further reduce the concentration of undesirable ions in the treated regenerant liquid 342 to generate clean water for backwashing, rinsing, or flushing. In another version, the nanofilter 410 is used to remove divalent ions (such as $Ca^{+2}$, $Mg^{+2}$) from the regenerant solution 186 to generate a clean output solution—comprising sodium, potassium, or other monovalent ions 419—that can be reused. The latter version allows the monovalent ions 419, such as sodium and chloride ions, to remain in solution. However, the nanofilter 410 may not operate efficiently wherein the treated regenerant liquid 342 has high salinity levels. Thus, this stage is optional.

In one version, modeling studies suggested that barium and strontium ion levels in the spent regenerant solution 100 were too high to achieve reasonable recovery of a regenerant solution comprising sodium and chloride ions. Further, the output of the computer models was not entirely trusted due to the limited ability of the modeling programs to model regenerant solutions having a high ionic strength. Additionally, it was apparent that the output water would still have a significant amount of divalent ions which would limit the viability of long-term reuse of the recovered solution.

In the following example, a nanofilter 410 was used to determine the rejection characteristics and operation conditions for nanofiltration of a treated regenerant liquid 342. The objectives of this test were to establish the rejection of the nanofiltration membrane 411 for divalent ions and to determine operating pressure and specific flux characteristics of nanofiltration membranes for regenerant solution 186.

A bench jar sample produced by adding regenerant treatment composition 111, comprising calcium hydroxide and sodium carbonate, to a jar containing a composite spent regenerant solution 100, was used to test the ability of a nanofiltration membrane 411 to remove remaining ions and/or solids. Specifically, the treated regenerant liquid 342 contained 67 mM calcium hydroxide and 200 mM sodium carbonate. The nanofilter 410 operates by rejecting specific ions and allowing others to pass through the membrane 411. This test was conducted on five different samples of nanofiltration membranes 411. The water quality of a composite sample of spent regenerant solution 100, the composite regenerant solution sample treated with a regenerant treatment composition 111, and the filtered liquid output 416 from five (5) different nanofiltration membranes 411 from Dow Chemical, Hydranautics, and Koch Companies, are shown in Table IX.

TABLE IX

| Constituent | units | Regenerant Solution Composite | Regenerant Soln. Treated with Lime-Soda | Dow NF-270-4040 | Dow NF-90-4040 | Hydranautics ESNA1-LF* | Koch TFC SR-2 | Koch TFC-S |
|---|---|---|---|---|---|---|---|---|
| pH | | 6.8 | 10.84 | 10.45 | 10.55 | 10.29 | 10.12 | 10.61 |
| Sodium | g/L | 50.02 | 39.32 | 36.78 | 37.11 | 33.83 | 38.58 | 35.6 |
| Calcium | mg/L | 4906.68 | BDL | BDL | BDL | BDL | BDL | BDL |
| Magnesium | mg/L | 1623.49 | 14.88 | 8.16 | 12.48 | 14.88 | 12.48 | 8.64 |
| Iron (III) | mg/L | 0.0314 | BDL | BDL | BDL | BDL | BDL | BDL |
| Barium | mg/L | 6.11 | 0.0471 | 0.193 | 0.142 | 0.176 | 0.242 | 0.131 |
| Strontium | mg/L | 53.4 | 0.11 | 0.0812 | 0.068 | 0.0656 | 0.0797 | 0.0702 |
| Potassium | mg/L | 99.0099 | BDL | BDL | BDL | BDL | BDL | BDL |
| Chloride | g/L | 50.02 | 39.32 | 36.78 | 37.11 | 33.83 | 38.58 | 35.6 |
| Flouride | mg/L | BDL | BDL | BDL | BDL | BDL | BDL | BDL |
| Sulfate | mg/L | 552.06 | 268.1 | 67.56 | 161.69 | 67.56 | 131.09 | 106.27 |
| Nitrate | mg/L | BDL | BDL | BDL | BDL | BDL | BDL | BDL |
| Silica | mg/L | 13.8237 | 2.9531 | 0.9116 | 0.5478 | 0.3595 | 0.5842 | 0.1192 |
| Hardness | mg/L as CaCO3 | 18920.3 | 60.98 | 33.44 | 51.15 | 60.98 | 51.15 | 35.41 |
| Alkalinity | mg/L as CaCO3 | 70 | 2090 | 970 | 1270 | 770 | 810 | 970 |
| Hydroxide | mg/L as CaCO3 | 0.0032 | 34.2744 | 13.9306 | 17.5376 | 9.8394 | 6.637 | 20.1823 |
| Bicarbonate | mg/L (Calc.) | 85.35 | 338.34 | 323.43 | 356.91 | 326.44 | 437.21 | 242.63 |
| Carbonate | mg/L (Calc.) | 0.02 | 1067.04 | 414.58 | 575.95 | 295.55 | 267 | 450.57 |
| Conductivity | mS/cm | 111.5 | 97.2 | 92 | 90.6 | 86.1 | 94.6 | 91.7 |
| Temperature | C. | 23.9 | 25 | 25 | 25 | 25 | 25 | 25 |

Some observations of the feed and filtered liquid water quality are as follows. The barium content appears inaccurate for treated brine as it should be about 0.4 mg/l, and the values for the ESNA1 filtered liquid 417 are low throughout, including with sodium and chloride. It was realized that an in-line cartridge filter in the nanofilter 410 had not been drained prior to the test and after clean water rinsing, causing residual water from the cartridge to dilute the influent regenerant solution 186 as it was cycled through the nanofilter 410. Thus, the values reported in TABLE VII are measured with the caveat that a 15 to 20% volumetric dilution of the influent regenerant solution depressed the filtered liquid measurements.

In addition to water quality, the operating performance of a nanofilter 410 was compared through two different tests. The first test was run to verify performance of the nanofilter 410 with a spent regenerant solution 100 similar to conventional tests to compare operating data with manufacturer data. Table X shows the hydraulic and salt rejection results of the nanofiltration membranes 411 based on trials run with influent feed of 2 g/L $MgSO_4$ and with chemically softened brine. The filtered liquid flux is in $L/m^2$ of membrane per hour (LMH). At the same pressure, the Koch 4092S, Filmtec NF-90-4040 and the Hydranautics ESNA1-LF-4040 were higher rejecting membranes, consistent with their specifications.

TABLE X

| Parameter | units | Koch 40 92S | Koch 4720SR2 | Filmtec 270-4040 | Filmtec 90-4040 | ESNA1-LF-4040 |
|---|---|---|---|---|---|---|
| Feed Flow | mL/min | 830 | 830 | 830 | 830 | 830 |
| Filtered liquid Flow | mL/min | 9.02 | 19.03 | 13.64 | 8.88 | 7.07 |
| Feed Pressure | psi | 73 | 73 | 73 | 73 | 73 |
| Concentrate Pressure | psi | 67 | 67 | 67 | 67 | 67 |
| Membrane Area | cm2 | 137.75 | 137.75 | 137.75 | 137.75 | 137.75 |
| Filtered liquid Flux | LMH | 39.28 | 88.88 | 59.39 | 38.68 | 30.80 |
| Feed Conductivity | mS/cm | 2.29 | 2.3 | 2.3 | 2.29 | 2.31 |
| Filtered liquid Conductivity | mS/cm | 365 | 478 | 456 | 256 | 165.3 |
| Rejection | % | 84.06% | 79.22% | 80.17% | 88.82% | 92.84% |
| Net Driving Pressure | psi | 70 | 70 | 70 | 70 | 70 |

A second test was run by passing softened spent regenerant solution 100 through the nanofiltration membrane 411, as shown in Table XI.

TABLE XI

| | | One Reactor | | Two Reactors in Parallel | | |
|---|---|---|---|---|---|---|
| Parameter | units | Dow NF270-4040 | Koch TFC-SR2 | Hydranautics ESNA1-LF | Dow NF90-4040 | Koch TFC-S |
| Feed Flow | mL/min | 830 | 830 | 830 | 830 | 830 |
| Filtered liquid Flow | mL/min | 8.3 | 8.3 | 1.8 | 0.84 | 2.47 |
| Unit 1 Feed Pressure | psi | 82 | 71.5 | 96 | 98 | 100 |
| Unit 1 Concentrate Pressure | psi | 76 | 65.5 | 85 | 87 | 94 |
| Unit 2 Feed Pressure | psi | | | 85 | 87 | 94 |
| Unit 2 Concentrate Pressure | psi | | | 79 | 80 | 83 |
| Membrane Area | cm2 | 137.75 | 137.75 | 137.75 | 137.75 | 137.75 |
| Filtered liquid Flux | LMH | 36.15 | 36.15 | 3.92 | 1.83 | 5.38 |
| Feed Conductivity | mS/cm | 95.4 | 97.3 | 93.5 | 97 | 97.7 |
| Filtered liquid Conductivity | mS/cm | 92 | 94.6 | 86.1 | 90.6 | 91.7 |
| Temperature | C. | 25 | 25 | 25 | 25 | 25 |

Observations include constant feed flow rates for all nanofiltration membranes 411 with the objective of maintaining a constant flux rate of 36 l/m2/hr, such as that obtained with the Dow NF-270 and Koch TFC-slow rinse2 membranes. This would be normal flow rate for operating systems and is important because water quality comparisons can only be made in comparison to real operating systems. The feed pressure is at the maximum of the system for Hydranautics ESNA1, Dow NF-90 and Koch TFC-S membranes. This meant that the actual filtered liquid flux was not maintained at 36 as was noted since the pressure limitations of the system would not allow the system to operate above 100 psi of feed pressure. Therefore, the filtered liquid flux is on the order of one tenth of the real operating flux. Further, the filtered liquid conductivity reflects the fact that the flow was not maintained for the Hydranautics, Dow NF-90 and Koch TFC-S membranes. The expected filtered liquid conductivity would be much lower for the products if operated at a higher flux rate.

Thus, the filtered liquid fluxes of regenerant solution 186 through the nanofiltration membranes 411 are significantly decreased by the high ionic strength of the regenerant waste solution or regenerant waste liquid which translates into higher feed pressure that is not available. However, the Koch Slow Rinse2 and Dow (Filmtec) 270-4040 produced a reasonably high filtered liquid flux at a pressure below 110 psi.

Estimated water quality results based on operation at normal operating values with flux rates around 25-36 LMH would have improved the final product quality by a factor of 3-5 thereby reducing the salinity of the product water. The results, even if operated properly may still limit the selection of the nanofiltration membrane 411 as part of the process.

Example 5

Solids Separator Testing

In this example, a solids separator 500 was evaluated in the treatment and recovery of regenerant waste liquid 376. The regenerant waste liquid 376 can be any of spent regeneration of the spent resin 60 involves two stages, each of which produces spent regenerant solution 100 having significantly different compositions. In the first down-flow regeneration stage, the spent resin 60 was contacted with a fresh regenerant solution 186 comprising brine—specifically, a solution of sodium chloride dissolved in water in a concentration of from about 5 to about 15 wt %—at a dosage rate of from about 10 to about 20 lbs of NaCl per cubic foot of spent resin 60. In the second down-flow rinse stage, regenerant solution 186 was rinsed off the regenerated resin 194 with rinse water 196. The rinse stage can involve both slow and fast rinse phases.

1. Characterization of Liquid Samples

The solids separator 500 was evaluated on each of three types of regenerant waste liquid 376, namely, spent regenerant solution 100 comprising brine only, spent rinse water 204 only, or a combination of the two. Three samples were taken for each type of liquid, namely:

(1) "brine" which indicates the regenerant solution was a liquid sample of the influent to the treatment and recovery process;

(2) "supernatant" which was a liquid sample of the supernatant from the filter press 520 after treatment and pH adjustment; and (3) "filtrate" which was a solid/liquid sample of the filtrate produced after filtration dewatering of the sludge and pH adjustment.

In addition, fresh regenerant solution 186 ("sweet brine") and reclaimed samples used in the resin regeneration process ("reclamined samples") were also analyzed. These eleven liquid samples were used as a baseline for comparison.

Table XII shows the results of chemical analysis of major species in the eleven liquid samples. Note that the pH of each sample is the value after depressing the level with hydrochloric acid after completion of treatment and filtration processes. The data suggested that treatment of all the different types of regenerant waste liquid 376 were effective and, in each case, greater than 99% of the multivalent ions 424 in the liquid 376 were removed in both the supernatant and filtrate:

TABLE XII

Major Species Composition of Phase I Liquid Samples

| | | $Cl^-$ (g/L) | $SO_4^{2-}$ (mg/L) | $Na^+$ (g/L) | $Ca^{2+}$ (mg/L) | $Mg^{2+}$ (mg/L) | Hardness (mg/L as $CaCO_3$) | pH | TOC (mg/L) |
|---|---|---|---|---|---|---|---|---|---|
| Brine Only | Supernatant | 82.49 | 200.97 | 53.91 | 12.80 | 0.96 | 35.93 | 6.90 | 8.05 |
| | Filtrate | 82.78 | 177.55 | 53.98 | 6.40 | 0.96 | 19.93 | 7.90 | 10.92 |
| | Brine | 69.81 | 170.22 | 27.97 | 8800.00 | 6240.00 | 47573.77 | 6.70 | 9.11 |
| Rinse Only | Supernatant | 104.50 | 293.33 | 68.71 | 56.00 | 0.00 | 140.00 | 7.10 | 11.52 |
| | Filtrate | 96.20 | 260.70 | 70.16 | 8.00 | 0.00 | 20.00 | 7.30 | 12.07 |
| | Brine | 88.01 | 317.99 | 51.45 | 4400.00 | 720.00 | 13950.82 | 6.80 | 6.30 |
| Brine + Rinse | Supernatant | 90.97 | 396.99 | 59.06 | 72.00 | 4.32 | 197.70 | 5.80 | 6.90 |
| | Filtrate | 91.47 | 373.12 | 59.41 | 32.00 | 5.76 | 103.61 | 9.80 | 7.56 |
| | Brine | 69.13 | 172.01 | 29.86 | 6400.00 | 5280.00 | 37639.34 | 6.60 | 6.04 |
| Sweet Brine | | 248.01 | 214.85 | 159.39 | 128.00 | 5.28 | 341.64 | 7.10 | 11.64 |
| Reclaimed Brine | | 122.94 | 182.95 | 65.67 | 10000.00 | 1200.00 | 29918.03 | 6.50 | 4.06 | solution 100 only, spent rinse water 204, or all of the spent regenerant solution 100, spent rinse water 204 and spent backwash water 207. The solids separator 500 treats the regenerant waste liquid 376 with a regenerant treatment composition 111 and removes precipitated compounds 114 containing multivalent ions 424 from the treated regenerant liquid 342.

In the first step, spent resin 60 is regenerated in a regeneration vat 140 using fresh regenerant solution 186. Regenera- Further, with respect to removal of calcium divalent ions in the form of calcium carbonate, in general, water with less than 80-100 mg/L $CaCO_3$ hardness is considered sufficiently soft to be used for strong cation exchange resin regeneration. The treatment of regenerant waste liquid 376 comprising spent regenerant solution 100 or "brine only" achieved this target, whereas treatment of the "rinse only" and combined "brine+ rinse" liquids achieved this target only for the filtrate of the "rinse only" liquid. This was not expected, as the "brine only"

liquid has the highest ion concentrations initially, and would thus be expected to provide the most challenge to soften to lower levels. However, it should be noted that, depending on overall economic considerations, waters with hardness as high as 250 mg/L $CaCO_3$ may be used for regeneration of spent resins 60, with only a small loss in recovered resin capacity; thus, in effect, the calcium ion removal was sufficient.

Magnesium hardness removal was very effective for all types of regenerant waste liquid 376, indicating that the pH increase and stability achieved in the solids separator 500 were good. Most of the variability in treatment efficiency came with removal of calcium hardness, suggesting that sodium carbonate dosing and/or mixing needed to be optimized. However, note that all the types of regenerant waste liquid 376 were low in carbonate hardness; thus, nearly all calcium removal is dependent on carbonate addition.

The pH of the combined "brine+rinse" filtrate sample was not adequately adjusted down to near neutral by the treatment and filtration process. This may be anomalous, but all of the filtrate sample pH values were somewhat above their counterpart supernatant and brine values. This should be checked if it is indicative of a need for better process control of pH readjustment after treatment sludge dewatering.

The total organic carbon content (TOC) of all samples was sufficiently low as not to cause a concern with resin fouling or excessive microbial stimulation. However, if the TOC levels were a concern, it can be removed with an anionic resin such as MEIX.

The hardness, both magnesium and calcium, of the reclaimed brine is cause for concern. If this brine is used for regeneration (after sodium addition to meet resin manufacturer's specifications), there would be significant loss of regenerated resin 194 exchange capacity. Although the cause cannot be definitively identified, it is likely that the process for reclaiming brine is prematurely scavenging water from the regeneration process. The reclaimed brine had approximately double the hardness of the "rinse only" regenerant waste liquid 376, which suggests timing and control of the water scavenging process needs examination. This reveals the importance of appropriately timing when to scavenge the brine vs. rinse stream. If the last portion of the rinse stream is captured too early in the process, the operator runs the chance of capturing the elevated hardness levels in the brine.

The sweet brine hardness is higher than would normally be recommended, although not as excessive as for the reclaimed brine. If achieving maximum recovery of resin capacity during regeneration is a high priority, it would likely be economically advantageous to investigate why the pre-treatment of the water used for sweet brine production is not achieving lower hardness levels.

Chemical analysis was also performed for trace or minor concentrations of other species in the same samples. Table XIII shows the results of minor species characterization of the 11 liquid samples. Generally, the data suggests that the solids separator 500 achieved good removal (>95%) of the minor polyvalent cations (barium and strontium) from all types of regenerant waste liquid 376.

TABLE XIII

| | | $Fe^{3+}$ (mg/L) | $Ba^{2+}$ (mg/L) | $Sr^{2+}$ (mg/L) | $K^+$ (mg/L) | Mn (mg/L) | As (mg/L) | Zn (mg/L) | Cu (mg/L) |
|---|---|---|---|---|---|---|---|---|---|
| Brine Only | Supernatant | BDL | 0.328 | 1.65 | 420 | 0.08 | 1.57 | 1.64 | 1.22 |
| | Filtrate | BDL | 0.396 | 1.58 | 451 | 0.04 | 0.46 | 0.52 | 1.69 |
| | Brine | BDL | 11.200 | 149.92 | 366 | 1.23 | 0.38 | 5.07 | 1.97 |
| Rinse Only | Supernatant | BDL | 0.328 | 1.50 | 266 | 0.06 | 1.12 | 0.64 | 1.53 |
| | Filtrate | BDL | 0.257 | 1.04 | 281 | 0.02 | 0.57 | 0.23 | 1.71 |
| | Brine | BDL | 8.300 | 96.13 | 234 | 0.97 | 8.10 | 1.12 | 1.75 |
| Brine + Rinse | Supernatant | BDL | 0.492 | 3.88 | 417 | 0.01 | 0.55 | 0.23 | 1.31 |
| | Filtrate | BDL | 0.903 | 7.40 | 397 | 0.01 | 0.44 | 0.38 | 1.73 |
| | Brine | BDL | 9.100 | 102.54 | 337 | 1.12 | 0.55 | 2.77 | 1.96 |
| Sweet Brine | | BDL | 0.105 | 2.30 | BDL | 4.29 | 2.53 | 0.56 | 5.00 |
| Reclaimed Brine | | BDL | 15.500 | 185.80 | 438 | 1.61 | 0.68 | 1.23 | 3.74 |

| | | Ni (mg/L) | Pb (mg/L) | Cd (mg/L) | $SiO_2$ (mg/L) | Alkalinity (mg/L as $CaCO_3$) | $HCO_3^-$ (mg/L) | $CO_3^{2-}$ (mg/L) |
|---|---|---|---|---|---|---|---|---|
| Brine Only | Supernatant | 0.10 | 0.05 | 0.0018 | 34.67 | 805 | 981 | 0.38 |
| | Filtrate | 0.11 | 0.07 | 0.0011 | 22.90 | 660 | 799 | 3.03 |
| | Brine | 0.39 | 0.19 | 0.0020 | 9.39 | 70 | 85 | 0.02 |
| Rinse Only | Supernatant | 0.17 | 0.04 | 0.0009 | 18.32 | 1510 | 1839 | 1.08 |
| | Filtrate | 0.07 | 0.03 | 0.0014 | 31.67 | 1120 | 1363 | 1.24 |
| | Brine | 0.32 | 0.20 | 0.0044 | 11.51 | 135 | 165 | 0.05 |
| Brine + Rinse | Supernatant | 0.05 | 0.02 | 0.0004 | 4.00 | 25 | 30 | 0.00 |
| | Filtrate | 0.11 | 0.04 | 0.0005 | 11.00 | 105 | 75 | 24.05 |
| | Brine | 0.44 | 0.13 | 0.0085 | 7.47 | 75 | 91 | 0.02 |
| Sweet Brine | | 0.06 | 0.11 | 0.0079 | 8.79 | 105 | 128 | 0.08 |
| Reclaimed Brine | | 0.40 | 0.08 | 0.0004 | 8.58 | 90 | 110 | 0.02 |

BDL: below detection limit

Further, with the exception of arsenic, none of the other trace metals was detected at concentration levels of concern. Arsenic was found at levels of concern in both the "sweet" brine and "rinse only" brine. This seems anomalous since all other samples were moderate or low. Arsenic is not expected to be significantly removed with hydroxide/carbonate ash treatment, so the concentration in the influent brine should be similar to that in the supernatant and filtrate. The leaching tests of solid samples (see following section) did not indicate high arsenic in any of these results, substantiating that transfer to the solids was not occurring. All of these factors suggest that sample contamination was the cause of the high values rather than high arsenic in the liquid phase. The high concentration samples, as well as random additional samples, are being reanalyzed to attempt to identify the source and nature of the problem. A supplement to this memo will be reported, if subsequent analyses indicate the problem may not be sample contamination.

Table XIII also showed that silica levels are high enough in all samples (regenerant waste liquid 376 and baseline brines) to cause fouling in some treatment processes (e.g., membrane filtration), but not so high as likely to cause problems in ion exchange or solids separation and settling. Further, the alkalinity of all the waters is low relative to hardness. This further verifies that precipitation hardness removal is carbonate limited.

2. Characterization of Solid Samples

In this experiment, filter cakes 534 were collected from in the filter press 520 and chemically analyzed to determine its chemical constituents. Regenerant waste liquid 376 comprising spent regenerant solution 100 of brine only was treated in the filtration unit 594 to form the filter cakes 534. Approximately a 5-lb sample of the dewatered filter cakes 534 was collected from the filter press 520. This sample is the solid fraction corresponding to the liquid fraction filtrate sample of the "brine only" regenerant waste liquid 376 discussed in the previous section. The sample was maintained at 4° C. until used for leaching tests.

Table XIV shows the results of the various leaching tests of the filter cakes 534 with the metals analyzed and their concentrations in the solution phase. Four leaching tests were used to characterize the suitability of the dewatered solid for non-hazardous disposal, such as in a municipal solid waste landfill, including:

1) EPA mandated Toxicity Characteristic Leaching Protocol (TCLP);
2) California Waste Extraction Test (WET);
3) Landfill leachate test, which is a modified version of the TCLP that uses actual landfill leachate instead of acetic acid as the extractant; and
4) Aqueous solubility test which measures solubility of solid species in pure water to simulate rainfall percolation.

In addition, a sub-sample solid was completed, digested using aqua regia, and the major metal composition of the digestion liquid was analyzed to ascertain the primary quantitative mineralogic composition of the solid. Elemental analysis was done on ion chromatograph. The water content of the filter cakes 534 was quantified so that the quantitative composition could be reported on a dry weight basis.

The chemical analysis revealed that none of the metals were present in the filter cakes 534 in a concentration that is above the maximum permissible limit that would designate the filter cakes as a hazardous material. Generally, the leached concentrations were less than 5% of the maximum permissible limit that delineates a solid material as hazardous due to toxicity. The TCLP test was the most aggressive of the leaching tests with regard to the filter cakes 534 produced by treatment of the "brine only" sample. This is expected for a solid that is predominantly composed of carbonate and hydroxide minerals, which will increase in solubility in the acidic pH range and the presence of a complex forming ligand. Also, for certain metals, toxicity characteristic limits have not yet been established by EPA, but primary or secondary drinking water standards exist. If a primary standard does exist, the comparative limit was set at ten times the primary standard as a conservative response to the normal protocol of setting the TC at 100-fold the primary standard. For metals with only a secondary (non-binding) standard, the comparative limit was set at one hundred times the secondary standard. The leaching test results suggest that the filter cakes 534 can be sent to municipal solid waste (MSW) landfills, or can be used in other non-hazardous beneficial use. Further, the sludge sample water content was 52% which would pass the Paint Filter Test for disposal in a MSW landfill.

3. Solid Composition Results and Discussion

Figure 12:
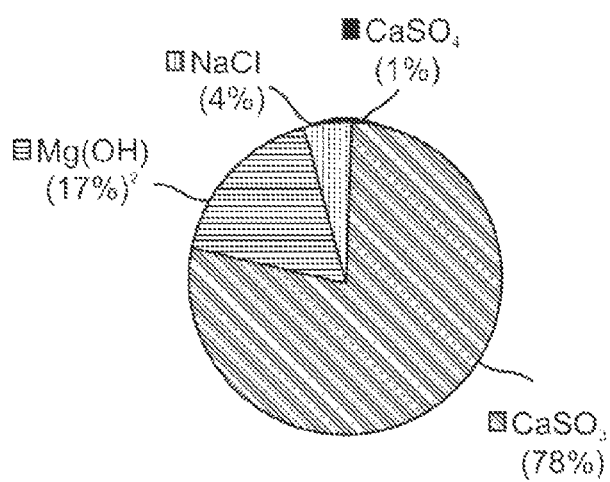
FIG. 12 is a pie chart showing the chemical composition of precipitated compounds of filter cakes generated by passing treated regenerant liquid through a filter press.

The chemical composition of the compounds in the filter cakes 304 derived from a regenerated waste liquid 376 were estimated by calculations as shown in the pie chart of FIG. 12. The analysis was based on measurement of major cations plus sulfate using ion chromatograph and calculation of the major mineralogic components assuming only carbonate, hydroxide and sulfate family minerals are present.

It can be seen from the compositional analysis that calcium carbonate and magnesium hydroxide make up more than 95% of the mass of the filter cakes 534. This was expected from the relative proportion of calcium and magnesium ions extracted from the spent resin 60 by the regenerant solution, which end up in the spent regenerant solution 100, and which in turn forms part of the regenerant waste liquid 376. Further, the calculated mass was within 0.6% of the measured dry mass, suggesting that the contribution of unaccounted-for trace minerals is negligible.

TABLE XIV

Metal concentrations solubilized by leaching tests of softened brine sludge.

| EPA HW No.[1] | Contaminant | CAS No.[2] | Regulatory Level (mg/L) | TCLP (mg/L) | WET (mg/L) | Landfill Leachate (mg/L) | Aqueous Solubility (mg/L) |
|---|---|---|---|---|---|---|---|
| D004 | Arsenic | 7440-38-2 | 5 | 0.008580 | 0.006630 | 0.024070 | 0.009400 |
| D005 | Barium | 7440-39-3 | 100 | 4.592030 | 0.583782 | 0.268918 | 0.194772 |
| D006 | Cadmium | 7440-43-9 | 1 | 0.000130 | 0.000010 | 0.000130 | 0.000010 |
| D008 | Lead | 7439-92-1 | 5 | 0.009260 | 0.001149 | 0.002370 | 0.000220 |
|  | Silica ($SiO_2$) |  | NAL | 46.145214 | 23.280186 | 16.898684 | 13.577984 |
|  | Manganese |  | NAL | 0.127000 | 0.019200 | 0.133000 | 0.002350 |
|  | Nickel[3] |  | 1,000 | 0.029100 | 0.003440 | 0.014300 | 0.001960 |
|  | Copper[4] |  | 100 | 0.911667 | 0.249637 | 0.083600 | 0.013800 |
|  | Zinc |  | NAL | 2.397097 | 0.017800 | 0.050100 | 0.007590 |
|  | Strontium |  | NAL | 56.317349 | 7.537682 | 2.769459 | 1.686690 |

Notes:
[1]Hazardous waste number.
[2]Chemical abstracts service number.
[3]10X MCL under considered as surrogate regulatory limit
[4]100X Secondary drinking water standard as surrogate regulatory limit
NAL: no action limit A separation process can be used to separate the $Mg(OH)_2$ solid fraction from the $CaCO_3$ solid fraction from the relatively high volume fraction of magnesium hydroxide and calcium carbonate in the filter cakes 534. In one version, such a separation process comprises a two-step precipitation process. In the first stage, a first regenerant treatment composition 111*a* can be added to the regenerant waste liquid 376 to raise the pH of the liquid above 11. The first regenerant treatment composition 111*a* can include, for example, hydroxide compounds such as sodium or calcium hydroxide. In the first stage, magnesium hydroxide would precipitate out of regenerant waste liquid 376 as the filter cakes 534 in the filter press 520. A second treatment stage can then be performed on the regenerate waste liquid 376 by the addition of carbonate compounds (e.g., sodium carbonate) to force the precipitation of calcium carbonate from the waste liquid 376. This may be of interest if the filter cakes 534 can be used to generate compounds such as feedstock for cement manufacture and many other applications.

Example 6

Filtration Unit Additional Testing

In this example, additional batches of regenerant waste liquid 376 having different compositions were treated in the solids separator 500 to further characterize the treatment process and refine operating procedure. Liquid samples were collected from four points in the modified treatment sequence for chemical analysis of the composition of the liquid. One position was sampled at three different times (i.e., early, middle and late in run). Thus, a total of six samples were collected for analysis. The sample identities and labeling were:
(1) spent regenerant solution—(raw water) RW (1 sample);
(2) supernatant pre-filtration & $CO_2$—SPRE (1 sample);
(3) supernatant post-filtration & $CO_2$—SPOST (3 samples); and
(4) filter press filtrate no $CO_2$—FPF (1 sample).

The six liquid samples collected were analyzed for major ions and aggregate parameters, as shown in Table XV:

the regenerant treatment composition 111 was added to the waste liquid 376, (ii) too low a total suspended solids concentration in the waste liquid 376, or (iii) too low a pH of the waste liquid 376 after addition of the treatment composition 111. The solids concentration is significantly higher than typical in drinking water treatment applications that yield good results, and the pH in all samples was greater than 12. Thus, it was most likely that either the sedimentation tank was not sufficiently quiescent for good aggregation and settling, or the sedimentation time was too short. These problems would also result in poorer than expected calcium removal. It is further believed that the precipitation yields can be improved by maintaining a slow agitation of the regenerant waste liquid 376 after addition of the treatment composition 111 in the regeneration vat 140.

The sodium concentration of the water being softened (RW) was lower than the "rinse only" regenerant waste liquid 376 in Example 5 due to anomalies in the salt content of the spent regeneration solution 100 and other factors. Comparing the SPOST to the SPRE, modest additional mineral hardness removal (about 8.5%) from the regenerant waste liquid 376 was achieved with aeration induced $CO_2$ (carbon dioxide gas) addition prior to filtration. The treated regenerant liquid 342 contained about 30% of the sodium of the fresh regenerant solution 186 (or "sweet brine" solution), and about 50-60% of the sodium of normal resin regeneration influent. This can be changed by using NaOH rather than $Ca(OH)_2$ for adjustment of the pH of the treated regenerant liquid 342. This can increase the final sodium concentration of the treated regenerant liquid 342 and decrease the volume of the filter cakes 534 but may be more costly.

Thus, the solids separator 500 was determined to provide sufficiently low levels of multivalent ions 424 in the treated regenerant liquid 342 to allow recycling and recovery of the accreted regenerant solution, regardless of the differences in chemical concentration of the constituents of the treated regenerant liquid 342 in Examples 5 and 6.

TABLE XV

| Sample | $Na^+$ (g/L) | $Ca^{2+}$ (mg/L) | $Mg^{2+}$ (mg/L) | $K^+$ (mg/L) | $Cl^-$ (g/L) | $SO_4^{2-}$ (mg/L) | pH | Hardness (mg/L as $CaCO_3$) | Alkalinity (mg/L as $CaCO_3$) | $HCO_3^-$ (mg/L) (calc.) | $CO_3^{2-}$ (mg/L) (calc.) | TDS (mg/L) (calc.) | Turbidity (NTU) | TOC (mg/L) |
|---|---|---|---|---|---|---|---|---|---|---|---|---|---|---|
| SPOST 1 | 42.1 | 64.8 | 13.92 | 230.83 | 56.26 | 39.04 | 12.57 | 219 | 9333 | 25.84 | 4458 | 98560 | 3.94 | 10.38 |
| SPOST 2 | 53.9 | 72.8 | 9.12 | 306.43 | 71.96 | 34.33 | 12.63 | 219 | 9824 | 23.16 | 4587 | 116416 | 7.11 | 8.98 |
| SPOST 3 | 42.7 | 65.6 | 13.44 | 244.20 | 56.64 | 43.26 | 12.57 | 219 | 7491 | 19.46 | 3357 | 98496 | 7.46 | 9.09 |
| FPF | 51.0 | 72.8 | 11.52 | 301.00 | 69.00 | 37.14 | 12.64 | 229 | 10438 | 24.73 | 4942 | 116224 | 3.72 | 7.51 |
| SPRE | 44.4 | 80.8 | 9.12 | 253.22 | 59.01 | 37.06 | 12.60 | 239 | 9579 | 24.63 | 4531 | 114240 | 3.48 | 10.14 |
| RW | 39.8 | 5608 | 1195 | 254 | 71.84 | 40.40 | 6.73 | 18918 | 521 | 634.92 | 0.16 | 98432 | 521.10 | 3.33 |

In this experiment, the mineral hardness levels in the spent regenerant solution samples were considerably less than those of Example 5 which were 47,574 mg/L. This occurred because the spent resin 60 that was regenerated to form the spent regeneration solution 100 and resultant waste liquid 376 was not fully exhausted, which is a large inefficiency in the current process.

While the regenerant waste liquid treatment process removed over 98.5% of the hardness of the waste liquid 376, it did not achieve the same removal level as was observed in Example 5. It is believed that the lower magnesium removal rates occurred because of (i) too short a settling period after Example 7

Evaluation of Nanofiltration and Reverse Osmosis Membranes

In this example, the regenerant waste liquid 376 treated in the solids separator 500, as described in Examples 5 and 6, was further treated with nanofiltration (NF) and reverse osmosis (RO) membranes to further purify the waste liquid 376 to form pure water. In this experiment, a large volume of 30 gallons of SPOST composite water was collected for testing using a range of NF and RO membranes to ascertain the water recovery and salt rejection capability of the process on SPOST water. One 10-gallon sample of the FPF (non-$CO_2$ adjusted) sample was collected for NF/RO treatment evaluation from Example 5. For promising membranes 411, concentrate 418 and filtered liquid 417 samples were to be collected with subsequent thermal or mechanical distillation of the most promising concentrate sample.

TABLE XVI

| Membrane Type | Membrane Area ($cm^2$) | $Ec_{initial}$ (mS/cm) | $EC_{conc}$ (mS/cm) | $EC_{perm}$ (mS/cm) | $P_{feed}$ (psi) | $Q_{perm}$ (psi) | $Vol_{init}$ (L) | $Vol_{final}$ (L) | A (cm/s/psi) | Rej (%) | Qfeed (L/min) |
|---|---|---|---|---|---|---|---|---|---|---|---|
| RO-SAEHANV4040-FE | 125 | 181.2 | NA | NA | 300 | NA | 9.00 | 9.00 | NA | NA | 1.89 |
| NF-ESNA1-LF-4040 | 125 | 164.6 | 178 | 158.1 | 320 | 1.779 | 10.50 | 3.70 | 7.42E−07 | 11.18 | 1.89 |
| NF-Filmtec 270 4040 | 125 | 181.2 | 187.1 | 176.2 | 320 | 17.43 | 9.00 | 2.70 | 7.27E−06 | 5.83 | 1.89 |
| NF-Koch 4720 SR2 | 276 | 180.6 | 180.8 | 175.7 | 85 | 11.97 | 9.55 | 3.45 | 8.56E−06 | 2.82 | 0.40 |
| RO-ESPA1 | 84 | 183.9 | 183.9 | 173.8 | 300 | 0.12 | 5.00 | 4.90 | 8.17E−08 | 5.49 | 1.89 |
| RO-ESPA1 | 276 | 193.9 | NA | NA | 90 | NA | 9.55 | 9.55 | NA | NA | 0.40 |

Permeation and salt rejection results for SPOST 2 feed water to various Nanofiltration and Reverse Osmosis membranes.

Table XVI shows the results of testing membranes using SPOST 2 water. In all cases, turbidity of influent, filtered liquid 417 and concentrate 418 was measured, and in no case was it above detection. However, the permeation flux was low with Typical RO water transport coefficients being in the range of $10^{-4}$ to $10^{-5}$ cm/s/psi. The measured rates were more than 700 fold lower than typical and for one RO membrane at 300 psi, no permeation was observed. The highest salt rejection was about 11%, meaning for the pressures used nearly 90% of the influent salt passed through the membrane. The problem is that water permeation is so slow that the salt diffusion rate is comparable to the water permeation rate.

A calculation of the osmotic pressure of the brine influent solutions indicates that a transmembrane pressure of greater than 1000 psi would be required to create appreciable permeation of waste liquid 376 through the membrane 411 with high salt rejection.

The system and processes described above allow ion exchange resins 22 to absorb undesirable ions from fluid passed through the resin, and then regenerate the exhausted or spent resin 60 after a time period when they can no longer absorb ions from the liquid. The spent resins 60 are regenerated with minimal wastage of regenerant solution 186, recovery of chemicals used in the regeneration process, reduced water usage, and reduced environmental impact of disposing of spent regenerant solution 100 and other materials into the environment.

The present invention has been described with reference to certain exemplary or preferred versions thereof; however, other versions are possible. For example, the apparatus and methods can be used in other types of applications as would be apparent to one of ordinary skill, such as, for example, other ion exchange processes for removing other materials or ionic species from liquids, solutions, and slurries. The system can also have other configurations of the regeneration waste solution apparatus, different ways of interconnecting the various sumps, vats, and tanks, alternative valve systems or pumps, and different regenerant solution compositions or chemicals. Therefore, the spirit and scope of the appended claims should not be limited to the description of the preferred versions contained herein.

Furthermore, in this description, embodiments of the present invention were described with reference to specific embodiments; however, it will be appreciated that various modifications and changes may be made without departing from the scope of the present invention as set forth in the exemplary provisional embodiments. The specification and figures are to be regarded in an illustrative manner rather than a restrictive one, and all such modifications are intended to be included within the scope of the present invention. Accordingly, the scope of the invention should be determined by the claims and their legal equivalents. For example, the steps recited in any method or process claims may be executed in any order and are not limited to the specific order presented in the claims. Additionally, the components or elements recited in any apparatus embodiment may be assembled or otherwise operationally configured in a variety of permutations to produce substantially the same result as the present invention and, accordingly, are not limited to the specific configuration recited in the claims.

Still further, the benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the provisional embodiments. As used herein, the terms "comprising", "having", "including", or any variation thereof are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

What is claimed is:

1. A resin regeneration system comprising:
   (a) a regeneration vat for holding spent cation exchange resin;
   (b) a regenerant solution tank for holding fresh regenerant solution, the regenerant solution tank being connected to the regeneration vat to allow transfer of the regenerant solution into the regeneration vat to regenerate the spent cation exchange resin to form fresh cation exchange resin and spent regenerant solution;
   (c) a regenerant recovery tank comprising (i) a fluid inlet to receive the spent regenerant solution, and (ii) a fluid outlet to release treated regenerant liquid;
   (d) a chemical dispenser to dispense a regenerant treatment composition into the spent regenerant solution in the regenerant recovery tank to form a treated regenerant liquid and precipitate flocs;

(e) a solids separator to receive the treated regenerant liquid and separate the precipitate flocs from the treated regenerant liquid to form a separated regenerant solution;

(f) a pH adjuster to adjust the concentration of chloride ions in the separated regenerant solution to form fresh regenerant solution; and (g) a pump to pump the fresh regenerant solution to the regenerant solution tank to regenerate additional spent cation exchange resin.

2. A system according to claim 1 comprising a backwash supply tank to hold backwash water to backwash the spent cation exchange resin to form spent backwash water comprising resin fines, and backwash nozzles in the regeneration vat to pass a stream of backwash water upwardly through the spent cation exchange resin.

3. A system according to claim 2 comprising a particle filter to filter out the resin fines from the spent backwash water.

4. A system according to claim 1 comprising a water softener or thermal distiller to generate rinse water to rinse the spent cation exchange resin after regeneration.

5. A system according to claim 1 wherein the chemical dispenser comprises a hopper.

6. A system according to claim 1 wherein the regenerant recovery tank comprises a circulation mixer to mix the spent regenerant solution and dispersed regenerant treatment composition.

7. A system according to claim 1 wherein the solids separator comprises a filter press.

8. A system according to claim 1 wherein the solids separator comprises a centrifuge.

9. A system according to claim 1 wherein the pH adjuster comprises:
(i) a pH-adjuster tank for holding a chloride-containing acid;
(ii) a pH-adjusting tank to hold the separated regenerant solution, the tank comprising an inlet to receive the chloride-containing acid from the pH adjuster tank; and
(iii) a pH-adjuster feed pump to pump the chloride-containing acid from the pH-adjuster tank to the inlet of the pH-adjusting tank.

10. A system according to claim 1 wherein the regenerant recovery tank comprises a translucent portion.

11. A resin regeneration system comprising:
(a) a regeneration vat for holding spent cation exchange resin;
(b) a regenerant solution tank for holding fresh regenerant solution, the regenerant solution tank being connected to the regeneration vat to allow transfer of the regenerant solution into the regeneration vat to regenerate the spent cation exchange resin to form fresh cation exchange resin and spent regenerant solution;
(c) a regenerant recovery tank comprising (i) a fluid inlet to receive the spent regenerant solution, and (ii) a fluid outlet to release treated regenerant liquid;
(d) a chemical dispenser comprising a hopper connected to a liquid channel, the hopper having an inlet to receive the regenerant treatment composition and an outlet to dispense the regenerant treatment composition into a flowing stream of the spent regenerant solution passing through the liquid channel to form a treated regenerant liquid and precipitate flocs;
(e) a solids separator to receive the treated regenerant liquid and separate the precipitate flocs from the treated regenerant liquid to form a separated regenerant solution;
(f) a pH adjuster to adjust the concentration of chloride ions in the separated regenerant solution to form fresh regenerant solution; and
(g) a pump to pump the fresh regenerant solution to the regenerant solution tank to regenerate additional spent cation exchange resin.

12. A system according to claim 11 comprising backwash nozzles in the regeneration vat to backwash the spent cation exchange resin to form spent backwash water comprising resin fines.

13. A system according to claim 11 comprising a water softener or thermal distiller to generate rinse water to rinse the spent cation exchange resin after regeneration.

14. A system according to claim 11 wherein the regenerant recovery tank comprises a circulation mixer.

15. A system according to claim 11 wherein the solids separator comprises a filter press or centrifuge.

16. A system according to claim 11 wherein the regenerant recovery tank comprises a translucent portion.

17. A resin regeneration system comprising:
(a) a regeneration vat for holding spent cation exchange resin;
(b) a regenerant solution tank for holding fresh regenerant solution, the regenerant solution tank being connected to the regeneration vat to allow transfer of the regenerant solution into the regeneration vat to regenerate the spent cation exchange resin to form fresh cation exchange resin and spent regenerant solution;
(c) means for dispensing a regenerant treatment composition into spent regenerant solution in a regenerant recovery tank to form treated regenerant liquid and precipitate flocs;
(e) a solids separator to separate the precipitate flocs from the treated regenerant liquid to form a separated regenerant solution; and
(f) a pH adjuster to adjust the concentration of chloride ions in the separated regenerant solution to form fresh regenerant solution.

18. A system according to claim 17 comprising means to backwash the spent cation exchange resin to form spent backwash water comprising resin fines, and a particle filter to filter out the resin fines from the spent backwash water.

19. A system according to claim 17 wherein the regenerant recovery tank comprises a circulation mixer.

20. A system according to claim 17 wherein the solids separator comprises a filter press or centrifuge.

* * * * *